US012027335B2

(12) United States Patent
Zhong et al.

(10) Patent No.: US 12,027,335 B2
(45) **Date of Patent: *Jul. 2, 2024**

(54) DIRECT-CURRENT RELAY CAPABLE OF EXTINGUISHING ARC AND RESISTING SHORT-CIRCUIT CURRENT

(71) Applicant: Xiamen Hongfa Electric Power Controls Co., Ltd., Fujian (CN)

(72) Inventors: Shuming Zhong, Fujian (CN); Wenguang Dai, Fujian (CN); Dapeng Fu, Fujian (CN); Meng Wang, Fujian (CN)

(73) Assignee: Xiamen Hongfa Electric Power Controls Co., Ltd., Fujian (CN)

(*) Notice: Subject to any disclaimer, the term of this patent is extended or adjusted under 35 U.S.C. 154(b) by 0 days.

This patent is subject to a terminal disclaimer.

(21) Appl. No.: 18/305,380

(22) Filed: Apr. 24, 2023

(65) Prior Publication Data

US 2023/0260734 A1 Aug. 17, 2023

Related U.S. Application Data

(63) Continuation of application No. 17/292,418, filed as application No. PCT/CN2019/116808 on Nov. 8, 2019, now Pat. No. 11,670,472.

(30) Foreign Application Priority Data

Nov. 9, 2018 (CN) ......................... 201811330771.1
Dec. 28, 2018 (CN) ......................... 201811623949.1

(Continued)

(51) Int. Cl.

*H01H 50/64* (2006.01)
*H01H 1/54* (2006.01)

(Continued)

(52) U.S. Cl.

CPC .............. *H01H 50/64* (2013.01); *H01H 1/54* (2013.01); *H01H 50/18* (2013.01); *H01H 50/56* (2013.01)

(58) Field of Classification Search

CPC .......... H01H 50/64; H01H 1/54; H01H 50/18; H01H 50/56; H01H 9/443; H01H 50/40;

(Continued)

(56) References Cited

U.S. PATENT DOCUMENTS 3,887,888 A 6/1975 Bayles et al.
4,513,270 A * 4/1985 Belbel .................. H01H 77/101 335/16

(Continued)

FOREIGN PATENT DOCUMENTS

CN 104882335 A 9/2015
CN 105359243 A 2/2016

(Continued)

OTHER PUBLICATIONS

Notice of Reasons for Rejection for corresponding Japanese Application No. 2021-524964 mailed Apr. 19, 2022 and ts English Translation.

(Continued)

*Primary Examiner* — Shawki S Ismail
*Assistant Examiner* — Lisa N Homza
(74) *Attorney, Agent, or Firm* — Renner, Otto, Boisselle & Sklar, LLP

(57) ABSTRACT

A DC relay capable of extinguishing arc and resisting short-circuit current includes two stationary contact leading-out terminals, a push rod component, a straight sheet type movable spring mounted on the push rod component and two permanent magnets. The magnetic poles on the sides opposite to each other of the two permanent magnets are opposite. Two permanent magnets are connected to two (Continued)

yoke clips including at least two yoke sections on two sides in the width direction of the movable spring corresponding to the movable and stationary contacts. Upper magnetizers are mounted above the position. The lower magnetizers are mounted under the position. The upper and lower magnetizers can approach or come into contact with each other through the through holes in the movable spring. At least two independent magnetically conductive loops are formed in the width direction of the movable spring by the upper and lower magnetizers.

16 Claims, 36 Drawing Sheets

(30) Foreign Application Priority Data

| | | |
|---|---|---|
| Dec. 28, 2018 | (CN) | 201811623963.1 |
| Dec. 28, 2018 | (CN) | 201811624058.8 |
| Dec. 28, 2018 | (CN) | 201811624113.3 |
| Dec. 28, 2018 | (CN) | 201811624114.8 |

(51) Int. Cl.
*H01H 50/18* (2006.01)
*H01H 50/56* (2006.01)

(58) Field of Classification Search
CPC ........ H01H 50/42; H01H 53/02; H01H 50/54; H01H 50/16
USPC .............................................................. 335/2
See application file for complete search history.

(56) References Cited

U.S. PATENT DOCUMENTS

| | | | | |
|---|---|---|---|---|
| 5,245,303 | A * | 9/1993 | Aharonian | H01H 51/06 335/78 |
| 5,892,194 | A * | 4/1999 | Uotome | H01H 51/065 335/154 |
| 5,959,517 | A * | 9/1999 | Wieloch | H01H 81/04 335/16 |
| 8,269,585 | B2 * | 9/2012 | Choi | H01H 1/2008 335/196 |
| 8,653,917 | B2 * | 2/2014 | Takaya | H01H 50/546 335/131 |
| 9,613,771 | B2 * | 4/2017 | Lim | H01H 1/54 |
| 11,410,825 | B2 * | 8/2022 | Engewald | H01H 50/546 |
| 2006/0050466 | A1 * | 3/2006 | Enomoto | H01H 50/02 361/160 |
| 2009/0322454 | A1 * | 12/2009 | Tanaka | H01H 50/38 335/189 |
| 2009/0322455 | A1 * | 12/2009 | Yoshihara | H01H 51/2209 335/189 |
| 2011/0032059 | A1 * | 2/2011 | Ito | H01H 50/14 218/25 |
| 2011/0221548 | A1 * | 9/2011 | Yoshihara | H01H 51/29 335/185 |
| 2013/0057369 | A1 * | 3/2013 | Yano | H01H 50/546 335/156 |
| 2014/0002215 | A1 * | 1/2014 | Ionescu | H01H 50/18 335/18 |
| 2014/0014622 | A1 * | 1/2014 | Naka | H01H 50/163 218/4 |
| 2014/0184366 | A1 | 7/2014 | Ito | |
| 2015/0015350 | A1 * | 1/2015 | Tachikawa | H01H 50/18 335/131 |
| 2015/0022291 | A1 * | 1/2015 | Kashimura | H01H 9/46 218/148 |
| 2015/0022292 | A1 * | 1/2015 | Tachikawa | H01H 50/641 335/131 |
| 2015/0022296 | A1 * | 1/2015 | Takaya | H01H 33/182 335/201 |
| 2015/0034600 | A1 * | 2/2015 | Isozaki | H01H 1/06 218/148 |
| 2015/0054605 | A1 | 2/2015 | Kubono et al. | |
| 2015/0187518 | A1 * | 7/2015 | Molyneux | H01H 50/546 335/196 |
| 2015/0213985 | A1 * | 7/2015 | Naka | H01H 50/42 335/189 |
| 2015/0380145 | A1 * | 12/2015 | Koch | H01H 1/20 335/282 |
| 2016/0155592 | A1 * | 6/2016 | Ito | H01H 50/36 335/187 |
| 2016/0196944 | A1 * | 7/2016 | Ionescu | H01H 71/00 335/18 |
| 2016/0260563 | A1 * | 9/2016 | Shima | H01H 50/026 |
| 2016/0260566 | A1 * | 9/2016 | Shima | H01H 50/54 |
| 2016/0300677 | A1 * | 10/2016 | Park | H01H 9/443 |
| 2017/0110275 | A1 * | 4/2017 | Yang | H01H 50/58 |
| 2018/0096811 | A1 * | 4/2018 | Lee | H01H 50/026 |
| 2018/0374667 | A1 * | 12/2018 | Ionescu | H01H 50/546 |
| 2019/0006140 | A1 | 1/2019 | Shi | |
| 2020/0373111 | A1 | 11/2020 | Zhong | |
| 2021/0175031 | A1 * | 6/2021 | Yoo | H01H 33/596 |

FOREIGN PATENT DOCUMENTS

| | | | |
|---|---|---|---|
| CN | 105374633 | A | 3/2016 |
| CN | 205264626 | U | 5/2016 |
| CN | 107706055 | A | 2/2018 |
| CN | 109559939 | A | 4/2019 |
| CN | 109659197 | A | 4/2019 |
| CN | 109659198 | A | 4/2019 |
| CN | 109659199 | A | 4/2019 |
| CN | 109671593 | A | 4/2019 |
| CN | 109830404 | A | 5/2019 |
| CN | 209000835 | U | 6/2019 |
| CN | 209357682 | U | 9/2019 |
| CN | 209374354 | U | 9/2019 |
| CN | 209374355 | U | 9/2019 |
| CN | 209374356 | U | 9/2019 |
| CN | 209374357 | U | 9/2019 |
| DE | 102018208119 | A1 | 11/2019 |
| EP | 2838103 | A1 | 2/2015 |
| JP | S34-20135 | Y1 | 12/1959 |
| JP | 2000-48701 | A | 2/2000 |
| JP | 3420135 | B2 | 6/2003 |
| JP | 2012-104364 | A | 5/2012 |
| JP | 2012-212667 | A | 11/2012 |
| JP | 2013246873 | A | 12/2013 |
| JP | 2018133347 | A | 8/2018 |
| JP | 2019179693 | A | 10/2019 |
| KR | 101581182 | B1 | 12/2015 |
| KR | 20170027000 | A | 3/2017 |
| WO | 2012007802 | A1 | 1/2012 |
| WO | 2018024167 | A1 | 2/2018 |
| WO | 2018131639 | A1 | 7/2018 |

OTHER PUBLICATIONS

Extended Search Report for corresponding European Application No. 19881489.9 mailed Jul. 8, 2022.
Office Action for corresponding Korean Application No. 10-2021-7013254 mailed Feb. 24, 2023 and its English Translation.
International Search Report for related International Application No. PCT/CN2019/116808 mailed Feb. 12, 2020 and its English translation.
Notice of Allowance for corresponding Japanese Application No. 2021-524964 mailed Jul. 4, 2023 and its English Translation.
Extended European Search Report for corresponding European Application No. 23202491.9 dated Jan. 19, 2024.
First Office Action for corresponding Chinese Application No. 201811623949.1 dated Nov. 30, 2023 and its English translation.
First Office Action for corresponding Chinese Application No. 201811623963.1 dated Nov. 30, 2023.
First Office Action for corresponding Chinese Application No. 201811624058.8 dated Dec. 1, 2023.

(56) References Cited

OTHER PUBLICATIONS

First Office Action for corresponding Chinese Application No. 201811624113.3 dated Nov. 30, 2023 and its English translation.
First Office Action for corresponding Chinese Application No. 201811624114.8 dated Dec. 1, 2023 and its English translation.
First Office Action for corresponding Chinese Application No. 201811330771.1 dated Nov. 29, 2023 and its English translation.
Notice of Allowance for corresponding Chinese Application No. 201811624114.8 mailed Apr. 8, 2024.
Notice of Allowance for corresponding Korean Application No. 10-2023-7039033 mailed Feb. 22, 2024.

* cited by examiner

DIRECT-CURRENT RELAY CAPABLE OF EXTINGUISHING ARC AND RESISTING SHORT-CIRCUIT CURRENT

CROSS REFERENCE

This disclosure is a continuation application of U.S. patent application Ser. No. 17/292,418, which is a national phase of International Application No. PCT/CN2019/116808, which claims priority to following six Chinese patent applications, that is Chinese patent application No. 201811330771.1 filed on Nov. 9, 2018, Chinese patent application No. 201811624114.8 filed on Dec. 28, 2018, Chinese patent application No. 201811623949.1 filed on Dec. 28, 2018, Chinese patent application No. 201811624058.8 filed on Dec. 28, 2018, and Chinese patent application No. 201811624113.3 filed on Dec. 28, 2018, and Chinese patent application No. 201811623963.1 filed on Dec. 28, 2018, the disclosures of which are incorporated herein by reference in its entirety.

TECHNICAL FIELD

The present disclosure relates to the technical field of relays, in particular to a direct-current relay resistant to short-circuit current.

BACKGROUND

A DC relay in the prior art adopts a direct-acting magnetic circuit structure, in which two stationary contact leading-out terminals (that is, two load leading-out terminals) are respectively mounted on a housing, and stationary contacts are provided on bottom ends of the two stationary contact leading-out terminals. A current at one of the stationary contact leading-out terminal flows in, and a current at the other stationary contact leading-out terminal flows out. A movable spring and a push rod component are mounted in the housing, in which the movable spring adopts a straight sheet type movable spring (also called as a bridge-type movable spring), the movable spring is mounted in the push rod component by a spring, and the push rod component is connected with the direct-acting magnetic circuit. Under the action of the direct-acting magnetic circuit, the movable spring is driven by the push rod component to move upward, so that the movable contacts at two ends of the movable spring are in contact with the stationary contacts at bottom ends of the two stationary contact leading-out terminals, so as to realize a communication load. Such DC relay in the prior art can generate electro-dynamic repulsion force between the movable and stationary contacts when a fault short-circuit current occurs, and thereby affecting stability of the contact between the movable and stationary contacts.

With the rapid development of the new energy industry, various vehicle manufacturers and battery pack factories have increasing requirements for fault short-circuit current. On the basis of the characteristics of small size, DC relays are required to have a short-circuit resistance function, that is, an assistant attraction is provided when the system has a large fault current to resist the electro-dynamic repulsion force subjected to the movable spring. At present, a typical input short-circuit resistance requirement as required in the market is no burning or exploding at 8000 A, in 5 ms; however, the DC relay in the prior art cannot provide sufficient attraction under the consideration of keeping the volume small, that is, the contact pressure is not enough to resist the electro-dynamic repulsion force subjected to the movable spring, so that it is difficult to meet market requirements.

SUMMARY

An object of the present disclosure is to overcome shortcomings in the prior art, so that there is provided with a DC relay resistant to short-circuit current, which can provide sufficient contact pressure while maintaining a volume of the product small so as to resist electro-dynamic repulsion force caused by that the movable spring is subjected to large short-circuit current, and has such characteristics that magnetic circuit is not easy to saturate due to high magnetic efficiency.

A technical solution adopted by the present disclosure to solve the technical problem is that a DC relay resistant to short-circuit current includes two stationary contact leading-out terminals, a straight sheet type movable spring and a push rod component. The movable spring is mounted on the push rod component so that movable contacts on both ends of the movable spring are in contact with stationary contacts on bottom ends of the two stationary contact leading-out terminals under an action of the push rod component, and a current flows in from one of the two stationary contact leading-out terminals and flows out of the other of the two stationary contact leading-out terminals via through the movable spring. Wherein upper magnetizers arranged in a width direction of the movable spring are mounted above a preset position of the movable spring; lower magnetizers arranged in the width direction of the movable spring and capable of moving with the movable spring are mounted below the preset position of the movable spring; at least one through hole is provided in the movable spring at the preset position, so that the upper magnetizers and the lower magnetizers can approach one to another or come into contact with each other through the through holes; and at least two independent magnetically conductive loops are formed in the width direction of the movable spring by the upper magnetizers and the lower magnetizers, thus by using magnetic pole faces added to the through holes corresponding to the magnetically conductive loops, when the movable spring has a large fault current, attraction force in a contact pressure direction is generated to resist an electro-dynamic repulsion force generated, due to the fault current between the movable spring and the stationary contact leading-out terminals.

In an embodiment, the preset position is between two movable contacts in a width direction of the movable spring.

In an embodiment, the upper magnetizer comprises at least one rectangular upper magnetizer, and the lower magnetizers comprise at least two U-shaped lower magnetizers, wherein one of the at least two U-shaped lower magnetizer and a corresponding one of the at least one rectangular upper magnetizers form one independent magnetically conductive loop, and the two U-shaped lower magnetizers of adjacent two of the magnetically conductive loops are not in contact with each other.

In an embodiment, in at least two independent magnetically conductive loops, at least one set of the adjacent two of the magnetically conductive loops share one of the rectangular upper magnetizers, the two U-shaped lower magnetizers of the adjacent two of the magnetically conductive loops are fitted below the corresponding one of the at least one rectangular upper magnetizers.

In an embodiment, in at least two independent magnetically conductive loops, the rectangular upper magnetizers of the adjacent two of the magnetically conductive loops are independent to each other, the two U-shaped lower magnetizers of the adjacent two of the magnetically conductive loops are fitted below the corresponding rectangular upper magnetizers.

In an embodiment, there are two magnetically conductive loops, the movable spring is provided with one through hole, and each of the two U-shaped lower magnetizers has one side wall attached to a corresponding side of the width of the movable spring, and the other side wall passing through the through hole of the movable spring, and a gap is presented between the other side walls of the two U-shaped lower magnetizers.

In an embodiment, the other side walls of the two U-shaped lower magnetizers are arranged side by side in a width direction of the movable spring within the through hole of the movable spring, such that the two magnetically conductive loops corresponding to the two U-shaped lower magnetizers are arranged side by side in the width direction of the movable spring.

In an embodiment, the other side walls of the two U-shaped lower magnetizers are arranged in a staggered manner in a width direction of the movable spring within the through hole of the movable spring, such that the two magnetically conductive loops corresponding to the two U-shaped lower magnetizers are distributed in the staggered manner in the width direction of the movable spring.

In an embodiment, there are two magnetically conductive loops, the movable spring is provided with two through holes, and the two through holes are arranged side by side in a width direction of the movable spring, and each of the two U-shaped lower magnetizers has one side wall attached to a corresponding side of the width of the movable spring, and the other side wall fitted in one of the two through holes of the movable spring, such that the two magnetically conductive loops corresponding to the two U-shaped lower magnetizers are arranged side by side in the width direction of the movable spring.

In an embodiment, there are two magnetically conductive loops, the movable spring is provided with two through holes, and the two through holes are arranged in a staggered manner in a width direction of the movable spring, each of the two U-shaped lower magnetizers has one side wall attached to a corresponding side of the width of the movable spring, and the other side wall fitted to one of the two through holes of the movable spring, such that the two magnetically conductive loops corresponding to the two U-shaped lower magnetizers are arranged in a staggered manner in the width direction of the movable spring.

In an embodiment, there are three magnetically conductive loops, the movable spring is provided with two through holes, and three U-shaped lower magnetizers are sequentially arranged in a width of the movable spring, wherein the two side walls of the U-shaped lower magnetizer in the middle pass through the two through holes of the movable spring respectively, and each of the two U-shaped lower magnetizers on two sides have one side wall attached to a corresponding side of the movable spring, and the other side wall passing through one of the two through holes of the movable spring, and a gap is presented between the two sides within the same through hole in the movable spring.

In an embodiment, a top end of the side wall of the U-shaped lower magnetizer is substantially flush with an upper surface of the movable spring.

In an embodiment, the upper magnetizer is an upper armature that is secured to the push rod component, and the lower magnetizer is the lower armature that is secured to the movable spring, and the movable spring is mounted in the push rod component by a spring; when the movable contacts of the movable spring are in contact with the stationary contacts of the stationary contact leading-out terminals, a preset gap is presented between the upper armature and the lower armature.

In an embodiment, the upper magnetizer is an upper yoke that is fixed on a housing on which two stationary contact leading-out terminals are mounted, and the lower magnetizer is a lower armature that is secured to the movable spring mounting in the push rod component by a spring, and when the movable contacts of the movable spring are in contact with the stationary contacts of the stationary contact leading-out terminals, the upper yoke is in contact with the lower armature.

In an embodiment, the push rod component includes a U-shaped bracket, a spring seat and a push rod component; a top portion of the push rod is secured to the spring seat; a bottom portion of the U-shaped bracket is secured to the spring seat; and a movable spring assembly composed of the movable spring and the two U-shaped lower magnetizers is mounted within the U-shaped bracket by the spring, wherein an upper surface of the movable spring abuts against the upper yoke that is fixed on an inner wall of the top portion of the U-shaped bracket, and the spring elastically abuts between bottom ends of the two U-shaped lower magnetizers and a top end of the spring seat.

In an embodiment, semi-circular grooves for positioning the spring are respectively provided on the bottom ends of the two U-shaped lower magnetizers, and the two semi-circular grooves surround a complete circle so as to fit on the top portion of the spring.

In an embodiment, positioning posts for positioning the spring are respectively provided the bottom ends of the two U-shaped lower magnetizers, so as to position the spring outside the top portion of the spring by means of the positioning posts.

In an embodiment, in the movable spring, widening parts are provided on two sides in a width of the position corresponding to the through hole, respectively.

Compared with the prior art, the advantageous effects of the present disclosure are:

According to the present disclosure, the upper magnetizers are mounted above a preset position of the movable spring; the lower magnetizers capable of moving with the movable spring are mounted below the preset position of the movable spring; at least one through hole is provided in the movable spring at the preset position, so that the upper magnetizers and the lower magnetizers can approach one to another or come into contact with each other through the through holes; and at least two independent magnetically conductive loops are formed in the width direction of the movable spring by means of the upper magnetizers and the lower magnetizers. The increased magnetic pole faces of the respective magnetically conductive loops at the corresponding through holes are used such that when the movable spring has a large fault current, attraction force in a contact pressure direction is increased and stacked with the contact pressure to resist an electro-dynamic repulsion force generated, due to the fault current between the movable spring and the stationary contact leading-out terminals; and the short-circuit large current is basically and evenly divided by the independent magnetically conductive loops, the characteristics with the high magnetic efficiency and the magnetic circuit not easy to saturate are provided.

Further, according to the present disclosure, each of the magnetically conductive loops independent to one another is formed by the rectangular upper magnetizer and the U-shaped lower magnetizer in cooperation, such that the same parts can be used and the cost is low; and there are gaps between the U-shaped lower magnetizers; the rectangular upper magnetizer may be secured to the push rod component or fixed on the housing on which the two stationary contact leading-out terminals are mounted; Each of the U-shaped lower magnetizers is fixed in the movable spring by riveting, and the top end of the side wall of the U-shaped lower magnetizer exposes from the upper surface of the movable spring. In such structure of the present disclosure, a plurality of the magnetically conductive loops independent to one another are formed at a cross section of the movable spring by means of the upper magnetizers and the lower magnetizers, when the movable spring passes through the fault current, magnetic flux is generated on the plurality of the magnetically conductive loops, the attraction force is generated between the magnetizers of the magnetically conductive loops and is used to resist the electro-dynamic repulsion force between the contacts in a direction of increase of the contact pressure. Due to the use of a plurality of the magnetically conductive loops, the each loops passing through the contained fault current is Imax/n, such that the magnetically conductive loop is difficult to saturate, and the greater the current is, the greater the contact pressure increases and the greater the attraction force generated by the magnetically conductive loop is.

According to another aspect of the present disclosure, a DC relay having a function of extinguishing arc and resisting short-circuit current includes two stationary contact leading-out terminals, a straight sheet type movable spring, a push rod component and four permanent magnets. The movable spring is mounted on the push rod component, so that the movable contacts on the two ends of the movable spring are matched with the stationary contacts on the bottom ends of the two stationary contact leading-out terminals under the action of the push rod component. The four permanent magnets are respectively arranged on the two sides in the width direction of the movable spring corresponding to the movable and stationary contacts. The magnetic poles on a side facing to the movable and stationary contacts of the two permanent magnets corresponding to the same pair of the movable and stationary contacts are opposite; and the two permanent magnets corresponding to the same side in the width the movable springs have opposite magnetic poles on a side facing to the corresponding movable and stationary contacts; and a yoke clip is connected between the two permanent magnets corresponding to the same pair of the movable and stationary contacts. The upper magnetizers arranged in a width direction of the movable spring are mounted above the position between the movable contacts of the movable spring; the lower magnetizers arranged in the width direction of the movable spring and capable of moving with the movable spring are mounted below the position; at least one through hole is provided in the movable spring at the position, so that the upper magnetizers and the lower magnetizers can approach one to another or come into contact with each other through the through holes; and at least two independent magnetically conductive loops are formed in the width direction of the movable spring by the upper magnetizers and the lower magnetizers. The increased magnetic pole faces of the respective magnetically conductive loops at the corresponding through holes are used such that when the movable spring has a large fault current, attraction force in a contact pressure direction is generated to resist an electro-dynamic repulsion force generated, due to the fault current between the movable spring and the stationary contact leading-out terminals.

In an embodiment, the two permanent magnets corresponding to the same pair of the movable and stationary contacts are arranged at an offset position relative to the same pair of the movable and stationary contacts, and the two permanent magnets are arranged in a staggered manner.

Compared with the prior art, the advantageous effects of the present disclosure are: the four permanent magnets are respectively arranged on the two sides in the width direction of the movable spring corresponding to the movable and stationary contacts. The magnetic poles on a side facing to the movable and stationary contacts of the two permanent magnets corresponding to the same pair of the movable and stationary contacts are opposite; and the two permanent magnets corresponding to the same side in the width the movable springs have opposite magnetic poles on a side facing to the corresponding movable and stationary contacts; and a yoke clip is connected between the two permanent magnets corresponding to the same pair of the movable and stationary contacts; the upper magnetizers are mounted above the position between the movable contacts of the movable spring; the lower magnetizers capable of moving with the movable spring are mounted below the position; at least one through hole is provided in the movable spring at the position, so that the upper magnetizers and the lower magnetizers can approach one to another or come into contact with each other through the through holes; and at least two independent magnetically conductive loops are formed in the width direction of the movable spring by the upper magnetizers and the lower magnetizers. According to such structure of the present disclosure, on the basis that arc extinguishing can be achieved by using the four permanent magnets, the increased magnetic pole faces of the respective magnetically conductive loops at the corresponding through holes are used such that when the movable spring has a large fault current, the attraction force in a contact pressure direction is stacked with the contact pressure to resist an electro-dynamic repulsion force generated, due to the fault current between the movable spring and the stationary contact leading-out terminals; and the short-circuit large current is basically and evenly divided by the independent magnetically conductive loops, the characteristics with the high magnetic efficiency and the magnetic circuit not easy to saturate are provided.

According to another aspect of the present disclosure, a DC relay capable of extinguishing arc and resisting short-circuit current includes two stationary contact leading-out terminals, a straight sheet type movable spring, a push rod component and two permanent magnets. The movable spring is mounted on the push rod component, so that the movable contacts on the two ends of the movable spring are matched with the stationary contacts on the bottom ends of the two stationary contact leading-out terminals under the action of the push rod component. The two permanent magnets are respectively arranged on the two sides in the width direction of the movable spring corresponding to the movable and stationary contacts. The movable and stationary contacts corresponding to the two permanent magnets are different. Each of the two permanent magnets is connected to one yoke clip that is L-shaped, the L-shaped yoke clip has one end connected to a side of the corresponding magnet facing away from the movable and stationary contact, and the other end at a position outside the two ends in the length direction of the movable spring. The upper magnetizers arranged in a width direction of the movable spring are mounted above the position between the movable contacts of the movable spring; the lower magnetizers arranged in the width direction of the movable spring and capable of moving with the movable spring are mounted below the position; at least one through hole is provided in the movable spring at the position, so that the upper magnetizers and the lower magnetizers can approach one to another or come into contact with each other through the through holes; and at least two independent magnetically conductive loops are formed in the width direction of the movable spring by the upper magnetizers and the lower magnetizers. The increased magnetic pole faces of the respective magnetically conductive loops at the corresponding through holes are used such that when the movable spring has a large fault current, attraction force in a contact pressure direction is generated to resist an electro-dynamic repulsion force generated, due to the fault current between the movable spring and the stationary contact leading-out terminals.

In an embodiment, the two permanent magnets are respectively arranged at positions directly opposite to the movable and stationary contacts.

In an embodiment, the magnetic poles of the two permanent magnets facing to the movable and stationary contacts are the same.

In an embodiment, the magnetic poles of the two permanent magnets facing to the movable and stationary contacts are opposite.

Compared with the prior art, the advantageous effects of the present disclosure are that: the two permanent magnets are respectively arranged on the two sides in the width direction of the movable spring corresponding to the movable and stationary contacts; and the movable and stationary contacts corresponding to the two permanent magnets are different. Each of the two permanent magnets is connected to one yoke clip that is L-shaped, the L-shaped yoke clip has one end connected to a side of the corresponding magnet facing away from the movable and stationary contact, and the other end at a position outside the two ends in the length direction of the movable spring. The upper magnetizers arranged in a width direction of the movable spring are mounted above the position between the movable contacts of the movable spring; the lower magnetizers arranged in the width direction of the movable spring and capable of moving with the movable spring are mounted below the position; at least one through hole is provided in the movable spring at the position, so that the upper magnetizers and the lower magnetizers can approach one to another or come into contact with each other through the through holes; and at least two independent magnetically conductive loops are formed in the width direction of the movable spring by the upper magnetizers and the lower magnetizers. According to such structure of the present disclosure, on the basis that arc extinguishing can be achieved by using the four permanent magnets, the increased magnetic pole faces of the respective magnetically conductive loops at the corresponding through holes are used such that when the movable spring has a large fault current, the attraction force in a contact pressure direction is stacked with the contact pressure to resist an electro-dynamic repulsion force generated, due to the fault current between the movable spring and the stationary contact leading-out terminals; and since the short-circuit large current is basically and evenly divided by the independent magnetically conductive loops, the characteristics with the high magnetic efficiency and the magnetic circuit not easy to saturate are provided.

According to another aspect of the present disclosure, a DC relay capable of extinguishing arc and resisting short-circuit current includes two stationary contact leading-out terminals, a straight sheet type movable spring, a push rod component and four permanent magnets. The movable spring is mounted on the push rod component, so that the movable contacts on the two ends of the movable spring are matched with the stationary contacts on the bottom ends of the two stationary contact leading-out terminals under the action of the push rod component. The four permanent magnets are respectively arranged on the two sides in the width direction of the movable spring corresponding to the movable and stationary contacts. The two permanent magnets corresponding to the same side in the width the movable springs have same magnetic poles on a side facing to the movable and stationary contacts; and a yoke clip is connected between the two permanent magnets corresponding to the same pair of the movable and stationary contacts. The upper magnetizers arranged in a width direction of the movable spring are mounted above the position between the movable contacts of the movable spring; the lower magnetizers arranged in the width direction of the movable spring and capable of moving with the movable spring are mounted below the position; at least one through hole is provided in the movable spring at the position, so that the upper magnetizers and the lower magnetizers can approach one to another or come into contact with each other through the through holes; and at least two independent magnetically conductive loops are formed in the width direction of the movable spring by the upper magnetizers and the lower magnetizers. The increased magnetic pole faces of the respective magnetically conductive loops at the corresponding through holes are used such that when the movable spring has a large fault current, attraction force in a contact pressure direction is generated to resist an electro-dynamic repulsion force generated, due to the fault current between the movable spring and the stationary contact leading-out terminals.

In an embodiment, the four permanent magnets are respectively arranged at positions facing to the movable and stationary contacts.

In an embodiment, among the four permanent magnets, the two permanent magnets corresponding to the same side in the width the movable springs have same magnetic poles on a side facing to the movable and stationary contacts.

In an embodiment, among the four permanent magnets, the two permanent magnets corresponding to the same side in the width the movable springs have opposite magnetic poles on a side facing to the corresponding movable and stationary contacts.

Compared with the prior art, the advantageous effects of the present disclosure are that the four permanent magnets are respectively arranged on the two sides in the width direction of the movable spring corresponding to the movable and stationary contacts; the two permanent magnets corresponding to the same side in the width the movable springs have same magnetic poles on a side facing to the movable and stationary contacts; and a yoke clip is connected between the two permanent magnets corresponding to the same pair of the movable and stationary contacts; the upper magnetizers are mounted above the position between the movable contacts of the movable spring; and the lower magnetizers capable of moving with the movable spring are mounted below the position; at least one through hole is provided in the movable spring at the position, so that the upper magnetizers and the lower magnetizers can approach one to another or come into contact with each other through the through holes; and at least two independent magnetically conductive loops are formed in the width direction of the movable spring by the upper magnetizers and the lower magnetizers. According to such structure of the present disclosure, on the basis that arc extinguishing can be achieved by using the four permanent magnets, the increased magnetic pole faces of the respective magnetically conductive loops at the corresponding through holes are used such that when the movable spring has a large fault current, the attraction force in a contact pressure direction is stacked with the contact pressure to resist an electro-dynamic repulsion force generated, due to the fault current between the movable spring and the stationary contact leading-out terminals; and the short-circuit large current is basically and evenly divided by the independent magnetically conductive loops, the characteristics with the high magnetic efficiency and the magnetic circuit not easy to saturate are provided.

According to another aspect of the present disclosure, a DC relay capable of extinguishing arc and resisting short-circuit current includes two stationary contact leading-out terminals, a straight sheet type movable spring, a push rod component and two permanent magnets. The movable spring is mounted on the push rod component, so that the movable contacts on the two ends of the movable spring are matched with the stationary contacts on the bottom ends of the two stationary contact leading-out terminals under the action of the push rod component. The two permanent magnets are respectively arranged at position corresponding to the movable and stationary contacts outside the two ends in the length direction of the movable spring, and the magnetic poles on the sides opposite to each other of the two permanent magnets are opposite. The two permanent magnets are also connected to two yoke clips that include at least yoke sections on the two sides in the width direction of the movable spring corresponding to the movable and stationary contacts. The upper magnetizers arranged in a width direction of the movable spring are mounted above the position between the movable contacts of the movable spring; the lower magnetizers arranged in the width direction of the movable spring and capable of moving with the movable spring are mounted below the position; at least one through hole is provided in the movable spring at the position, so that the upper magnetizers and the lower magnetizers can approach one to another or come into contact with each other through the through holes; and at least two independent magnetically conductive loops are formed in the width direction of the movable spring by the upper magnetizers and the lower magnetizers. The increased magnetic pole faces of the respective magnetically conductive loops at the corresponding through holes are used such that when the movable spring has a large fault current, attraction force in a contact pressure direction is generated to resist an electro-dynamic repulsion force generated, due to the fault current between the movable spring and the stationary contact leading-out terminals.

In an embodiment, the two permanent magnets are respectively arranged at positions directly opposite to the movable and stationary contacts.

In an embodiment, the yoke clip is U-shaped, the U-shaped bottom walls of the two yoke clips are connected to the sides of the two permanent magnets facing back to one another, and the end portions of the two U-shaped side walls of the two yoke clips constitute corresponding yoke sections.

In an embodiment, the yoke clip is U-shaped, the U-shaped bottom walls of the two yoke clips are respectively connected to the sides of the two permanent magnets facing back to each other, and the end heads of the two U-shaped side walls of the two yoke clips respectively exceed the positions of the two sides in the width direction of the movable spring corresponding to the movable and stationary contacts; the two yoke sections are included in the two U-shaped side walls of the two yoke clips.

In an embodiment, the yoke clip is U-shaped, the U-shaped bottom walls of the two yoke clips are respectively fitted on two sides in the width direction of the movable spring, and the end heads of the U-shaped side walls of the two yoke clips are connected to the sides of the two permanent magnets facing bake to each other.

Compared with the prior art, the advantageous effects of the present disclosure are that the two permanent magnets are respectively arranged at position corresponding to the movable and stationary contacts outside the two ends in the length direction of the movable spring, and the magnetic poles on the sides opposite to each other of the two permanent magnets are opposite. The two permanent magnets are also connected to two yoke clips that include at least yoke sections on the two sides in the width direction of the movable spring corresponding to the movable and stationary contacts; and the upper magnetizers are mounted above the position between the movable contacts of the movable spring; and the lower magnetizers capable of moving with the movable spring are mounted below the position; at least one through hole is provided in the movable spring at the position, so that the upper magnetizers and the lower magnetizers can approach one to another or come into contact with each other through the through holes; and at least two independent magnetically conductive loops are formed in the width direction of the movable spring by the upper magnetizers and the lower magnetizers. According to such structure of the present disclosure, on the basis that arc extinguishing can be achieved by using the four permanent magnets, the increased magnetic pole faces of the respective magnetically conductive loops at the corresponding through holes are used such that when the movable spring has a large fault current, the attraction force in a contact pressure direction is stacked with the contact pressure to resist an electro-dynamic repulsion force generated, due to the fault current between the movable spring and the stationary contact leading-out terminals; and the short-circuit large current is basically and evenly divided by the independent magnetically conductive loops, the characteristics with the high magnetic efficiency and the magnetic circuit not easy to saturate are provided.

According to another aspect of the present disclosure, a DC relay having a function of extinguishing arc and resisting short-circuit current includes two stationary contact leading-out terminals, a straight sheet type movable spring, a push rod component and four permanent magnets. The movable spring is mounted on the push rod component, so that the movable contacts on the two ends of the movable spring are matched with the stationary contacts on the bottom ends of the two stationary contact leading-out terminals under the action of the push rod component. The four permanent magnets are respectively arranged on the two sides in the width direction of the movable spring corresponding to the movable and stationary contacts. The magnetic poles on a side facing to the movable and stationary contacts of the two permanent magnets corresponding to the same pair of the movable and stationary contacts are opposite; and the magnetic poles on a side facing to the corresponding movable and stationary contacts of two permanent magnets on the same side in the width the movable springs are also set to be the same; and a yoke clip is connected between the two permanent magnets corresponding to the same pair of the movable and stationary contacts. The upper magnetizers arranged in a width direction of the movable spring are mounted above the position between the movable contacts of the movable spring; the lower magnetizers arranged in the width direction of the movable spring and capable of moving with the movable spring are mounted below the position; at least one through hole is provided in the movable spring at the position, so that the upper magnetizers and the lower magnetizers can approach one to another or come into contact with each other through the through holes; and at least two independent magnetically conductive loops are formed in the width direction of the movable spring by the upper magnetizers and the lower magnetizers. The increased magnetic pole faces of the respective magnetically conductive loops at the corresponding through holes are used such that when the movable spring has a large fault current, attraction force in a contact pressure direction is generated to resist an electro-dynamic repulsion force generated, due to the fault current between the movable spring and the stationary contact leading-out terminals.

In an embodiment, the four permanent magnets are respectively arranged at positions facing to the movable and stationary contacts.

In an embodiment, among the four permanent magnets, magnetic poles of the two permanent magnets on the left side in a current flow direction of the movable spring facing the corresponding movable and stationary contacts are set as N poles.

Compared with the prior art, the advantageous effect of the present disclosure are that the four permanent magnets are respectively arranged on the two sides in the width direction of the movable spring corresponding to the movable and stationary contacts. The magnetic poles on a side facing to the movable and stationary contacts of the two permanent magnets corresponding to the same pair of the movable and stationary contacts are opposite; and the magnetic poles on a side facing to the corresponding movable and stationary contacts of two permanent magnets on the same side in the width the movable springs are also set to be opposite; and a yoke clip is connected between the two permanent magnets corresponding to the same pair of the movable and stationary contacts. The upper magnetizers arranged in a width direction of the movable spring are mounted above the position between the movable contacts of the movable spring; the lower magnetizers arranged in the width direction of the movable spring and capable of moving with the movable spring are mounted below the position; at least one through hole is provided in the movable spring at the position, so that the upper magnetizers and the lower magnetizers can approach one to another or come into contact with each other through the through holes; and at least two independent magnetically conductive loops are formed in the width direction of the movable spring by the upper magnetizers and the lower magnetizers. According to such structure of the present disclosure, on the basis that arc extinguishing can be achieved by using the four permanent magnets, the increased magnetic pole faces of the respective magnetically conductive loops at the corresponding through holes are used such that when the movable spring has a large fault current, the attraction force in a contact pressure direction is stacked with the contact pressure to resist an electro-dynamic repulsion force generated, due to the fault current between the movable spring and the stationary contact leading-out terminals; and since the short-circuit large current is basically and evenly divided by the independent magnetically conductive loops, the characteristics with the high magnetic efficiency and the magnetic circuit not easy to saturate are provided.

The present disclosure will be further described in detail below with reference to the drawings and embodiments; however, the DC relay resistant to short-circuit current of the present disclosure is not limited to the embodiments.

DETAILED DESCRIPTION

Figure 1:
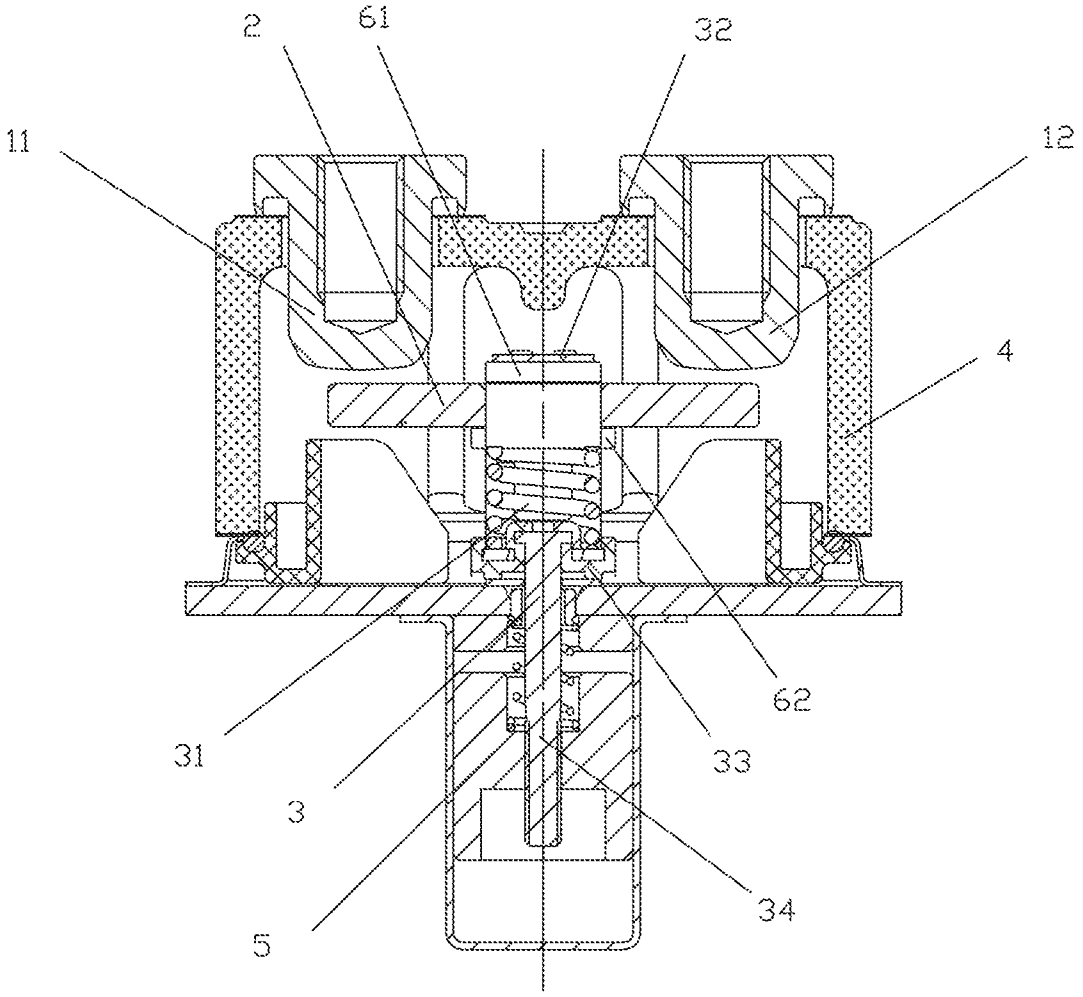
FIG. 1 is a cross-sectional view of a partial structure (corresponding to a section along a length of the movable spring) according to the first embodiment of the present disclosure.

Now, the exemplary implementations will be described more completely with reference to the accompanying drawings. However, the exemplary implementations can be done in various forms and should not be construed as limiting the implementations as set forth herein. Although relative terms such as "above" and "under" are used herein to describe the relationship of one component relative to another component, such terms are used herein only for the sake of convenience, for example, in the direction shown in the figure, it should be understood that if the referenced device is inversed upside down, a component described as "above" will become a component described as "under". When a structure is described as "above" another structure, it probably means that the structure is integrally formed on another structure, or, the structure is "directly" disposed on another structure, or, the structure is "indirectly" disposed on another structure through an additional structure.

Exemplary embodiments will now be described more fully by reference to the accompanying drawings. However, the exemplary embodiments can be implemented in various forms and should not be understood as being limited to the examples set forth herein; rather, the embodiments are provided so that this disclosure will be thorough and complete, and the conception of exemplary embodiments will be fully conveyed to those skilled in the art. The same reference signs in the drawings denote the same or similar structures and detailed description thereof will be omitted.

The First Embodiment

Referring to FIGS. 1 to 11, a DC relay resistant to short-circuit current of the present disclosure includes two stationary contact leading-out terminals 11 and 12 respectively for current inflow and current outflow, and a straight sheet type movable spring 2 and a push rod component 3 for driving the movement of the movable spring 2 so as to realize that the movable contacts on the two ends of the movable spring are contacted with or separated from stationary contacts on the bottom end of the stationary contact leading-out terminals. The two stationary contact leading-out terminals 11, 12 are respectively mounted on a housing 4. The movable spring 2 and a portion of the push rod component 3 are received in the housing 4. The push rod component 3 is also connected with a movable iron core 5 in a magnetic circuit structure. Under the action of the magnetic circuit, the push rod component 3 drives the movable spring 2 to move upward, so that movable contacts on the two ends of the movable spring 2 are in contact with the stationary contacts on the bottom ends of the two stationary contact leading-out terminals 11 and 12 respectively, so as to realize a communication load. The movable spring 2 is mounted in the push rod component 3 by means of a spring 31 such that the movable spring 2 can be displaced relative to the push rod component 3 (to achieve over-travel of the contacts). An upper magnetizer 61 is mounted above a preset position of the movable spring 2. In this embodiment, the upper magnetizer 61 is an upper armature, and a lower magnetizer 62 capable of moving along with the movable spring is mounted below a preset position of the movable spring 2. In this embodiment, the lower magnetizer 62 is a lower armature. In this embodiment, the upper magnetizer 61 is secured to the push rod component 3, and the lower magnetizer 62 is secured to the movable spring 2. At least one through hole 22 is provided in the movable spring at the preset position, so that the upper magnetizer 61 and the lower magnetizer 62 can approach one to another or come into contact with each other through the through hole 22. At least two independent magnetically conductive loops are formed in a width of the movable spring 2 by means of the upper magnetizer 61 and the lower magnetizer 62. The increased magnetic pole faces of the respective magnetically conductive loops at the corresponding through holes are used such that when the movable spring 2 has a large fault current, an attraction force in a contact pressure direction is generated to resist an electro-dynamic repulsion force generated, due to the fault current between the movable spring and the stationary contact leading-out terminals. Wherein the upper magnetizer and the lower magnetizer may be made of iron, cobalt, nickel, alloy thereof and other materials.

The so-called "two independent magnetically conductive loops" refers to that the two magnetically conductive loops cannot interfere with each other, that is, there is no situation that magnetic fluxes are canceled with each other.

The preset position is between two movable contacts in the width direction of the movable spring. In this embodiment, the preset position is approximately a middle 21 in the width direction of the movable spring 2.

Figure 10:
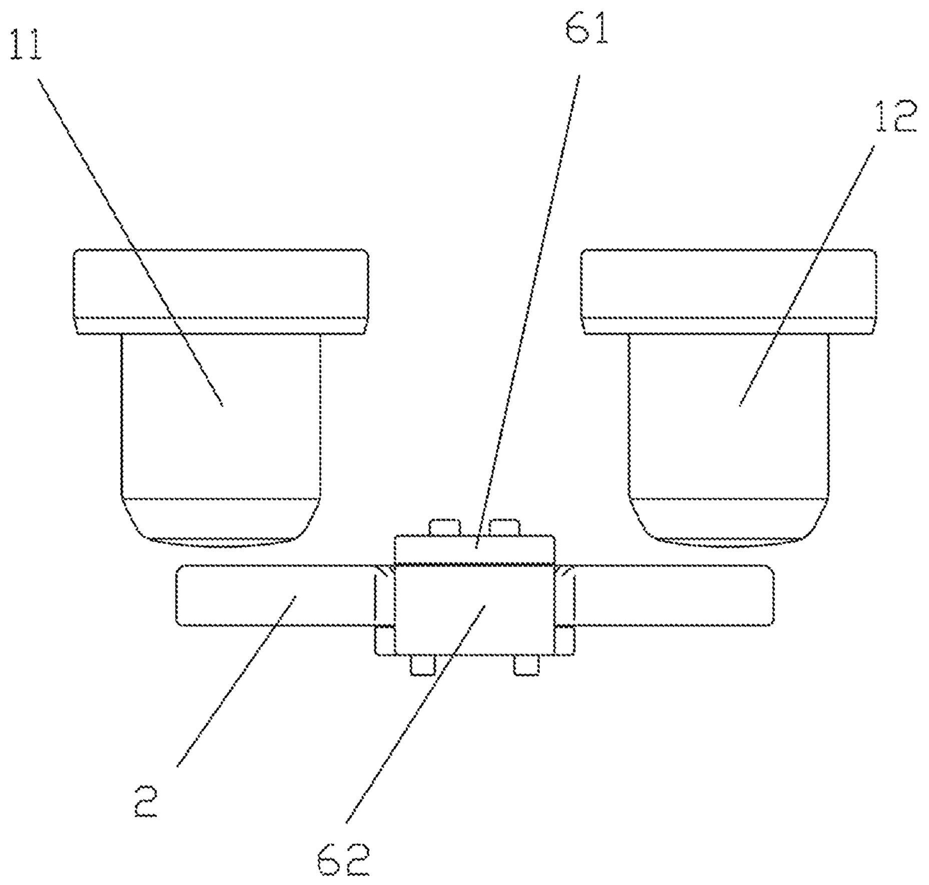
FIG. 10 is a schematic view of the cooperation of stationary contact leading-out terminals and the movable spring when contacts are separated from one another according to the first embodiment of the present disclosure.
Figure 11:
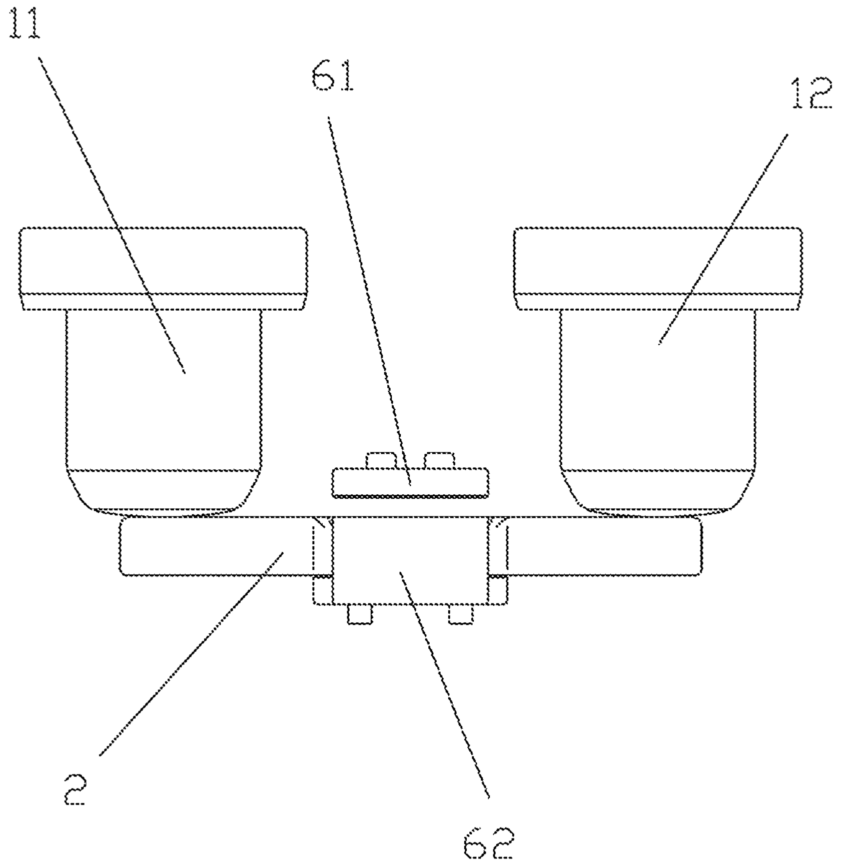
FIG. 11 is a schematic view of the cooperation of the stationary contact leading-out terminals and the movable spring when the contacts are in contact with each other according to the first embodiment of the present disclosure.

In this embodiment, as shown in FIGS. 10 and 11, since the upper magnetizer 61 is secured to the push rod component 3, the lower magnetizer 62 is secured to the movable spring 2, and the movable spring 2 is mounted in the push rod component 3 by means of a spring 31. When the movable contact of the movable spring 2 is in contact with the stationary contacts of the stationary contact leading-out terminals 11 and 12, there is a preset gap between the upper magnetizer 61 and the lower magnetizer 62, in this end, there is a magnetic gap in the magnetically conductive loop.

The upper magnetizer comprises at least one rectangular upper magnetizer, and the lower magnetizer comprises at least two U-shaped lower magnetizers; wherein the one U-shaped lower magnetizer and the corresponding rectangular upper magnetizer form an independent magnetically conductive loop, and the two U-shaped lower magnetizers of two adjacent ones of the magnetically conductive loops are not in contact with each other.

In this embodiment, there are two magnetically conductive loops, and each of the two magnetically conductive loops is formed by one rectangular upper magnetizer 61 and one U-shaped lower magnetizer 62 in cooperation. The two rectangular upper magnetizers 61 are respectively secured to the push rod component 3 in a riveting or welding manner. The two U-shaped lower magnetizers 62 are respectively secured to the movable spring 2 in a riveting manner. The top ends of the side walls of the two U-shaped lower magnetizers 62 are exposed on an upper surface of the movable spring.

In this embodiment, the through hole 22 of the movable spring 2 is configured to allow the side walls of the two U-shaped lower magnetizers to pass therethrough.

Figure 9:
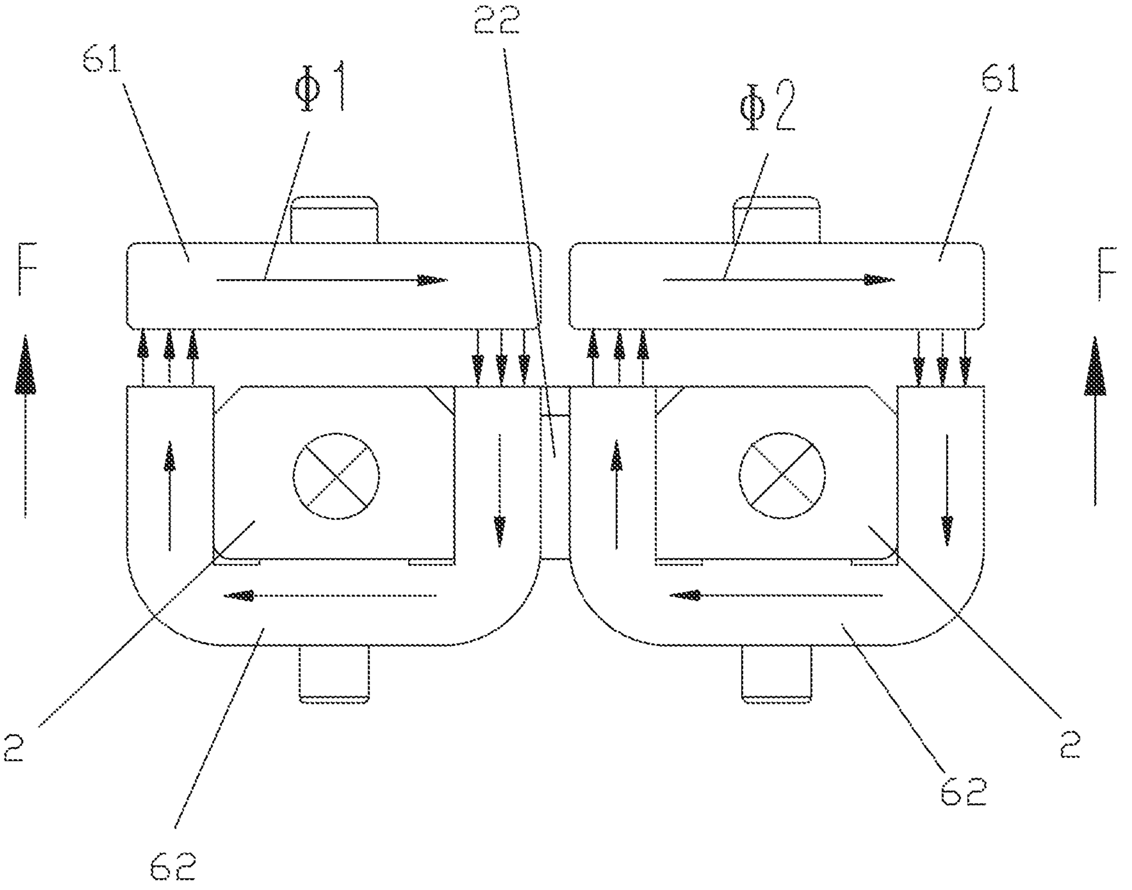
FIG. 9 is a schematic view of a dual magnetically conductive loop according to the first embodiment of the present disclosure.

In this embodiment, there are two magnetically conductive loops, that is, a magnetically conductive loop Φ1 and a magnetically conductive loop Φ2 (as shown in FIG. 9). The two rectangular upper magnetizers 61 are secured to the push rod component 3, and there is a certain gap between the two rectangular upper magnetizers 61. Each of the two U-shaped lower magnetizers 62 has one side walls 621 attached to the side in a width of the movable spring 2, and the other side wall 622 passing through the through hole 22 of the movable spring. There is a gap between the other side walls 622 of the two U-shaped lower magnetizers, so that the magnetic fluxes of the two magnetically conductive loops cannot be canceled from one another.

In this embodiment, the top ends of the side walls of the U-shaped lower magnetizer are substantially flush with the upper surface of the movable spring, that is, the top ends of the side wall 621 and the side wall 622 of the U-shaped lower magnetizer 62 are substantially flush with the upper surface of the movable spring.

In this embodiment, in the movable spring 2, widening parts 23 are respectively provided on two sides in the width corresponding to the through hole.

Referring to FIG. 9, since the present disclosure has more than two magnetically conductive loops. The two U-shaped lower magnetizers 62 totally have four side walls (that is, two side walls 621 and two side walls 622). The top ends of the four side walls of the two lower magnetizers are cooperated with the upper magnetizers 61, that is, the two U-shaped lower magnetizers 62 have four magnetic pole faces, in comparison with only one magnetically conductive loop with only two magnetic pole faces, under the condition that the structural characteristics of the lower magnetizer 62 remain unchanged, two magnetic pole faces are increased (the two magnetic pole faces at the through hole are increased), thereby improving the magnetic efficiency and increasing the attraction force. When the movable spring 2 has a large fault current, the two independent magnetically conductive loops, namely the magnetically conductive loop Φ1 and the magnetically conductive loop Φ2, generate a suction force F to resist the electro-dynamic repulsion force generated, due to the fault current between the movable spring and the stationary spring, so as to improve the capability of resisting the short-circuit current (fault current) greatly.

Figure 14:
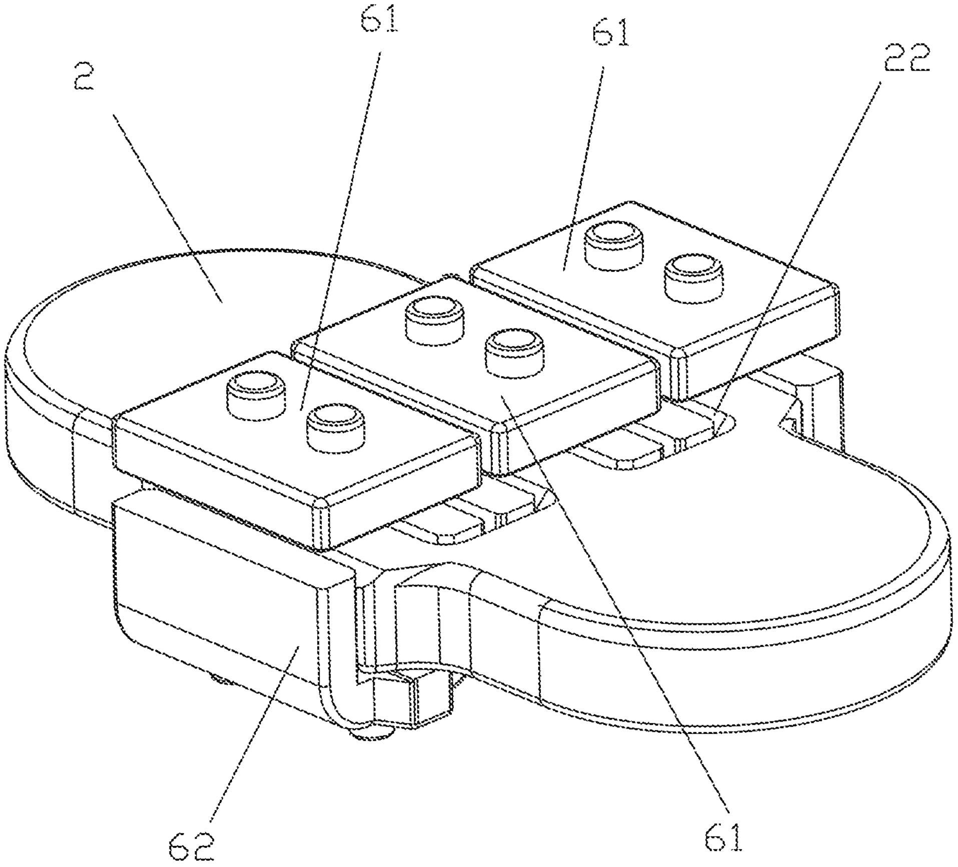
FIG. 14 is a three-dimensional schematic view of the cooperation of the upper magnetizers, the lower magnetizers and the movable springs according to the third embodiment of the present disclosure.

Restricted by the structural conditions, the magnetic cross section of the magnetically conductive loop is not enough, under the fault current, one magnetically conductive loop is very easy to saturate, and thus the suction force will no longer increase. The two magnetically conductive loops according to the embodiment of the present disclosure are equivalent to dividing a current flowing direction into two cross-sectional areas, each of the cross-sectional areas corresponds to a shunt current that is basically half of the fault current, so that the magnetically conductive loop cannot be magnetically saturated, the magnetic flux can increase, and the suction force as generated can also increase. In this case, the short-circuit current of the two magnetically conductive loops according to the present disclosure increases by one time of that of the one magnetically conductive loop in the prior art. According to the magnitude of the fault current and the magnetic cross-sectional area, the magnetically conductive loops may have N arrays, for example, FIG. 14 shows three magnetically conductive loops.

The push rod component 3 includes a U-shaped bracket 32, a spring seat 33, and a push rod 34. A top portion of the push rod 34 is secured to the spring seat 33, and the bottom portion of the push rod 34 is connected to the movable iron core 5. The bottom portion of the U-shaped bracket 32 is secured to the spring seat 33. The U-shaped bracket 32 and the spring seat 33 enclose a frame shape, and a movable spring assembly 20 composed of the movable spring 2 and two U-shaped lower magnetizers 62 20 (see FIG. 8) is installed in the frame formed by the U-shaped bracket and the spring seat 33 by means of the spring 31, wherein the upper surface of the movable spring 2 abuts against the inner wall of the top portion of the U-shaped bracket 32, and the spring 31 elastically abuts between the bottom ends of the two U-shaped lower magnetizers 62 and the top end of the spring seat 33.

Figure 8:
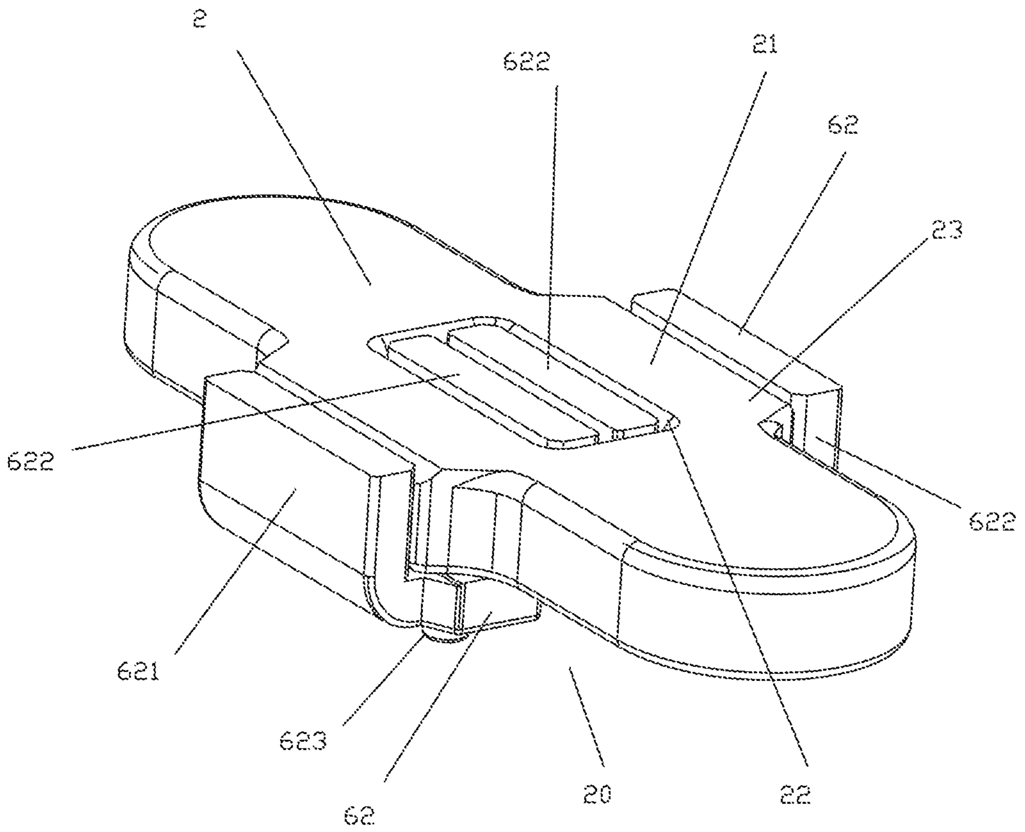
FIG. 8 is a schematic view of the cooperation of the movable spring and the lower magnetizers according to the first embodiment of the present disclosure.

In this embodiment, positioning posts 623 for positioning the springs are provided on the bottom ends of the two U-shaped lower magnetizers 62 respectively, so as to positioned the spring 31 outside of the top portion of the spring 31 by using the positioning posts 623 (see FIG. 8). An annular positioning groove 331 for positioning the bottom portion of the spring is provided on the spring seat 33 (see FIG. 4).

Of course, a positioning structure of the top portion of the spring may also be that semi-circular grooves for positioning the spring are provided on the bottom ends of the two U-shaped lower magnetizers, and the two semi-circular grooves are enclosed in a complete circle to fit on the top portion of the spring.

In this embodiment, the two U-shaped lower magnetizers are arranged side by side in the width direction of the movable spring. Of course, the two U-shaped lower magnetizers may also be arranged in a staggered manner in the width direction of the movable spring.

When the push rod component 3 does not move upward, the upper surface of the movable spring 2 abuts against the bottom surface of the rectangular upper magnetizer 61 under the action of the spring 31. When the push rod component 3 is moved to a proper position, the movable contacts on the two ends of the movable spring 2 are in contact with the two stationary contact leading-out terminals 11 and 12, respectively. Subsequently, the push rod component 3 continues to move upward, and the rectangular upper magnetizer 61 also continues to move upward in line with the push rod component 3, and sine the movable spring 2 has been in contact with the bottom ends of the two stationary contact leading-out terminals 11 and 12, the movable spring 2 cannot continue to move upwards, so that over-travel of the contacts can be achieved. The spring 31 provides contact pressure, and a curtain gap is formed between the bottom end of the rectangular upper magnetizer and the upper surface of the movable spring 2, and thus there is a magnetic gap between the bottom surface of the rectangular upper magnetizer 61 and the top surface of the U-shaped lower magnetizer 62.

The DC relay resistant to the short-circuit current according to the present disclosure is provided, in which the upper magnetizers 61 are mounted above a preset position of the movable spring 2; the lower magnetizers 62 capable of moving with the movable spring 2 are mounted below the preset position of the movable spring 2; the upper magnetizers 61 are secured to the push rod component 3, and the lower magnetizers 62 are secured to the movable spring 2; at least one through hole 22 is provided in the movable spring 2 at the preset position, so that the upper magnetizers 61 and the lower magnetizers 62 can approach one to another or come into contact with each other through the through holes 22; and at least two independent magnetically conductive loops are formed in the width direction of the movable spring 2 by means of the upper magnetizers 61 and the lower magnetizers 62. The increased magnetic pole faces of the respective magnetically conductive loops at the corresponding through holes are used such that when the movable spring has a large fault current, attraction force in a contact pressure direction is increased and stacked with the contact pressure to resist an electro-dynamic repulsion force generated, due to the fault current between the movable spring and the stationary contact leading-out terminals; and the short-circuit large current is basically and evenly divided by the independent magnetically conductive loops, the characteristics with the high magnetic efficiency and the magnetic circuit not easy to saturate are provided.

The DC relay resistant to short-circuit current of the present disclosure is provided, in which each of the magnetically conductive loops independent to one another is formed by the rectangular upper magnetizer and the U-shaped lower magnetizer in cooperation, such that the same parts can be used and the cost is low; and there are gaps between the lower magnetizers; the rectangular upper magnetizer is secured to the push rod component. Specifically, there are two magnetically conductive loops in this embodiment, that is, two rectangular upper magnetizers 61 and two U-shaped lower magnetizers 62, and there is a gap between the two rectangular upper magnetizers 61, and there is a gap between the two U-shaped lower magnetizers 62. Since each of the two U-shaped lower magnetizers 62 has a side wall 622 through the through hole 22 of the movable spring, in the through hole 22 of the movable spring, a gap between the side walls 622 of the two U-shaped lower magnetizers is required. Each of the rectangular upper magnetizers 61 is secured to the push rod component 3 in a riveting or welding manner, and each of the U-shaped lower magnetizers 62 is secured to the movable spring 2 in a riveting manner, and the top ends of the side walls of the U-shaped lower magnetizers 2 are exposed at the upper surface of the movable spring 2, thereby forming an increased magnetic pole face and increasing the suction force. According to such structure of the present disclosure, the movable spring 2 is divided into a plurality of cross-sectional areas, when the movable spring 2 passes through a fault current, a magnetic flux is generated on a plurality of magnetically conductive loops, and the suction force is generated between the magnetizers of the each of the magnetically conductive loops to resist the electro-dynamic repulsion force between the contact in a direction in which the contact pressure increases, and a plurality of magnetically conductive loops are used, the fault current contained in each circuit is only Imax/n, so that the magnetic circuit is not easy to saturate, the greater the current passes through, the greater the contact pressure increases, and the greater the attraction force generated by the magnetically conductive loop is.

The Second Embodiment

Figure 12:
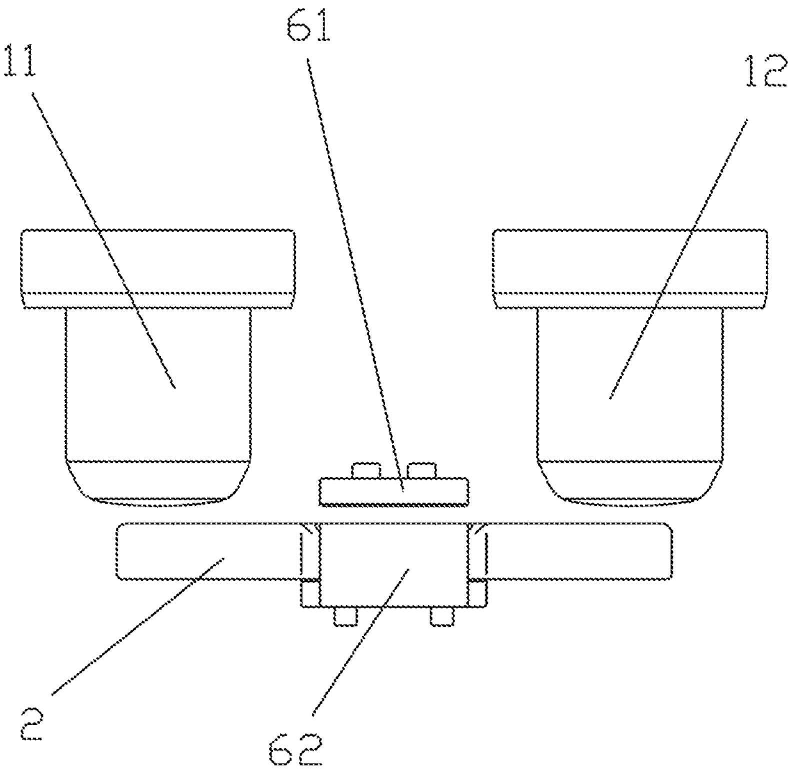
FIG. 12 is a schematic view of the cooperation of the stationary contact leading-out terminals and the movable spring when the contacts are separated from one another according to the second embodiment of the present disclosure.
Figure 13:
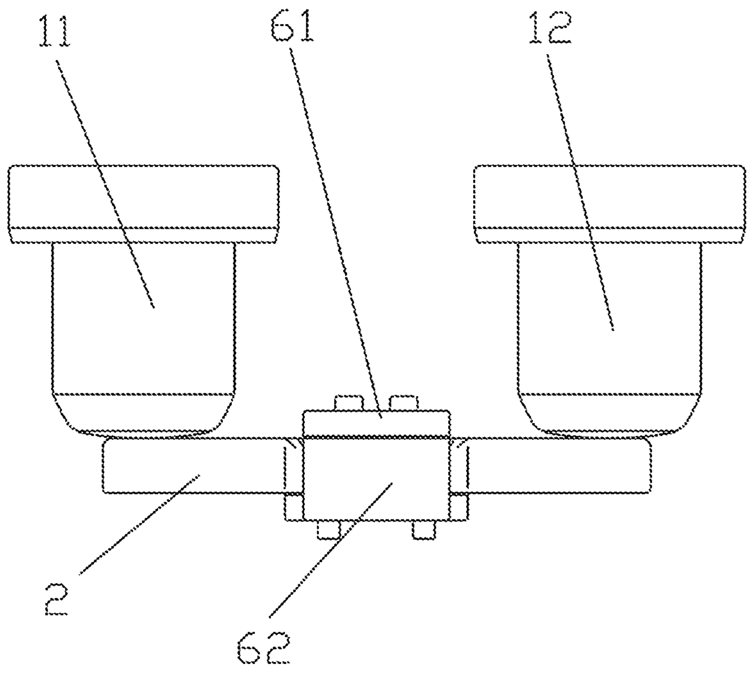
FIG. 13 is a schematic view of the cooperation of the stationary contact leading-out terminals and the movable spring when the contacts are in contact with each other according to the second embodiment of the present disclosure.

Referring to FIGS. 12 to 13, the difference of the DC relay resistant to short-circuit current in this embodiment relative to that of the first embodiment is that the upper magnetizer 61 is an upper yoke that is secured to the housing in which the two stationary contact leading-out terminals installed, in this way, when the movable contact of the movable spring 2 is not in contact with the stationary contacts of the stationary contact leading-out terminals 11, 12 (that is, the contacts are separated from one another), a preset gap is presented between the upper magnetizer 61 (i.e., the upper yoke) and the lower magnetizer 62 (i.e., the lower armature); and when the movable contact of the movable spring 2 is in contact with the stationary contacts of the stationary contact leading-out terminals 11 and 12, the upper magnetizer 61 is in contact with the lower magnetizer 62, that is, there is basically no gap between the upper magnetizer 61 and the lower magnetizer 62.

The Third Embodiment

Figure 15:
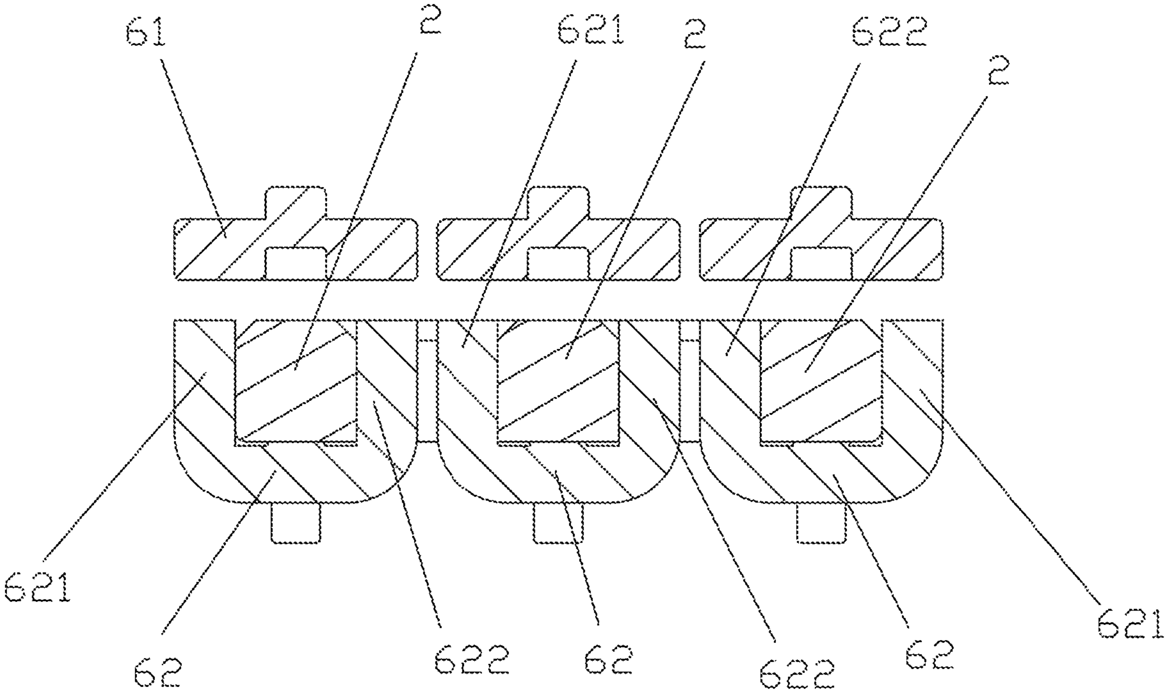
FIG. 15 is a cross-sectional view of the cooperation of the upper magnetizers, the lower magnetizers and the movable spring according to the third embodiment of the present disclosure.
Figure 16:
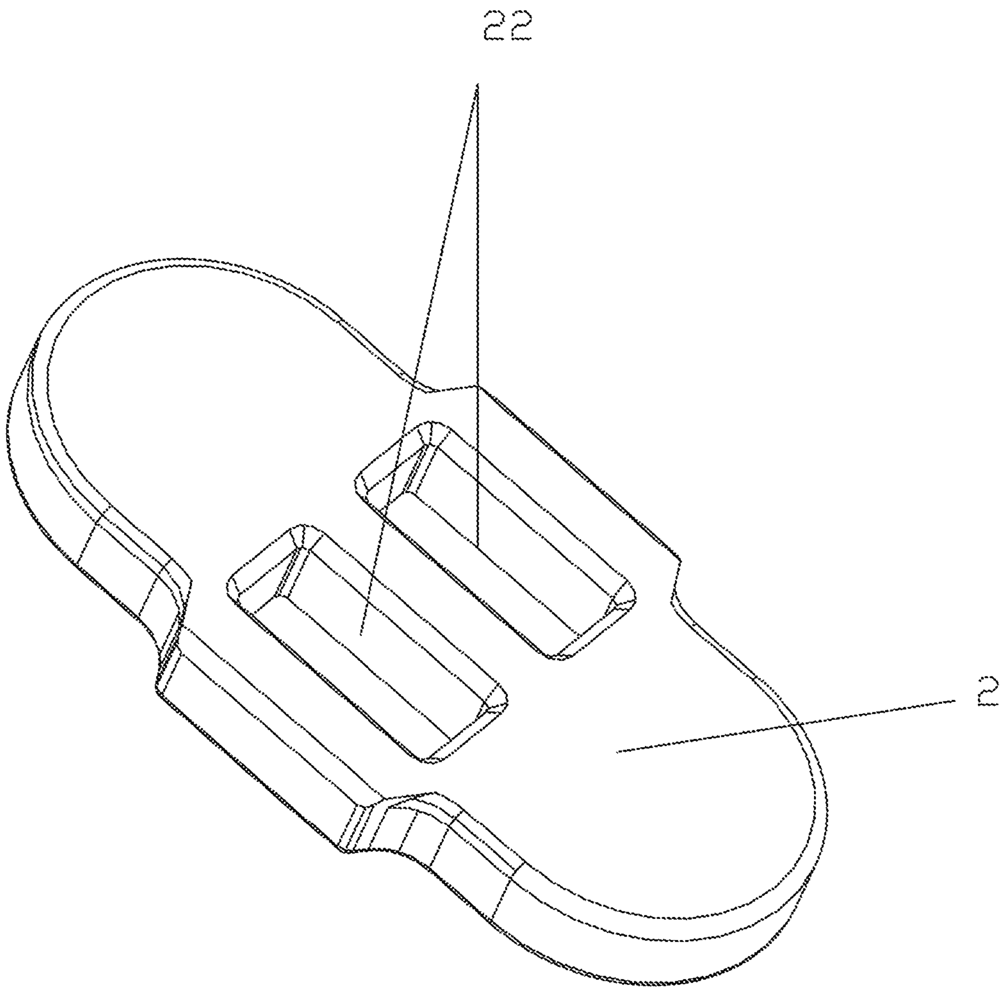
FIG. 16 is a structural schematic view of the movable spring according to the third embodiment of the present disclosure.
Figure 17:
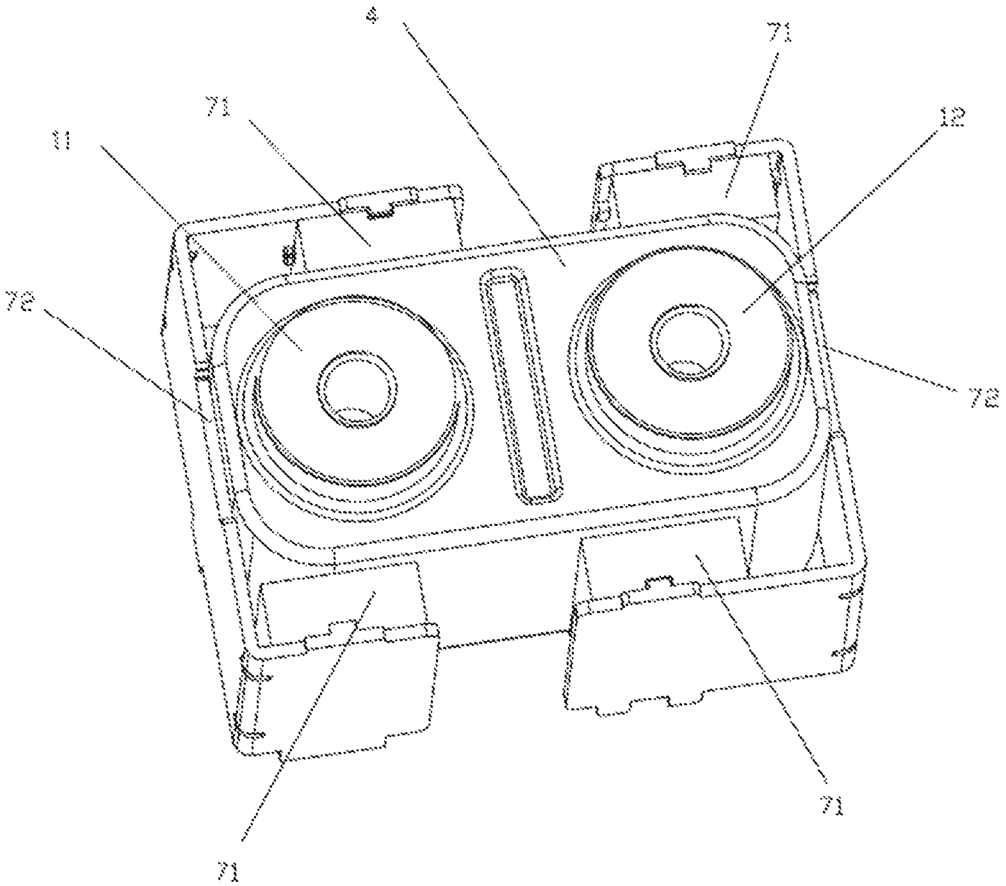
FIG. 17 is a schematic view of a partial structure of the fourth embodiment of the present disclosure.

Referring to FIGS. 14 to 16, the difference of the DC relay resistant to short-circuit current in this embodiment relative to that of the first embodiment is that there are three magnetically conductive loops; the movable spring 2 is provided with two through holes 22; the three U-shaped lower magnetizers 62 are sequentially arranged in the width direction of the movable spring 2, wherein two side walls 621, 622 of the U-shaped lower magnetizer 62 in the middle respectively pass through the two through holes 22 of the movable spring. The side wall 621 of each of the two U-shaped lower magnetizers 62 is attached to the corresponding side in the width direction of the movable spring, and the other side wall 622 of each of the two U-shaped lower magnetizers 62 passes through the through hole of the movable spring, and there is a gap between the side walls 622 of the two U-shaped lower magnetizers 62 within the same through hole 22 in the movable spring 2.

The Fourth Embodiment

Figure 18:
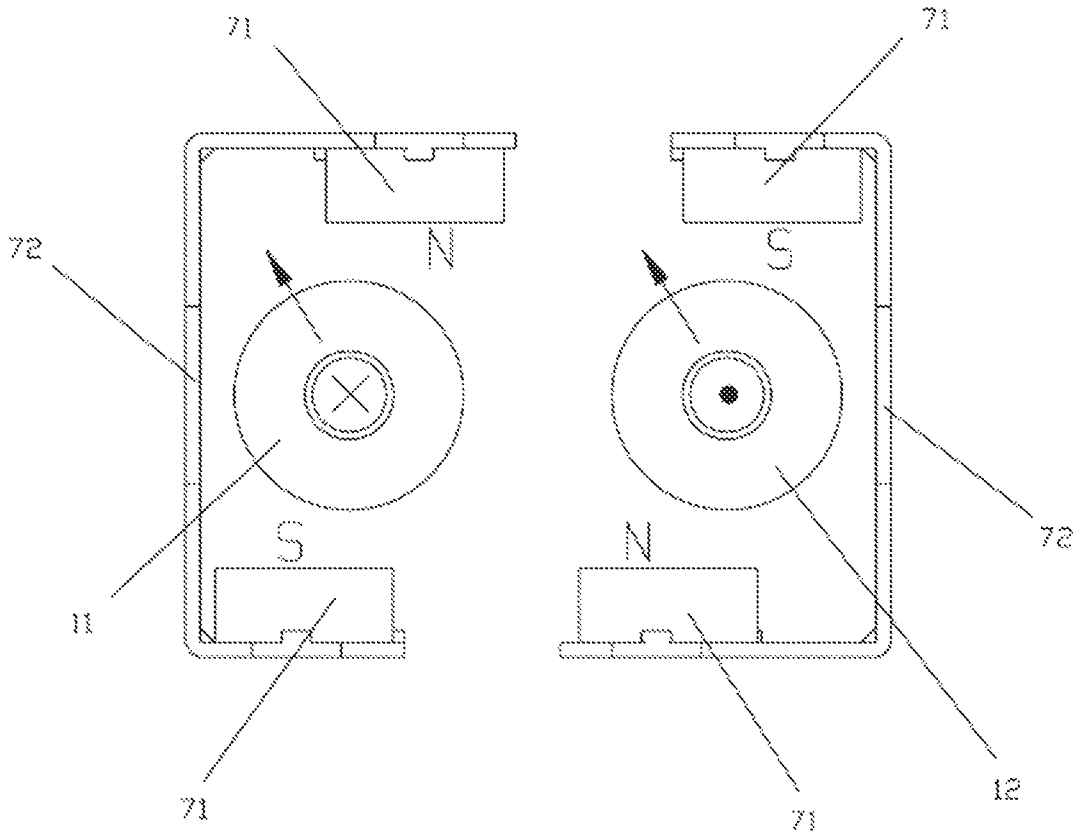
FIG. 18 is a schematic view showing distribution of permanent magnets according to the fourth embodiment of the present disclosure.
Figure 19:
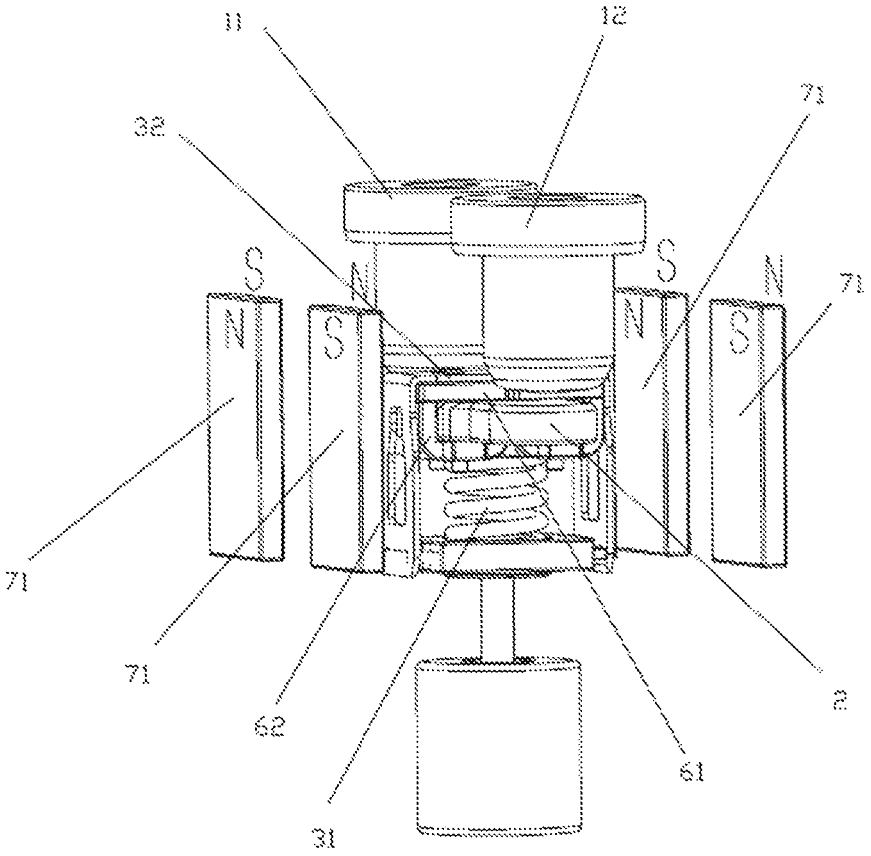
FIG. 19 is a schematic view showing a permanent magnet with an arc extinguishing structure (a yoke clip is not shown) according to the fourth embodiment of the present disclosure.
Figure 20:
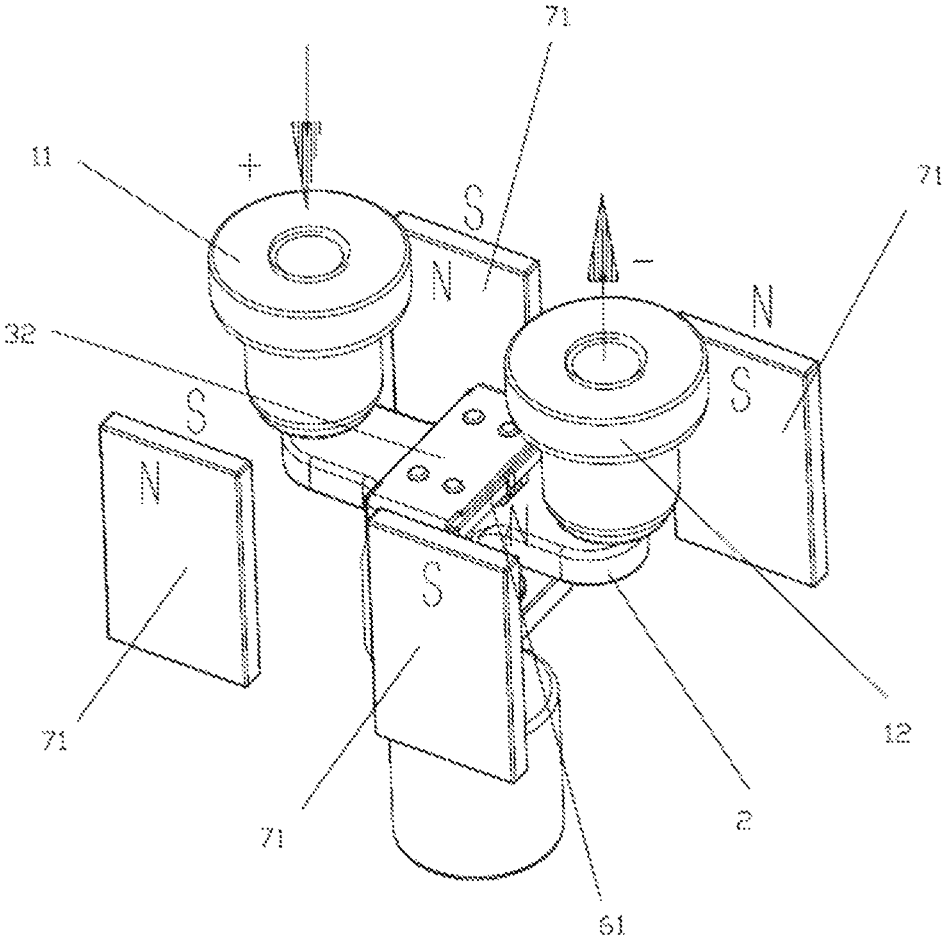
FIG. 20 is a schematic view showing that the permanent magnet with the arc extinguishing structure is rotated by an angle (the yoke clip is not shown) according to the fourth embodiment of the present disclosure.

Referring to FIGS. 17 to 20, a DC relay having a function of extinguishing arc and resisting short-circuit current of the present disclosure includes two stationary contact leading-out terminals 11 and 12 respectively for current inflow and current outflow, and a straight sheet type movable spring 2, a push rod component 3 for driving the movement of the movable spring 2 so as to realize that the movable contacts on the two ends of the movable spring are contacted with or separated from stationary contacts on the bottom end of the stationary contact leading-out terminals, and four permanent magnets 71. The two stationary contact leading-out terminals 11, 12 are respectively mounted on a housing 4. The movable spring 2 and a portion of the push rod component 3 (see FIG. 4) are received in the housing 4. The push rod component 3 is also connected with a movable iron core 5 in a magnetic circuit structure. Under the action of the magnetic circuit, the push rod component 3 drives the movable spring 2 to move upward, so that movable contacts on the two ends of the movable spring 2 are in contact with the stationary contacts on the bottom ends of the two stationary contact leading-out terminals 11 and 12 respectively, so as to realize a communication load. The movable spring 2 is mounted in the push rod component 3 by means of a spring 31 such that the movable spring 2 can be displaced relative to the push rod component 3 (to achieve over-travel of the contacts). The four permanent magnets 71 are outside the housing 4 and are respectively arranged on the two sides in the width direction of the movable spring 2 corresponding to the movable and stationary contacts, and the magnetic poles on the face of the two permanent magnets 71 facing to the movable and stationary contacts corresponding to the same pair of movable and stationary contacts are set to be opposite, and the magnetic poles on the face of the of the two permanent magnets 71 facing to the corresponding movable and stationary contacts corresponding to the same side in the width direction of the movable spring 2 are set to be opposite; and a yoke clip 72 is also connected between the two permanent magnets 71 corresponding to the same pair of movable and stationary contacts. In this embodiment, the stationary contact leading-out terminal 11 is the current flow in, and the stationary contact leading-out terminal 12 is the current flow out, in the movable spring 2, the current flows from the end close to the stationary contact leading-out terminal 11 to the end close to the stationary contact leading-out terminal 12. As shown in FIG. 18, among the four permanent magnets 71, in the two permanent magnets 71 on the left side of the movable spring in a current flowing direction, the magnetic poles on the side facing to the corresponding the movable and stationary contacts of the permanent magnets 71 close to the stationary contact leading-out terminal 11 are set as N poles, and the magnetic poles on the side facing to the corresponding the movable and stationary contacts of the permanent magnets 71 close to the stationary contact leading-out terminal 12 are set as S poles. In the two permanent magnets 71 on the right side of the movable spring in the current flowing direction, the magnetic poles on the side facing to the corresponding the movable and stationary contacts of the permanent magnets 71 close to the stationary contact leading-out terminal 11 are set as S poles, and the magnetic poles on the side facing to the corresponding the movable and stationary contacts of the permanent magnets 71 close to the stationary contact leading-out terminal 12 are set as N poles. The two permanent magnets 71 corresponding to the same pair of stationary and movable contacts are arranged at an offset position relative to the same pair of movable and stationary contacts, and the two permanent magnets 71 are arranged in a staggered manner. The yoke clip 72 is substantively U-shaped, the U-shaped bottom wall of the yoke clip 72 corresponds to the outside of corresponding one of the two ends in the width direction of the movable spring 2, and the U-shaped two side walls of the yoke clip 72 are respectively connected to back faces of the two permanent magnets 71 corresponding to the same pair of movable and stationary contacts. An upper magnetizer 61 is mounted above a position between the two movable contacts of the movable spring 2 (substantively in the middle position of the movable spring), in this embodiment, the upper magnetizer 61 is the upper armature. A lower magnetizer 62 capable of moving along with the movable spring is mounted below the position between the two movable springs 2 of the movable spring 2, in this embodiment, the lower magnetizer 62 is a lower armature. In this embodiment, the upper magnetizer 61 is secured to the push rod component 3, and the lower magnetizer 62 is secured to the movable spring 2, and at least one through hole 22 is provided between the two movable contacts of the movable spring, so that the upper magnetizer 61 and the lower magnetizer 62 can approach one to another or come into contact with each other through the through hole 22. At least two independent magnetically conductive loops are formed in a width of the movable spring 2 by means of the upper magnetizer 61 and the lower magnetizer 62. The increased magnetic pole faces of the respective magnetically conductive loops at the corresponding through holes are used such that when the movable spring 2 has a large fault current, an attraction force in a contact pressure direction is generated (the upper magnetizer 61 is relatively stationary and the lower magnetizer 62 is relatively movable, so as to form a suction force) to resist an electro-dynamic repulsion force generated, due to the fault current between the movable spring and the stationary contact leading-out terminals. Wherein the upper magnetizer and the lower magnetizer may be made of iron, cobalt, nickel, alloy thereof and other materials.

In this embodiment, a magnetic field formed by the cooperation of the four permanent magnets 71 and the two yoke clips 72 may form a magnetic blowing force in a direction as shown by an arrow in FIG. 18. The movable contacts are subjected to arc extinguishing treatment by the magnetic blowing force in the two directions, and the directions of the magnetic blowing force are all obliquely upward in the same direction, so that they are not interfered to one other. The magnetic field formed by the cooperation of the four permanent magnets 71 and the two yoke clips 72 also acts on the movable spring 2, an upward force is formed at one end of the movable spring 2 and a downward force is formed at the other end of the movable spring 2, so that a rubbing effect can be formed between the movable contacts and the stationary contacts so as to prevent contact adhesion.

The DC relay of the present disclosure has no polarity requirement for the load, and the ability of forward and reverse arc extinguishing equivalent to each other.

In the present disclosure, the so-called “two independent magnetically conductive loops” refers to that the two magnetically conductive loops cannot be interfered with each other, that is, the magnetic flux cannot be canceled from each other.

In the fourth embodiment, in addition to the four permanent magnets 71 and the two yoke clips 72, the other structures, such as the push rod component 3, the movable spring 2, the upper magnetizers 61, the lower magnetizer 62 can be the same as those described in the foregoing first embodiment, second embodiment and third embodiment, which will not be repeated herein.

According to the DC relay having a function of extinguishing arc and resisting short-circuit current of the present disclosure, the four permanent magnets 71 are respectively arranged on the two sides in the width direction of the movable spring 2 corresponding to the movable and stationary contacts. The magnetic poles on a side facing to the movable and stationary contacts of the two permanent magnets corresponding to the same pair of the movable and stationary contacts are opposite; and the magnetic poles on a side facing to the corresponding movable and stationary contacts of two permanent magnets on the same side in the width the movable springs are also set to be opposite; and a yoke clip 72 is connected between the two permanent magnets corresponding to the same pair of the movable and stationary contacts. The upper magnetizers 61 are mounted above the position between the movable contacts of the movable spring 2; the lower magnetizers capable of moving with the movable spring 2 are mounted below the position between the two movable contacts of the movable feed 2, and the upper magnetizers 61 are secured to the push rod component 3 and the lower magnetizers 62 are secured to the movable spring 2; at least one through hole 22 is provided at the movable spring 2 between the two movable contacts, so that the upper magnetizers 61 and the lower magnetizers 62 can approach one to another or come into contact with each other through the through holes 22; and at least two independent magnetically conductive loops are formed in the width direction of the movable spring 2 by the upper magnetizers 61 and the lower magnetizers 62. According to such structure of the present disclosure, on the basis that arc extinguishing can be achieved by using the four permanent magnets, the increased magnetic pole faces of the respective magnetically conductive loops at the corresponding through holes 22 are used such that when the movable spring 2 has a large fault current, the attraction force in a contact pressure direction is stacked with the contact pressure to resist an electro-dynamic repulsion force generated, due to the fault current between the movable spring 2 and the stationary contact leading-out terminals; and since the short-circuit large current is basically and evenly divided by the independent magnetically conductive loops, the characteristics with the high magnetic efficiency and the magnetic circuit not easy to saturate are provided.

The Fifth Embodiment

Figure 21:
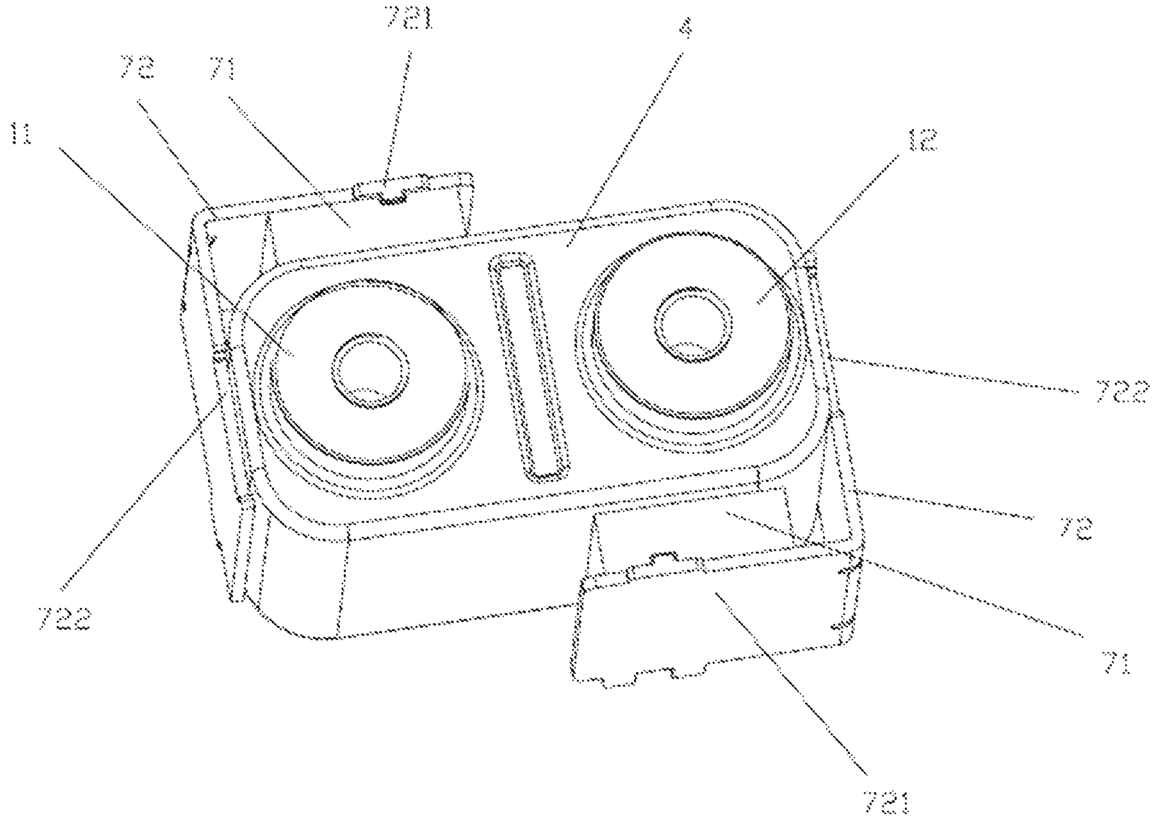
FIG. 21 is a schematic view of a partial structure of the fifth embodiment of the present disclosure.
Figure 22:
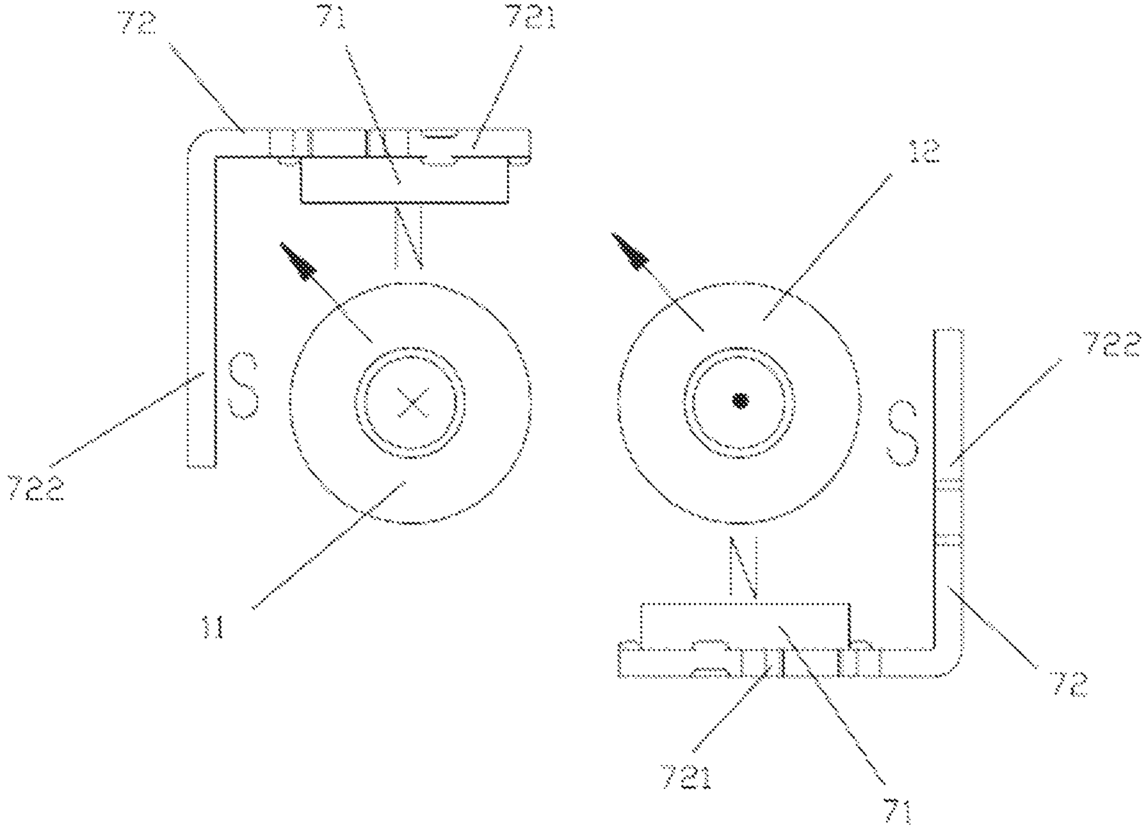
FIG. 22 is a schematic view showing the distribution of the permanent magnets according to the fifth embodiment of the present disclosure.
Figure 23:
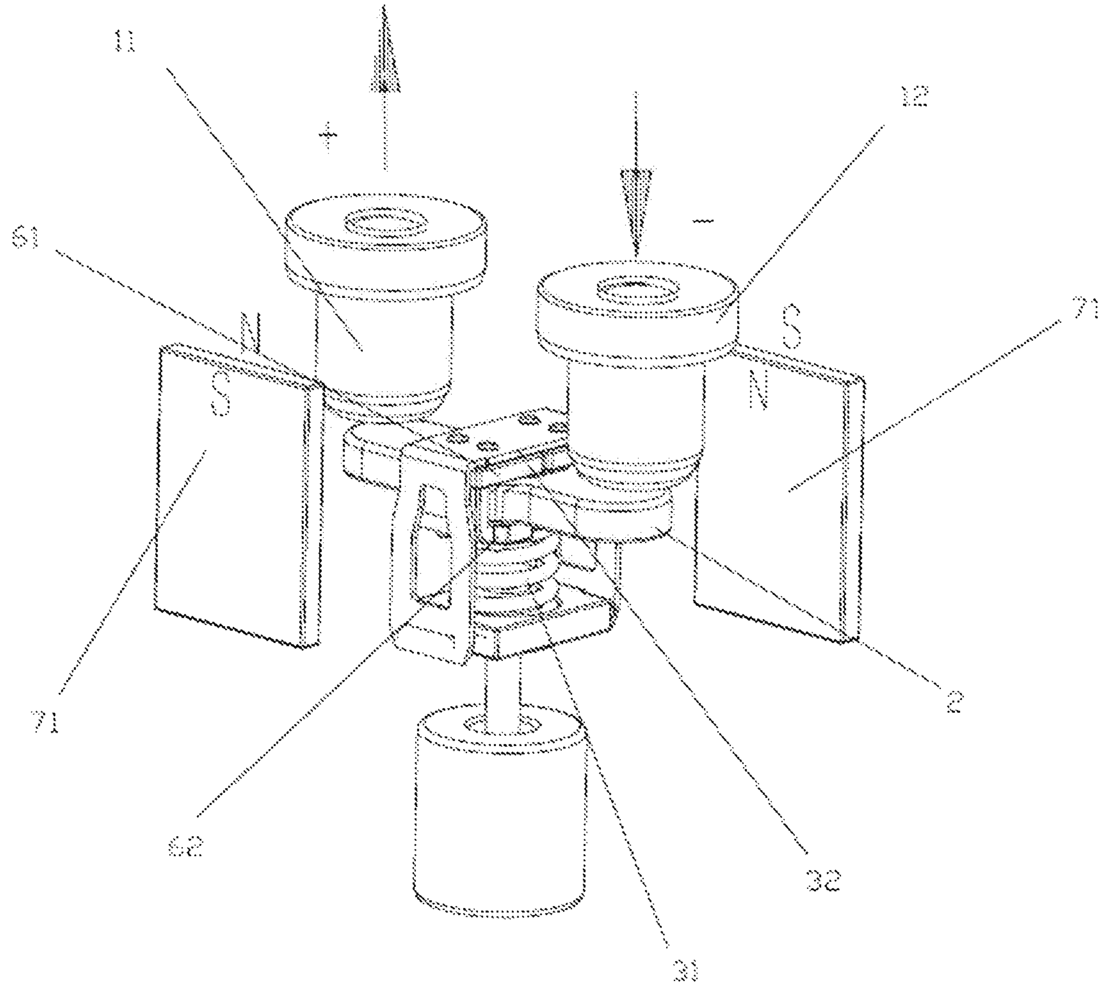
FIG. 23 is a schematic view of a permanent magnet arc extinguishing structure (yoke clip not shown) of the fifth embodiment of the present disclosure.

Referring to FIGS. 21 to 23, a DC relay capable of extinguishing arc and resisting short-circuit current of the present disclosure includes two stationary contact leading-out terminals 11 and 12 respectively for current inflow and current outflow, and one straight sheet type movable spring 2, one push rod component 3 for driving the movement of the movable spring 2 so as to realize that the movable contacts on the two ends of the movable spring are contacted with or separated from stationary contacts on the bottom end of the stationary contact leading-out terminals, and two permanent magnets 71. The two stationary contact leading-out terminals 11, 12 are respectively mounted on a housing 4. The movable spring 2 and a portion of the push rod component 3 are received in the housing 4. The push rod component 3 is also connected with a movable iron core 5 in a magnetic circuit structure. Under the action of the magnetic circuit, the push rod component 3 drives the movable spring 2 to move upward, so that movable contacts on the two ends of the movable spring 2 are in contact with the stationary contacts on the bottom ends of the two stationary contact leading-out terminals 11 and 12 respectively, so as to realize a communication load. The movable spring 2 is mounted in the push rod component 3 by means of a spring 31 such that the movable spring 2 can be displaced relative to the push rod component 3 (to achieve over-travel of the contacts). The two permanent magnets 71 are outside the housing 4 and are respectively arranged on the two sides in the width direction of the movable spring 2 corresponding to the movable and stationary contacts, and the movable and stationary contacts to which the two permanent magnets 71 are different, that is, one permanent magnet corresponds to the stationary contact leading-out terminal 11, and the other permanent magnet corresponds to the stationary contact leading-out terminal 12. The two permanent magnets 71 are respectively connected to a yoke clip 72. The two yoke clips 72 are L-shaped, one side 721 of the L-shaped yoke clip 72 is connected to a side of the permanent magnet facing away from the movable and stationary contact, and the other side 722 of the L-shaped yoke clip 72 is at the position outside the two ends in the length direction of the movable spring 2. In this embodiment, the stationary contact leading-out terminal 11 is the current flow in, and the stationary contact leading-out terminal 12 is the current flow out, in the movable spring 2, the current flows from the end close to the stationary contact leading-out terminal 11 to the end close to the stationary contact leading-out terminal 12, the two permanent magnets 71 are respectively arranged at the position directly opposite to the movable and stationary contacts. As shown in FIG. 21, among the two permanent magnets 71, the magnetic pole on the side facing to the corresponding the movable and stationary contact of one permanent magnet 71 close to the stationary contact leading-out terminal 11 is set as N pole, and the magnetic pole on the side facing to the corresponding the movable and stationary contacts of one permanent magnet 71 close to the stationary contact leading-out terminal 12 is set as N pole, that is, the magnetic poles on a side facing to the movable and stationary contacts of the two permanent magnets 71 are the same. An upper magnetizer 61 is mounted above a position between the two movable contacts of the movable spring 2 (substantively in the middle position of the movable spring), in this embodiment, the upper magnetizer 61 is the upper armature. A lower magnetizer 62 capable of moving along with the movable spring is mounted below the position between the two movable springs 2 of the movable spring 2, in this embodiment, the lower magnetizer 62 is a lower armature. In this embodiment, the upper magnetizer 61 is secured to the push rod component 3, and the lower magnetizer 62 is secured to the movable spring 2, and at least one through hole 22 is provided between the two movable contacts of the movable spring, so that the upper magnetizer 61 and the lower magnetizer 62 can approach one to another or come into contact with each other through the through hole 22 (see FIG. 5). At least two independent magnetically conductive loops are formed in a width of the movable spring 2 by means of the upper magnetizer 61 and the lower magnetizer 62. The increased magnetic pole faces of the respective magnetically conductive loops at the corresponding through holes are used such that when the movable spring 2 has a large fault current, an attraction force in a contact pressure direction is generated (the upper magnetizer 61 is relatively stationary and the lower magnetizer 62 is relatively movable, so as to form a suction force) to resist an electro-dynamic repulsion force generated, due to the fault current between the movable spring and the stationary contact leading-out terminals. Wherein the upper magnetizer and the lower magnetizer may be made of iron, cobalt, nickel, alloy thereof and other materials.

In this embodiment, a magnetic field formed by the cooperation of the two permanent magnets 71 and the two yoke clips 72 may form a magnetic blowing force in a direction as shown by an arrow in FIG. 18. The movable contacts are subjected to arc extinguishing treatment by the magnetic blowing force in the two directions, and the directions of the magnetic blowing force are all obliquely upward in the same direction, so that they are not interfered to one other. The magnetic field formed by the cooperation of the two permanent magnets 71 and the two yoke clips 72 also acts on the movable spring 2, an upward force is formed at one end of the movable spring 2 and a downward force is formed at the other end of the movable spring 2, so that a rubbing effect can be formed between the movable contacts and the stationary contacts so as to prevent contact adhesion.

The DC relay of the present disclosure has no polarity requirement for the load, and the ability of forward and reverse arc extinguishing equivalent to each other.

In the present disclosure, the so-called "two independent magnetically conductive loops" refers to that the two magnetically conductive loops cannot be interfered with each other, that is, the magnetic flux cannot be canceled from each other.

Figure 24:
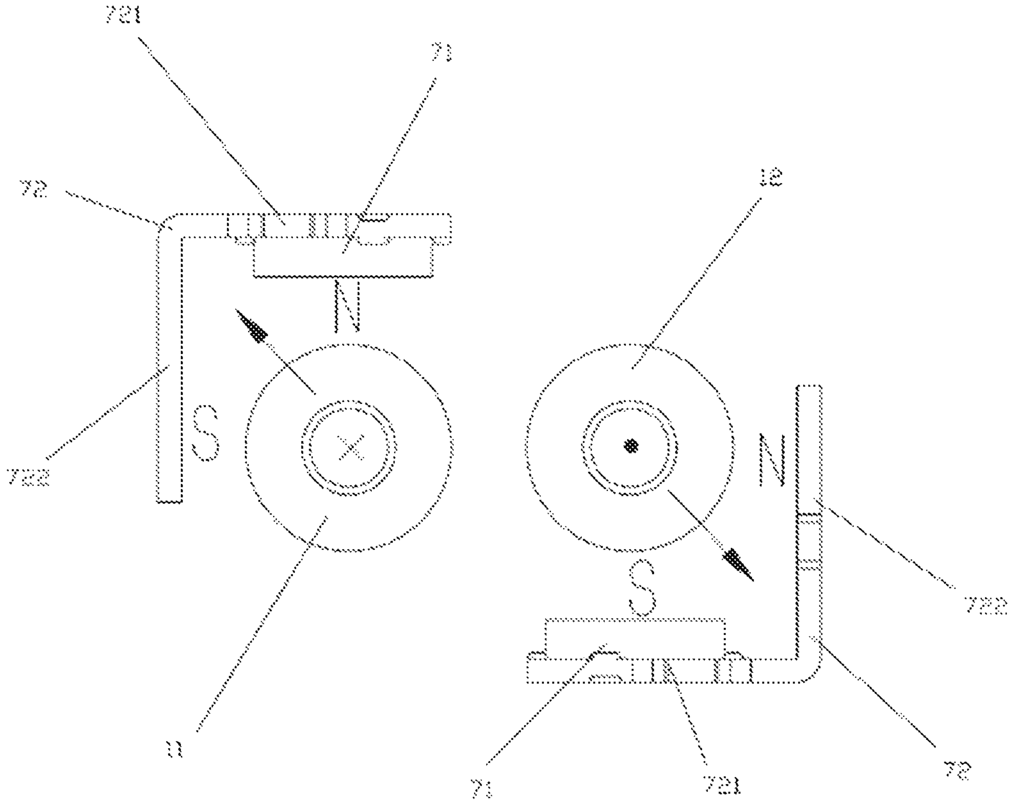
FIG. 24 is another schematic view showing the distribution of the permanent magnets according to the fifth embodiment of the present disclosure.

Referring to FIG. 24, the magnetic poles on the side facing to the movable and stationary contacts of the two permanent magnets 71 are set to be opposite. Specifically, in the two permanent magnets 71, the magnetic pole on the side facing to the corresponding movable and stationary contacts of one permanent magnet 71 corresponding to the stationary contact leading-out terminal 11 is set as N pole, and the magnetic pole on the side facing to the corresponding dynamic and stationary contacts of one permanent magnet 71 corresponding to the stationary contact leading-out terminal 12 is set as S pole. In this embodiment, the magnetic field formed by the cooperation of the two permanent magnets 71 and the two yoke clips 72 can form a magnetic blowing force in a direction as shown by an arrow in FIG. 24. The contacts are subjected to arc extinguishing treatment by the magnetic blowing forces in the two directions, since the direction of one of the magnetic blowing forces is diagonally upward, and the direction of the other one of the magnetic blowing forces is diagonally downward, when both magnetic blowing forces are directed to the outside, no interference is produced between them; and when the two magnetic blowing forces are directed to the inside, a certain interference will be produced between them.

In the fifth embodiment, in addition to the four pieces of permanent magnet 71 and the two yoke clips 72, the other structures such as the push rod component 3 (see FIG. 4), the movable spring 2, the upper magnetizers 61, the lower magnetizer 62 may be the same as the foregoing first embodiment, second embodiment and the third embodiment, which will not be repeated herein.

According to the DC relay capable of extinguishing arc and resisting short-circuit current of the present disclosure, the two permanent magnets 71 are respectively arranged on the two sides in the width direction of the movable spring 2 corresponding to the movable and stationary contacts, and the movable and stationary contacts to which the two permanent magnets 71 are different. The two permanent magnets 71 are respectively connected to a yoke clip 72. The two yoke clips 72 are L-shaped, one side 721 of the L-shaped yoke clip 72 is connected to a side of the permanent magnet facing away from the movable and stationary contact, and the other side 722 of the L-shaped yoke clip 72 is at the position outside the two ends in the length direction of the movable spring 2. The upper magnetizers 61 are mounted above the position between the movable contacts of the movable spring 2; the lower magnetizers capable of moving with the movable spring 2 are mounted below the position between the two movable contacts of the movable feed 2, and the upper magnetizers 61 are secured to the push rod component 3 and the lower magnetizers 62 are secured to the movable spring 2; at least one through hole 22 is provided at the movable spring 2 between the two movable contacts (see FIG. 5), so that the upper magnetizers 61 and the lower magnetizers 62 can approach one to another or come into contact with each other through the through holes 22; and at least two independent magnetically conductive loops are formed in the width direction of the movable spring 2 by the upper magnetizers 61 and the lower magnetizers 62. According to such structure of the present disclosure, on the basis that arc extinguishing can be achieved by using the two permanent magnets, the increased magnetic pole faces of the respective magnetically conductive loops at the corresponding through holes 22 are used such that when the movable spring 2 has a large fault current, the attraction force in a contact pressure direction is stacked with the contact pressure to resist an electro-dynamic repulsion force generated, due to the fault current between the movable spring 2 and the stationary contact leading-out terminals; and since the short-circuit large current is basically and evenly divided by the independent magnetically conductive loops, the characteristics with the high magnetic efficiency and the magnetic circuit not easy to saturate are provided.

The Sixth Embodiment

Figure 25:
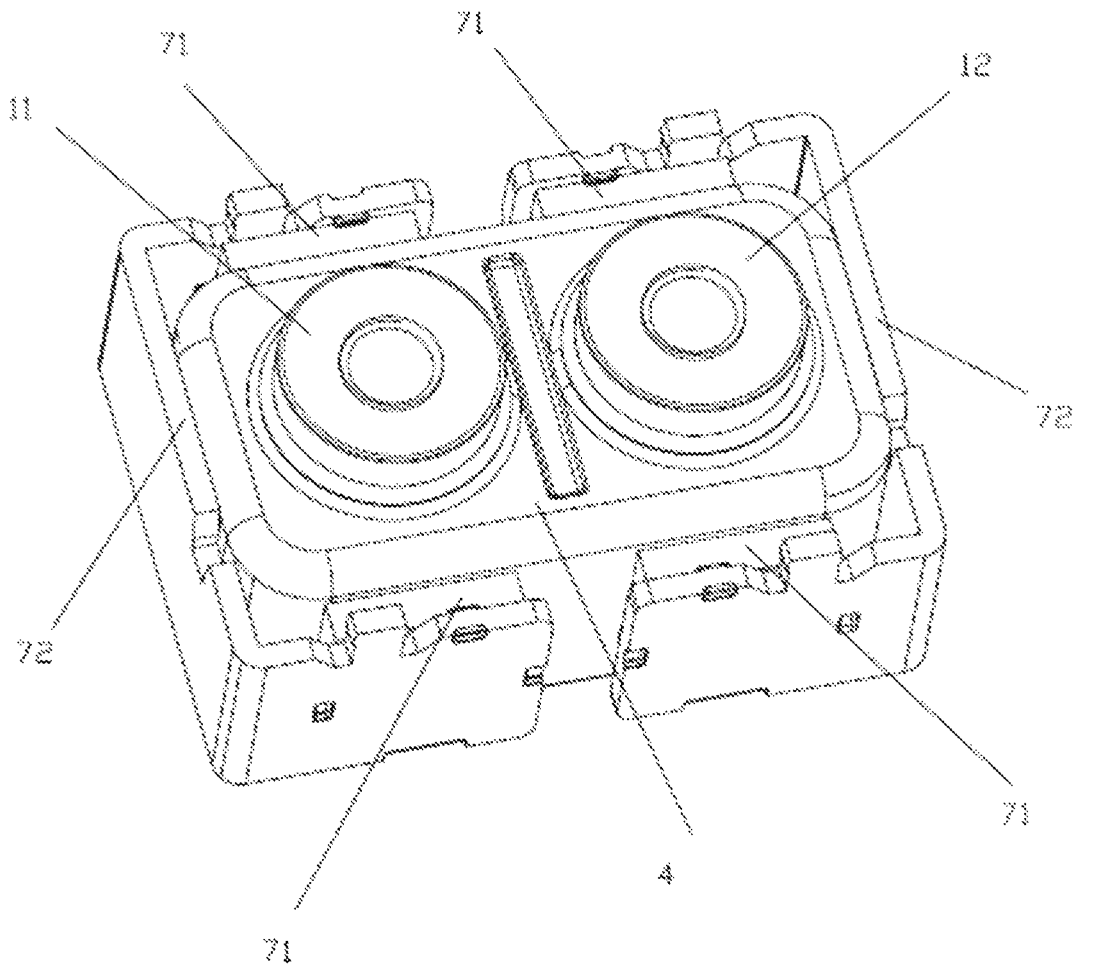
FIG. 25 is a schematic view of a partial structure of the sixth embodiment of the present disclosure.
Figure 26:
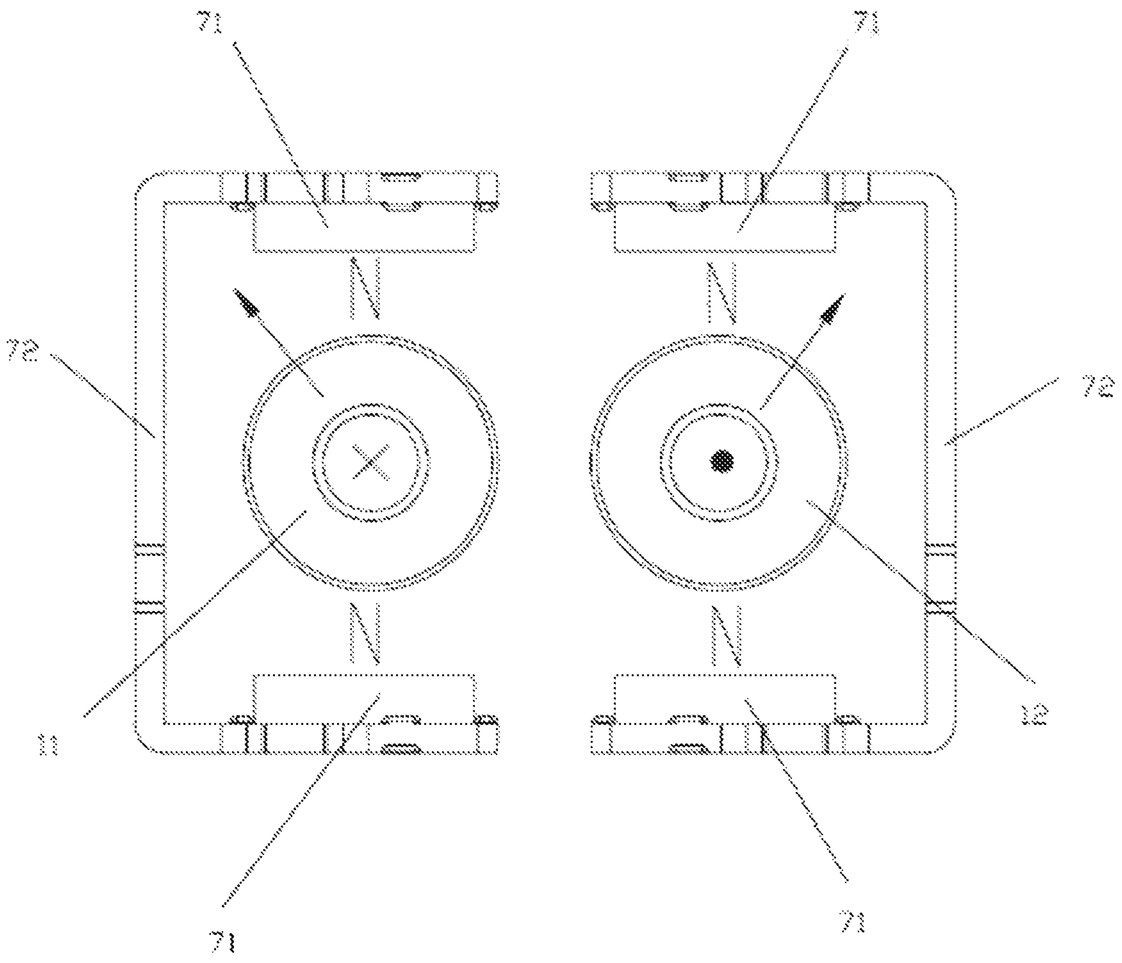
FIG. 26 is a schematic view showing the distribution of the permanent magnets according to the sixth embodiment of the present disclosure.
Figure 27:
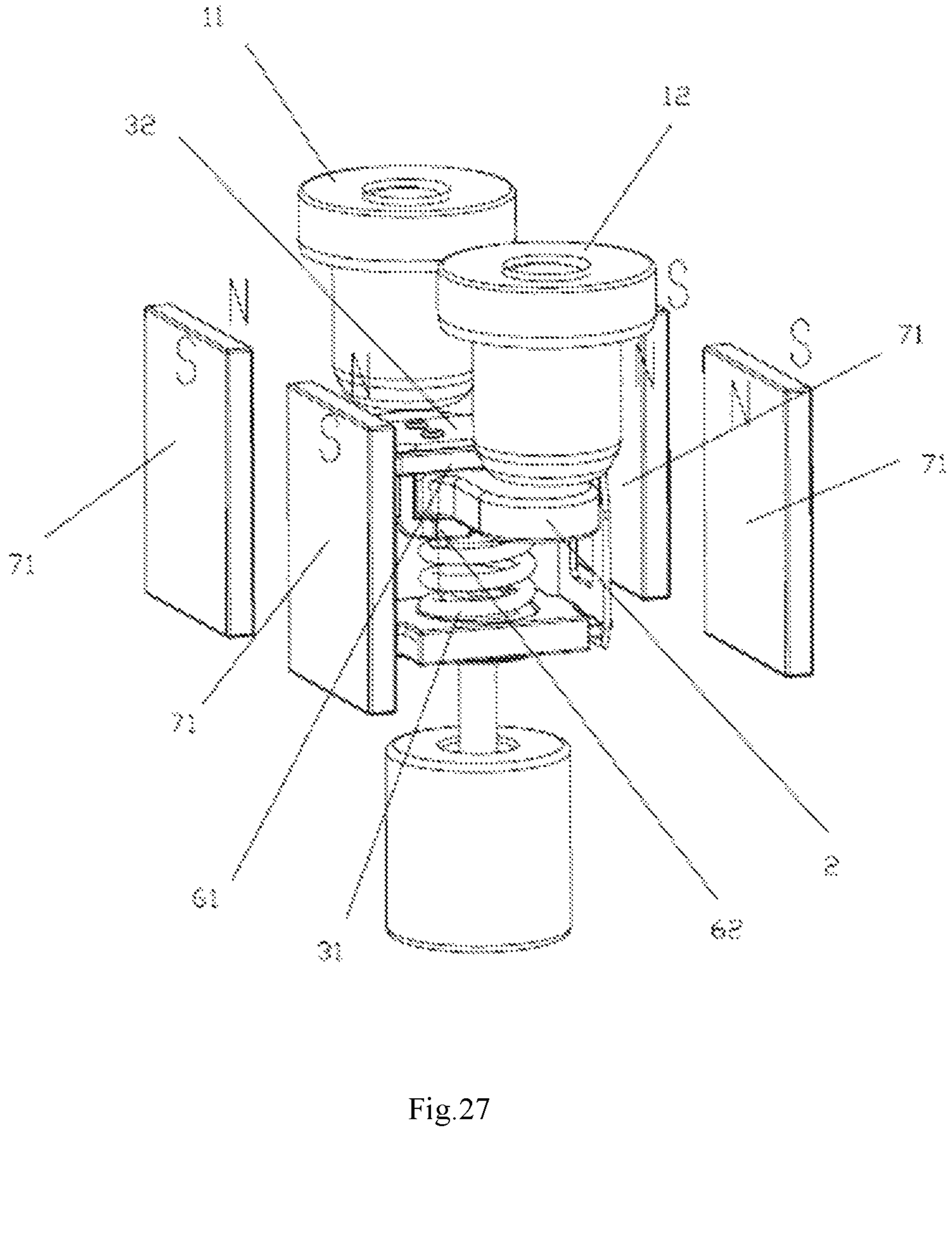
FIG. 27 is a schematic view of a permanent magnet with an arc extinguishing structure (a yoke clip not shown) according to the sixth embodiment of the present disclosure.

Referring to FIGS. 25 to 27, a DC relay capable of extinguishing arc and resisting short-circuit current of the present disclosure includes two stationary contact leading-out terminals 11 and 12 respectively for current inflow and current outflow, and one straight sheet type movable spring 2, one push rod component 3 for driving the movement of the movable spring 2 so as to realize that the movable contacts on the two ends of the movable spring are contacted with or separated from stationary contacts on the bottom end of the stationary contact leading-out terminals, and four permanent magnets 71. The two stationary contact leading-out terminals 11, 12 are respectively mounted on a housing 4. The movable spring 2 and a portion of the push rod component 3 are received in the housing 4. The push rod component 3 (see FIG. 4) is also connected with a movable iron core 5 (see FIG. 2) in a magnetic circuit structure.

Figure 2:
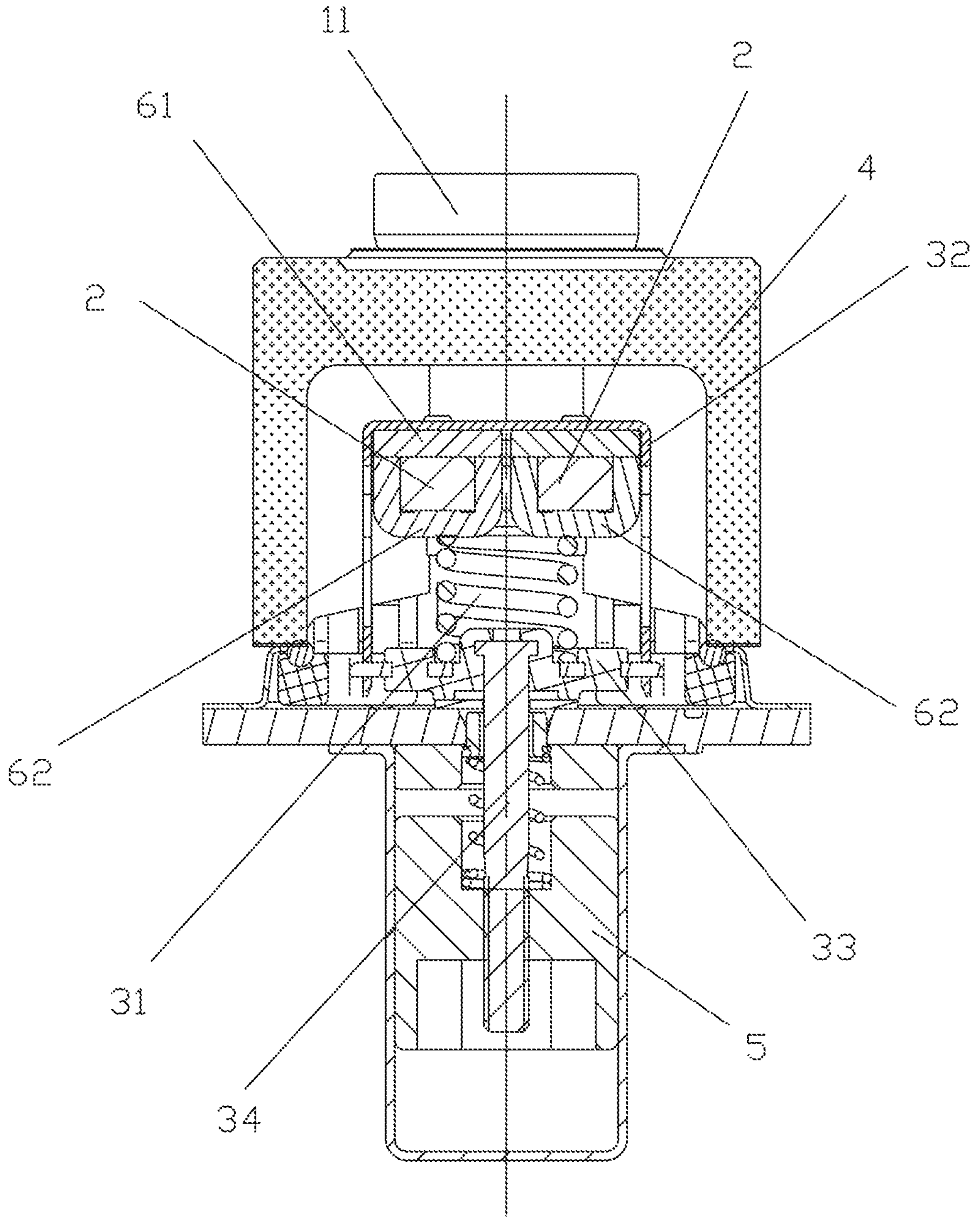
FIG. 2 is a cross-sectional view of a partial structure (corresponding to the section along the width of the movable spring) according to the first embodiment of the present disclosure.

Under the action of the magnetic circuit, the push rod component 3 drives the movable spring 2 to move upward, so that movable contacts on the two ends of the movable spring 2 are in contact with the stationary contacts on the bottom ends of the two stationary contact leading-out terminals 11 and 12 respectively, so as to realize a communication load. The movable spring 2 is mounted in the push rod component 3 by means of a spring 31 such that the movable spring 2 can be displaced relative to the push rod component 3 (to achieve over-travel of the contacts). The four permanent magnets 71 are outside the housing 4 and are respectively arranged on the two sides in the width direction of the movable spring 2 corresponding to the movable and stationary contacts, and the magnetic poles on the side facing to the movable and stationary contacts of the two permanent magnets corresponding to the same pair of the movable and stationary contacts are the same, and one yoke clip 72 is connected between the two permanent magnets corresponding to the same pair of the movable and stationary contacts. In this embodiment, the stationary contact leading-out terminal 11 is the current flow in, and the stationary contact leading-out terminal 12 is the current flow out, in the movable spring 2, the current flows from the end close to the stationary contact leading-out terminal 11 to the end close to the stationary contact leading-out terminal 12, the four permanent magnets 71 are respectively arranged at the position directly opposite to the movable and stationary contacts. As shown in FIG. 2, among the four permanent magnets 71, the magnetic poles on the side facing to the corresponding the movable and stationary contacts of two permanent magnets 71 on the left side of the movable spring in a current flowing direction is set as N pole, and the magnetic poles on the side facing to the corresponding the movable and stationary contacts of the two permanent magnet 71 on the right side of the movable spring in the current flowing direction is set as N pole. The yoke clip 72 is substantively U-shaped, the U-shaped bottom wall of the yoke clip 72 corresponds to the outside of corresponding one of the two ends in the width direction of the movable spring 2, and the U-shaped two side walls of the yoke clip 72 are respectively connected to back faces of the two permanent magnets 71 corresponding to the same pair of movable and stationary contacts. An upper magnetizer 61 is mounted above a position between the two movable contacts of the movable spring 2 (substantively in the middle position of the movable spring), in this embodiment, the upper magnetizer 61 is the upper armature. A lower magnetizer 62 capable of moving along with the movable spring is mounted below the position between the two movable springs 2 of the movable spring 2, in this embodiment, the lower magnetizer 62 is a lower armature. In this embodiment, the upper magnetizer 61 is secured to the push rod component 3, and the lower magnetizer 62 is secured to the movable spring 2, and at least one through hole 22 is provided between the two movable contacts of the movable spring (see FIG. 5), so that the upper magnetizer 61 and the lower magnetizer 62 can approach one to another or come into contact with each other through the through hole 22. At least two independent magnetically conductive loops are formed in a width of the movable spring 2 by means of the upper magnetizer 61 and the lower magnetizer 62. The increased magnetic pole faces of the respective magnetically conductive loops at the corresponding through holes are used such that when the movable spring 2 has a large fault current, an attraction force in a contact pressure direction is generated (the upper magnetizer 61 is relatively stationary and the lower magnetizer 62 is relatively movable, so as to form a suction force) to resist an electro-dynamic repulsion force generated, due to the fault current between the movable spring and the stationary contact leading-out terminals. Wherein the upper magnetizer and the lower magnetizer may be made of iron, cobalt, nickel, alloy thereof and other materials.

In this embodiment, the magnetic field formed by the cooperation of the four permanent magnets 71 and the two yoke clips 72 can form a magnetic blowing force in a direction as shown by an arrow in FIG. 2. The two pairs of the contacts are subjected to arc extinguishing treatment by means of the magnetic blowing forces in the two directions, and since the directions of the magnetic blowing forces are all toward the outside (that is, diagonally upward in FIG. 26), no interference can be produced between them. The magnetic field formed by the cooperation of the four permanent magnets 71 and the two yoke clips 72 still acts on the movable spring 2, but no effect can be achieved due to that the acting force are canceled.

Figure 28:
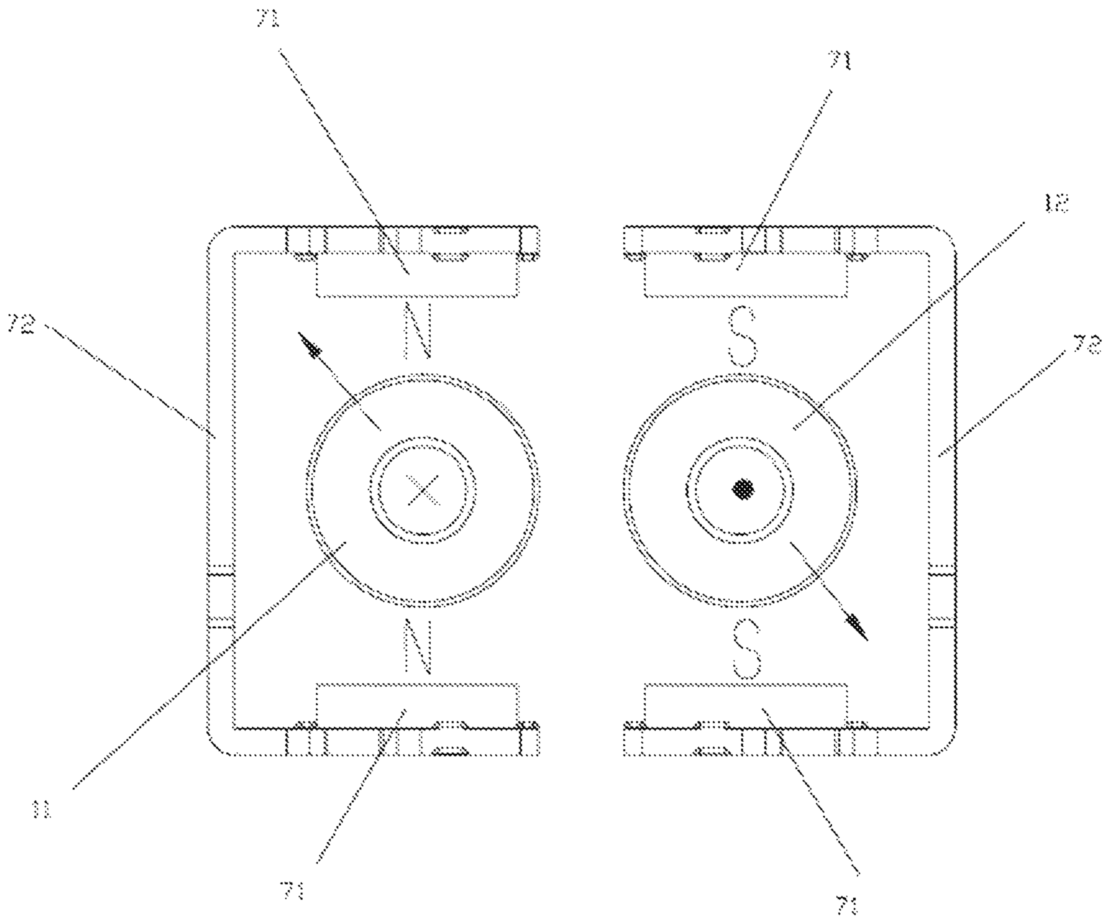
FIG. 28 is another schematic view showing the distribution of the permanent magnets according to the sixth embodiment of the present disclosure.
Figure 29:
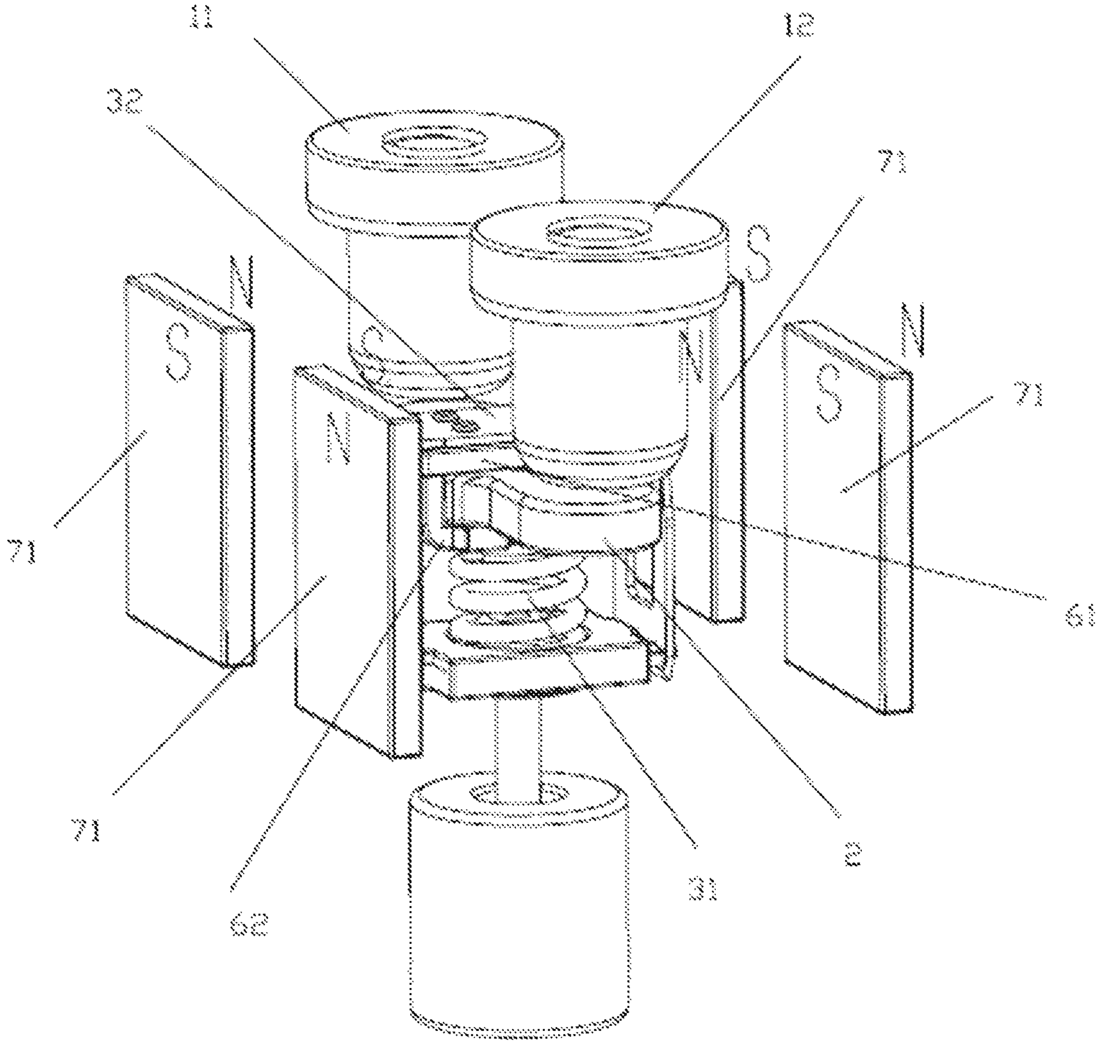
FIG. 29 is a schematic view of another permanent magnet with an arc extinguishing structure (a yoke clip not shown) according to the sixth embodiment of the present disclosure.

As shown in FIGS. 28 and 29, among the four permanent magnets 71, the magnetic poles on the side facing to the corresponding movable and stationary contacts of the two permanent magnets 71 on the same side in the width direction of the movable spring 2 are set to be opposite to each other. Specifically, in the two permanent magnets 71 on the left side of the movable spring 2 in a current flowing direction, the magnetic poles on the side facing to the corresponding the movable and stationary contacts of the permanent magnets 71 close to the stationary contact leading-out terminal 11 are set as N poles, and the magnetic poles on the side facing to the corresponding the movable and stationary contacts of the permanent magnets 71 close to the stationary contact leading-out terminal 12 are set as S poles. In the two permanent magnets 71 on the right side of the movable spring in the current flowing direction, the magnetic poles on the side facing to the corresponding the movable and stationary contacts of the permanent magnets 71 close to the stationary contact leading-out terminal 11 are set as N poles, and the magnetic poles on the side facing to the corresponding the movable and stationary contacts of the permanent magnets 71 close to the stationary contact leading-out terminal 12 are set as N poles.

The magnetic field formed by the cooperation of the four permanent magnets 71 and the two yoke clips 72 can form magnetic blowing force in the direction shown by an arrow in FIG. 15. The two pairs of the contacts are subjected to arc extinguishing treatment by means of the magnetic blowing forces in the two directions, and since the directions of the magnetic blowing forces are all toward the outside (that is, diagonally upward and diagonally downward in FIG. 28), no interference can be produced between them. The magnetic field formed by the cooperation of the four permanent magnets 71 and the two yoke clips 72 still acts on the movable spring 2, but no effect can be achieved due to that the acting force have been canceled.

The DC relay of the present disclosure has no polarity requirement for the load, and the ability of forward and reverse arc extinguishing equivalent to each other.

In the sixth embodiment, in addition to the four pieces of permanent magnet 71 and the two yoke clips 72, the other structures such as the push rod component 3, the movable spring 2, the upper magnetizers 61, the lower magnetizer 62 may be the same as the foregoing first embodiment, second embodiment and the third embodiment, which will not be repeated herein.

According to the DC relay for extinguishing arc and resisting short-circuit current of the present disclosure, the four permanent magnets 71 are respectively arranged on the two sides in the width direction of the movable spring corresponding to the movable and stationary contacts, and the magnetic poles on the side facing to the movable and stationary contacts of the two permanent magnets corresponding to the same pair of the movable and stationary contacts are set to be the same, and the magnetic poles on the side facing to the movable and stationary contacts of the two permanent magnets corresponding to the same side in the width direction of the movable spring are also set to be the same; one yoke clip 72 is also connected between the two permanent magnets corresponding to the same pair of movable and stationary contacts. The upper magnetizers 61 are mounted above the position between the movable contacts of the movable spring 2; the lower magnetizers capable of moving with the movable spring 2 are mounted below the position between the two movable contacts of the movable feed 2, and the upper magnetizers 61 are secured to the push rod component 3 and the lower magnetizers 62 are secured to the movable spring 2; at least one through hole 22 is provided at the movable spring 2 between the two movable contacts (see FIG. 5), so that the upper magnetizers 61 and the lower magnetizers 62 can approach one to another or come into contact with each other through the through holes 22; and at least two independent magnetically conductive loops are formed in the width direction of the movable spring 2 by the upper magnetizers 61 and the lower magnetizers 62. According to such structure of the present disclosure, on the basis that arc extinguishing can be achieved by using the four permanent magnets 71, the increased magnetic pole faces of the respective magnetically conductive loops at the corresponding through holes 22 are used such that when the movable spring 2 has a large fault current, the attraction force in a contact pressure direction is stacked with the contact pressure to resist an electro-dynamic repulsion force generated, due to the fault current between the movable spring 2 and the stationary contact leading-out terminals; and since the short-circuit large current is basically and evenly divided by the independent magnetically conductive loops, the characteristics with the high magnetic efficiency and the magnetic circuit not easy to saturate are provided.

The Seventh Embodiment

Figure 30:
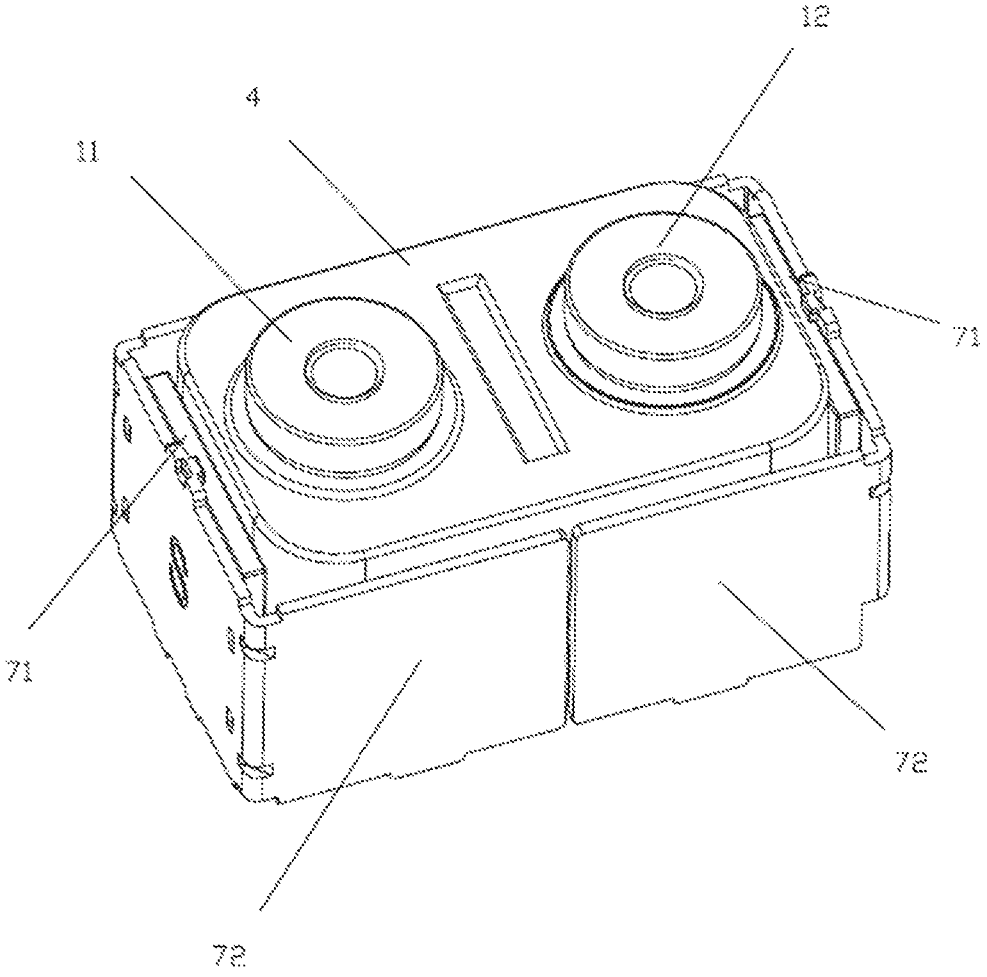
FIG. 30 is a schematic view of a partial structure of the seventh embodiment of the present disclosure.
Figure 31:
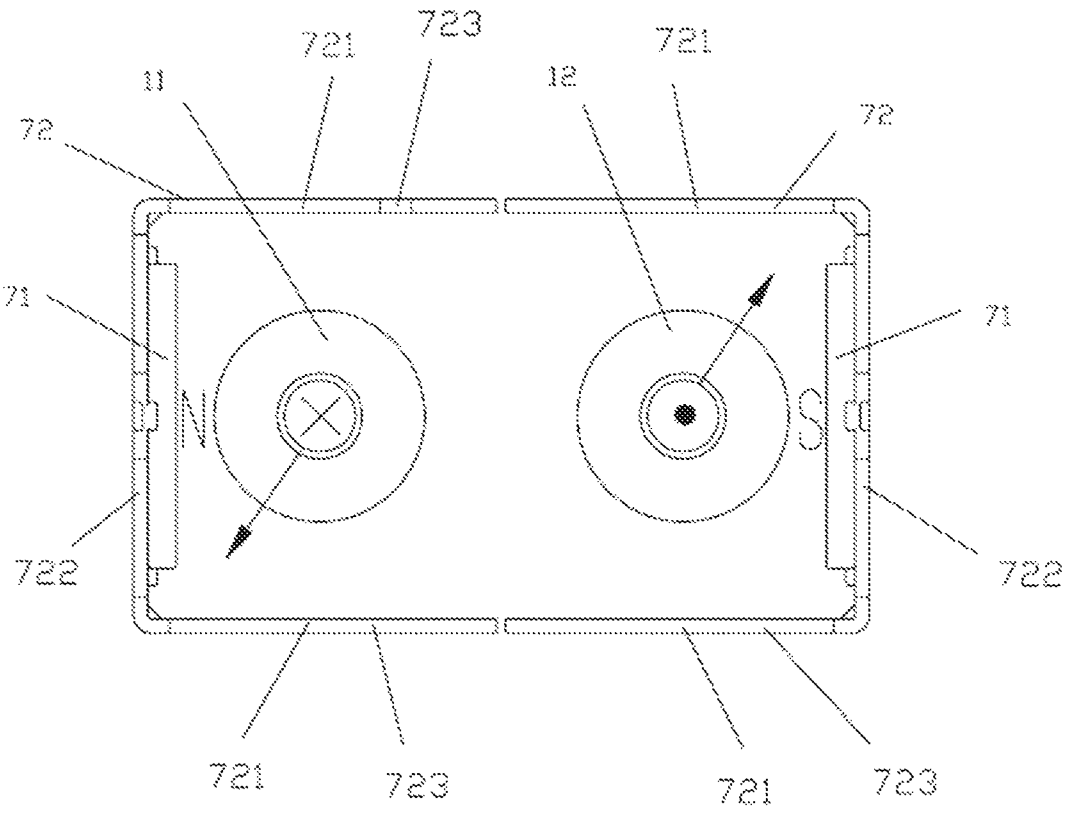
FIG. 31 is a schematic view showing the distribution of the permanent magnet according to the seventh embodiment of the present disclosure.
Figure 32:
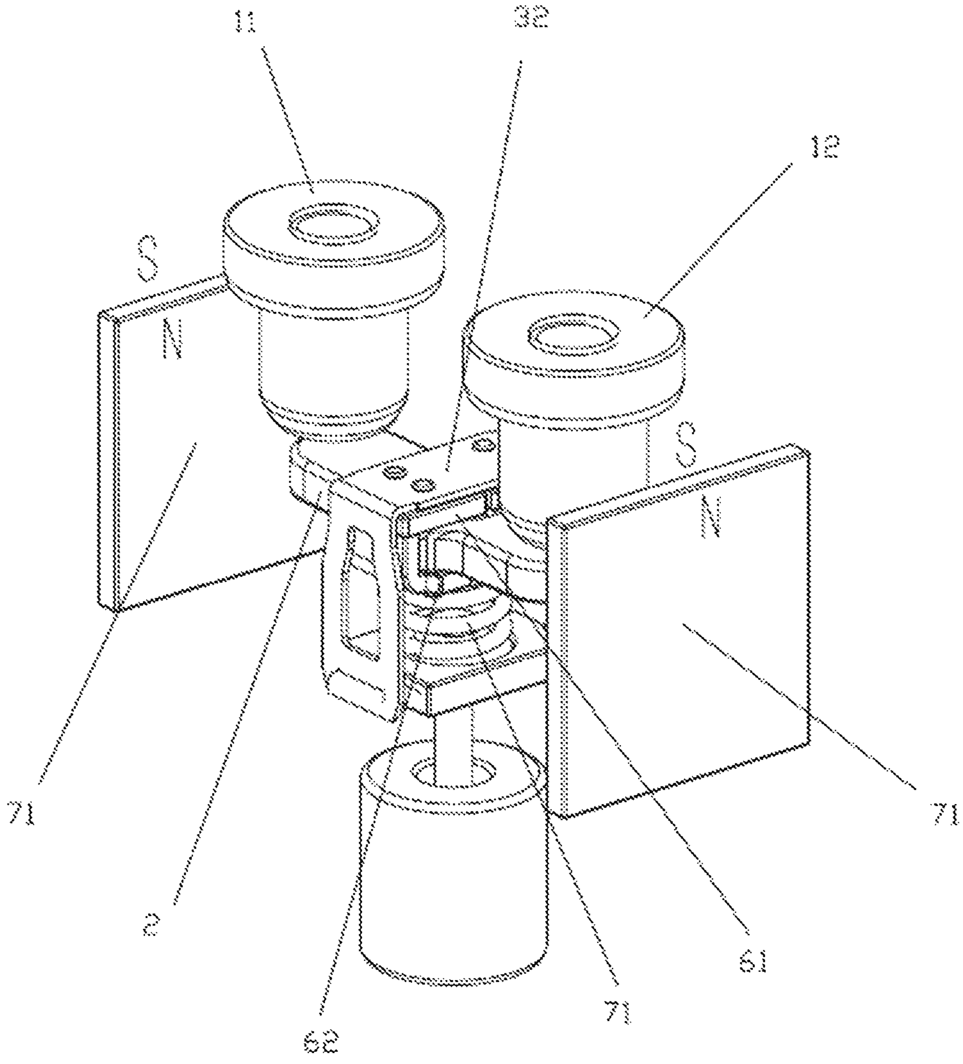
FIG. 32 is a schematic view of the permanent magnet with the arc extinguishing structure (the yoke clip not shown) according to the seventh embodiment of the present disclosure.

Referring to FIGS. 30 to 32, a DC relay capable of extinguishing arc and resisting short-circuit current of the present disclosure includes two stationary contact leading-out terminals 11 and 12 respectively for current inflow and current outflow, and one straight sheet type movable spring 2, one push rod component 3 for driving the movement of the movable spring 2 so as to realize that the movable contacts on the two ends of the movable spring are contacted with or separated from stationary contacts on the bottom end of the stationary contact leading-out terminals, and two permanent magnets 71. The two stationary contact leading-out terminals 11, 12 are respectively mounted on a housing 4. The movable spring 2 and a portion of the push rod component 3 are received in the housing 4. The push rod component 3 is also connected with a movable iron core 5 in a magnetic circuit structure. Under the action of the magnetic circuit, the push rod component 3 drives the movable spring 2 to move upward, so that movable contacts on the two ends of the movable spring 2 are in contact with the stationary contacts on the bottom ends of the two stationary contact leading-out terminals 11 and 12 respectively, so as to realize a communication load. The movable spring 2 is mounted in the push rod component 3 by means of a spring 31 such that the movable spring 2 can be displaced relative to the push rod component 3 (to achieve over-travel of the contacts). The two permanent magnets 71 are respectively arranged at the position outside the two sides in a width direction of the movable spring 2 corresponding to the movable and stationary contacts, and the magnetic poles on the sides opposite to each other of the two permanent magnets 71 are set to be opposite, and the two permanent magnets 71 are connected to the two yoke clips 72. Each of the two yoke clips 72 includes a yoke section 721 on the side in the width direction of the movable spring corresponding to the movable and stationary contacts. In this embodiment, the stationary contact leading-out terminal 11 is the current flow in, and the stationary contact leading-out terminal 12 is the current flow out, in the movable spring 2, the current flows from the end close to the stationary contact leading-out terminal 11 to the end close to the stationary contact leading-out terminal 12, the four permanent magnets 71 are respectively arranged at the position directly opposite to the movable and stationary contacts. As shown in FIG. 2, among the two permanent magnets 71, the magnetic pole on the side facing to the corresponding the movable and stationary contacts of one permanent magnet 71 corresponding to the stationary contact leading-out terminal 11 is set as N pole, and the magnetic pole on the side facing to the corresponding the movable and stationary contacts of the one permanent magnet 71 corresponding to the stationary contact leading-out terminal 12 is set as S pole. An upper magnetizer 61 is mounted above a position between the two movable contacts of the movable spring 2 (substantively in the middle position of the movable spring), in this embodiment, the upper magnetizer 61 is the upper armature. A lower magnetizer 62 capable of moving along with the movable spring is mounted below the position between the two movable springs 2 of the movable spring 2, in this embodiment, the lower magnetizer 62 is a lower armature. In this embodiment, the upper magnetizer 61 is secured to the push rod component 3, and the lower magnetizer 62 is secured to the movable spring 2, and at least one through hole 22 is provided between the two movable contacts of the movable spring (see FIG. 5), so that the upper magnetizer 61 and the lower magnetizer 62 can approach one to another or come into contact with each other through the through hole 22. At least two independent magnetically conductive loops are formed in a width of the movable spring 2 by means of the upper magnetizer 61 and the lower magnetizer 62. The increased magnetic pole faces of the respective magnetically conductive loops at the corresponding through holes are used such that when the movable spring 2 has a large fault current, an attraction force in a contact pressure direction is generated (the upper magnetizer 61 is relatively stationary and the lower magnetizer 62 is relatively movable, so as to form a suction force) to resist an electro-dynamic repulsion force generated, due to the fault current between the movable spring and the stationary contact leading-out terminals. Wherein the upper magnetizer and the lower magnetizer may be made of iron, cobalt, nickel, alloy thereof and other materials.

In this embodiment, the two yoke clips 72 are U-shaped, and the bottom walls 722 of the two U-shaped yoke clips 72 are respectively connected to the sides of the two permanent magnets 71 facing away from each other, that is, one yoke clip 72 is connected with one permanent magnet 71, the end heads of the two side walls 723 of the two U-shaped yoke clips are respectively beyond the two sides in the width direction of the movable spring 2 corresponding to the movable and stationary contacts. There are the yoke sections 721 included in the two side walls 723 of the two U-shaped yoke clips 72.

Of course, the length of the two side walls 723 of the U-shaped yoke clips 72 can also be set shorter. For example, only the ends of the two side walls of the U-shaped yoke clip 72 can be set as the yoke sections.

Of course, it is also possible to connect the yoke clip 72 with the two permanent magnets, that is, the bottom walls of the two U-shaped yoke clips are fit to the two sides in the width direction of the movable spring, and the two end heads of the two side walls of the two U-shaped yoke clips are respectively connected with the sides of the two permanent magnets facing away from each other.

In this embodiment, the magnetic field formed by the cooperation of the two permanent magnets 71 and the two yoke clips 72 can form magnetic blowing force in the direction shown by an arrow in FIG. 2. The two pairs of the contacts are subjected to arc extinguishing treatment by means of the magnetic blowing forces in the two directions, and since the directions of the magnetic blowing forces are all toward the outside, no interference can be produced between them. The magnetic field formed by the cooperation of the two permanent magnets 71 and the two yoke clips 72 still acts on the movable spring 2, but no effect can be achieved due to that the acting force have been canceled.

In the seventh embodiment, in addition to the four pieces of permanent magnet 71 and the two yoke clips 72, the other structures such as the push rod component 3, the movable spring 2, the upper magnetizers 61, the lower magnetizer 62 may be the same as the foregoing first embodiment, second embodiment and the third embodiment, which will not be repeated herein.

The DC relay of the present disclosure has no polarity requirement for the load, and the ability of forward and reverse arc extinguishing equivalent to each other.

According to the DC relay capable of extinguishing arc and resisting short-circuit current of the present disclosure, The two permanent magnets 71 are respectively arranged at the position outside the two sides in a width direction of the movable spring 2 corresponding to the movable and stationary contacts, and the magnetic poles on the sides opposite to each other of the two permanent magnets 71 are set to be opposite, and the two permanent magnets 71 are connected to the two yoke clips 72. Each of the two yoke clips 72 includes a yoke section 721 on the side in the width direction of the movable spring corresponding to the movable and stationary contacts. The upper magnetizers 61 are mounted above the position between the movable contacts of the movable spring 2; the lower magnetizers capable of moving with the movable spring 2 are mounted below the position between the two movable contacts of the movable feed 2, and the upper magnetizers 61 are secured to the push rod component 3 and the lower magnetizers 62 are secured to the movable spring 2; at least one through hole 22 is provided at the movable spring 2 between the two movable contacts (see FIG. 5), so that the upper magnetizers 61 and the lower magnetizers 62 can approach one to another or come into contact with each other through the through holes 22; and at least two independent magnetically conductive loops are formed in the width direction of the movable spring 2 by the upper magnetizers 61 and the lower magnetizers 62. According to such structure of the present disclosure, on the basis that arc extinguishing can be achieved by using the two permanent magnets 71, the increased magnetic pole faces of the respective magnetically conductive loops at the corresponding through holes 22 are used such that when the movable spring 2 has a large fault current, the attraction force in a contact pressure direction is stacked with the contact pressure to resist an electro-dynamic repulsion force generated, due to the fault current between the movable spring 2 and the stationary contact leading-out terminals; and since the short-circuit large current is basically and evenly divided by the independent magnetically conductive loops, the characteristics with the high magnetic efficiency and the magnetic circuit not easy to saturate are provided.

The Eighth Embodiment

Figure 33:
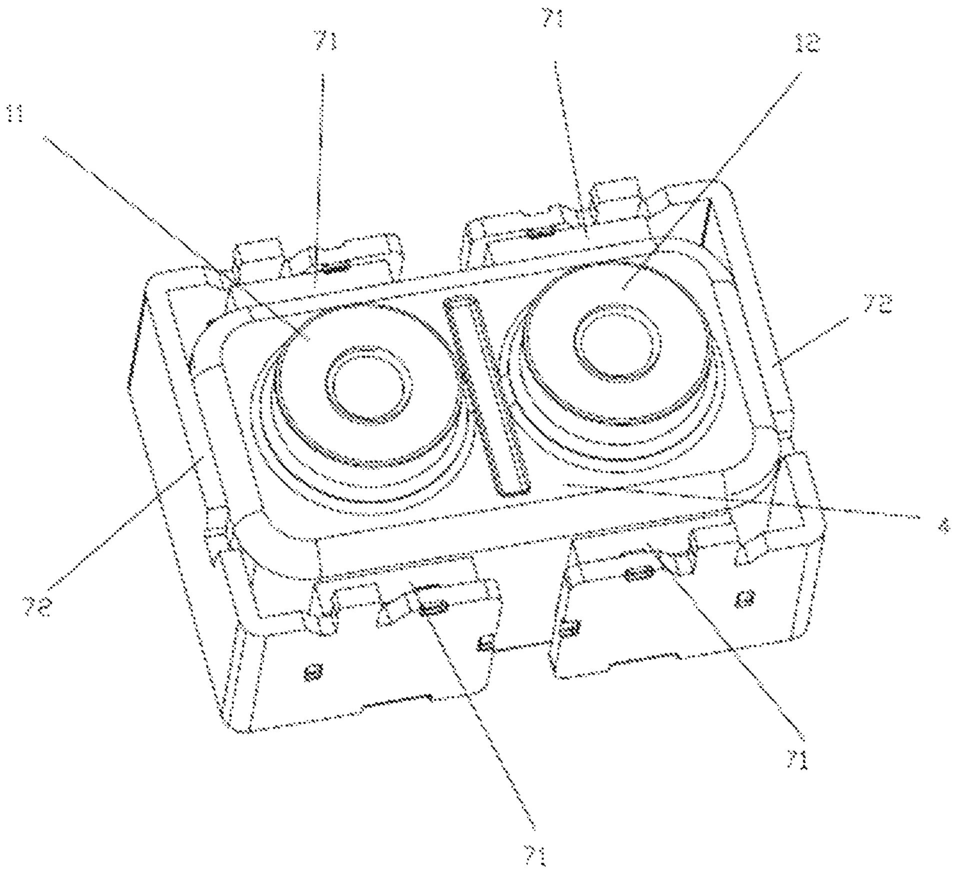
FIG. 33 is a schematic view of a partial structure of the eighth embodiment of the present disclosure.
Figure 34:
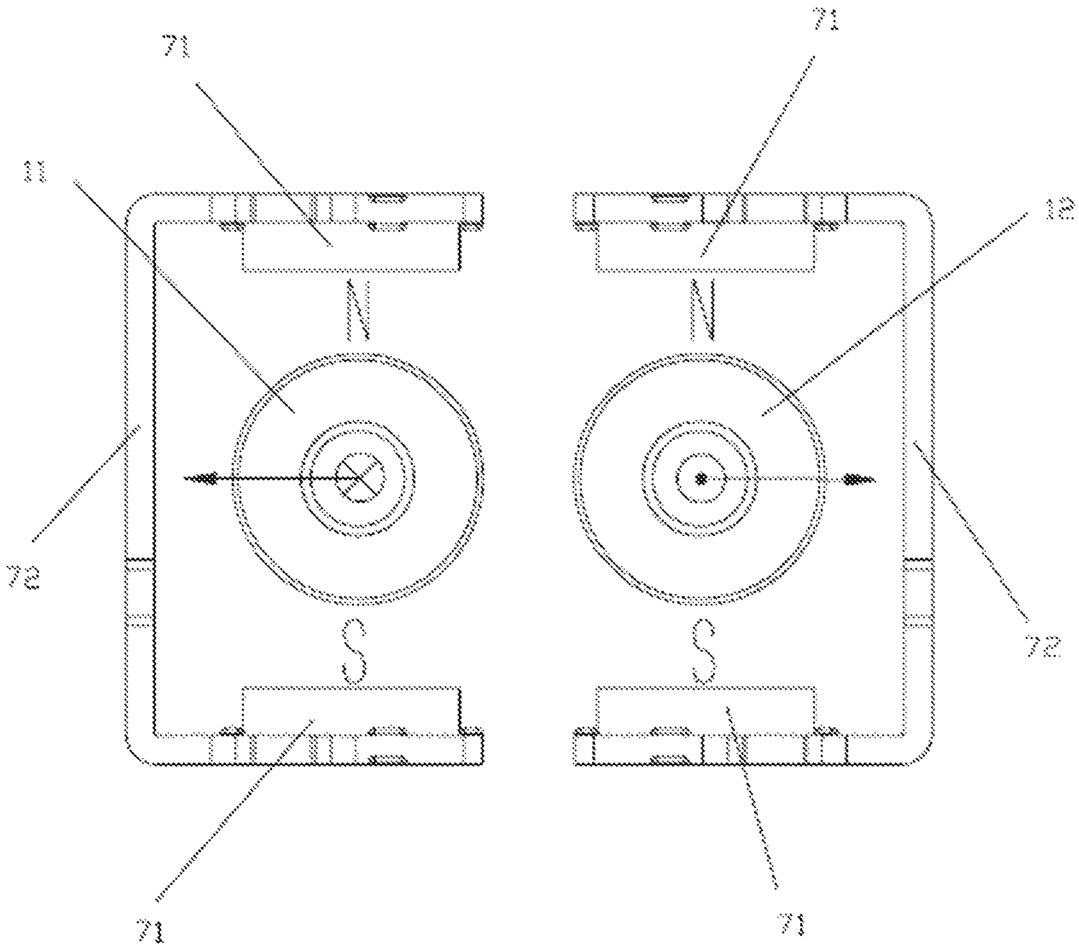
FIG. 34 is a schematic view showing the distribution of the permanent magnets according to the eighth embodiment of the present disclosure.
Figure 35:
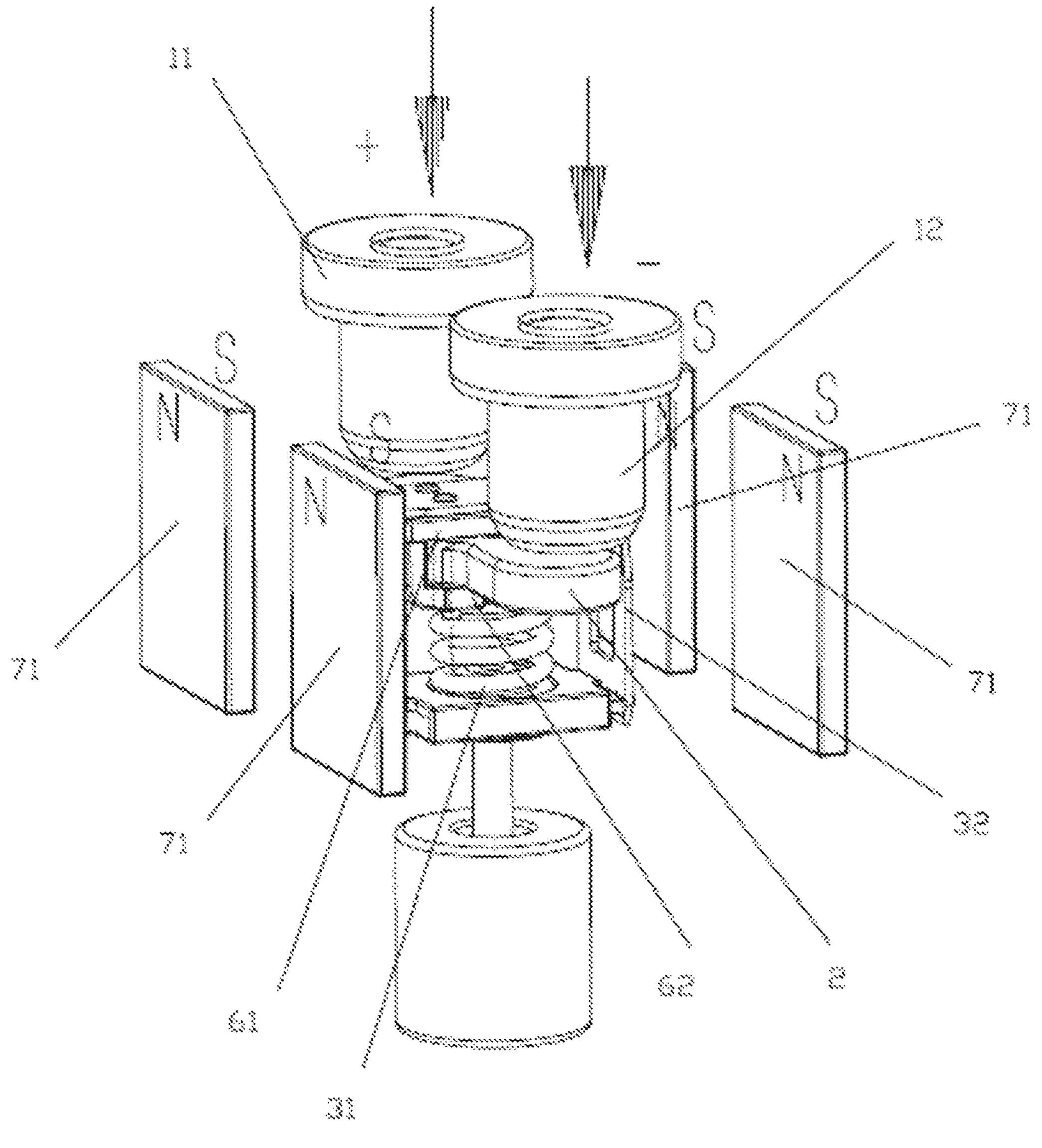
FIG. 35 is a schematic view of the permanent magnet with the arc extinguishing structure (a yoke clip not shown) according to the eighth embodiment of the present disclosure.

Referring to FIGS. 33 to 35, the DC relay with permanent magnet arc extinguishing and capable of resisting short-circuit current of the present disclosure includes two stationary contact leading-out terminals 11 and 12 respectively for current inflow and current outflow, and one straight sheet type movable spring 2, one push rod component 3 for driving the movement of the movable spring 2 so as to realize that the movable contacts on the two ends of the movable spring are contacted with or separated from stationary contacts on the bottom end of the stationary contact leading-out terminals, and four permanent magnets 71. The two stationary contact leading-out terminals 11, 12 are respectively mounted on a housing 4. The movable spring 2 and a portion of the push rod component 3 are received in the housing 4. The push rod component 3 is also connected with a movable iron core 5 in a magnetic circuit structure. Under the action of the magnetic circuit, the push rod component 3 drives the movable spring 2 to move upward, so that movable contacts on the two ends of the movable spring 2 are in contact with the stationary contacts on the bottom ends of the two stationary contact leading-out terminals 11 and 12 respectively, so as to realize a communication load. The movable spring 2 is mounted in the push rod component 3 by means of a spring 31 such that the movable spring 2 can be displaced relative to the push rod component 3 (to achieve over-travel of the contacts). The four permanent magnets 71 are outside the housing 4 and are respectively arranged on the two sides in the width direction of the movable spring 2 corresponding to the movable and stationary contacts, and the magnetic poles on the side facing to the movable and stationary contacts of the two permanent magnets corresponding to the same pair of the movable and stationary contacts are set to be opposite, and the magnetic poles on the side facing to the movable and stationary contacts of the two permanent magnets corresponding to the same side in the width direction of the movable spring are set to be the same, and one yoke clip 72 is connected between the two permanent magnets corresponding to the same pair of the movable and stationary contacts. In this embodiment, the stationary contact leading-out terminal 11 is the current flow in, and the stationary contact leading-out terminal 12 is the current flow out, in the movable spring 2, the current flows from the end close to the stationary contact leading-out terminal 11 to the end close to the stationary contact leading-out terminal 12, the four permanent magnets 71 are respectively arranged at the position directly opposite to the movable and stationary contacts. As shown in FIG. 2, among the four permanent magnets 71, the magnetic poles on the side facing to the corresponding the movable and stationary contacts of two permanent magnets 71 on the left side of the movable spring in the current flowing direction are set as N poles, and the magnetic poles on the side facing to the corresponding the movable and stationary contacts of the two permanent magnet 71 on the right side of the movable spring in the current flowing direction are set as S poles. The yoke clip 72 is substantively U-shaped, the U-shaped bottom wall of the yoke clip 72 corresponds to the outside of corresponding one of the two ends in the width direction of the movable spring 2, and the U-shaped two side walls of the yoke clip 72 are respectively connected to back faces of the two permanent magnets 71 corresponding to the same pair of movable and stationary contacts. An upper magnetizer 61 is mounted above a position between the two movable contacts of the movable spring 2 (substantively in the middle position of the movable spring), in this embodiment, the upper magnetizer 61 is the upper armature. A lower magnetizer 62 capable of moving along with the movable spring is mounted below the position between the two movable springs 2 of the movable spring 2, in this embodiment, the lower magnetizer 62 is a lower armature. In this embodiment, the upper magnetizer 61 is secured to the push rod component 3, and the lower magnetizer 62 is secured to the movable spring 2, and at least one through hole 22 is provided between the two movable contacts of the movable spring (see FIG. 5), so that the upper magnetizer 61 and the lower magnetizer 62 can approach one to another or come into contact with each other through the through hole 22. At least two independent magnetically conductive loops are formed in a width of the movable spring 2 by means of the upper magnetizer 61 and the lower magnetizer 62. The increased magnetic pole faces of the respective magnetically conductive loops at the corresponding through holes are used such that when the movable spring 2 has a large fault current, an attraction force in a contact pressure direction is generated (the upper magnetizer 61 is relatively stationary and the lower magnetizer 62 is relatively movable, so as to form a suction force) to resist an electro-dynamic repulsion force generated, due to the fault current between the movable spring and the stationary contact leading-out terminals. Wherein the upper magnetizer and the lower magnetizer may be made of iron, cobalt, nickel, alloy thereof and other materials.

Figure 3:
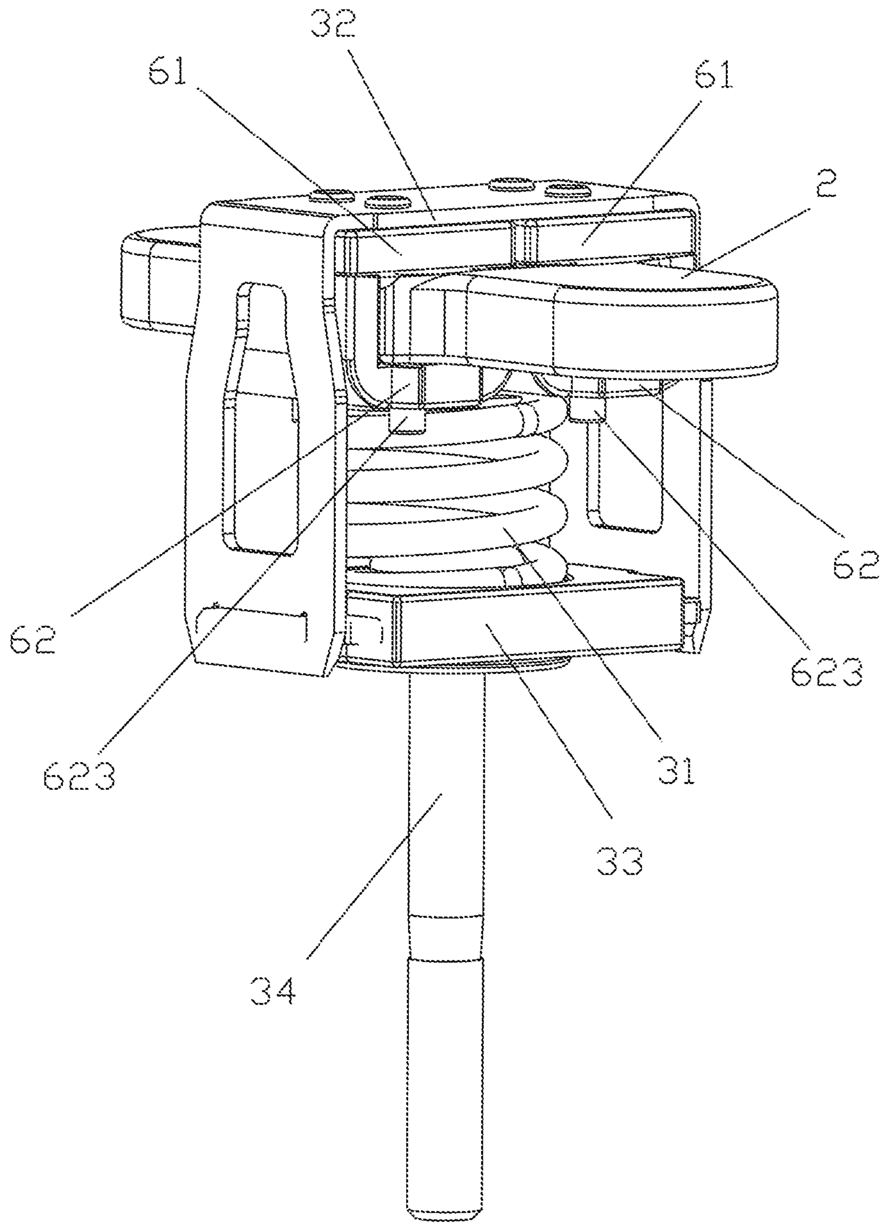
FIG. 3 is a schematic view showing the cooperation of a movable spring, upper magnetizers and lower magnetizers, and a push rod component according to the first embodiment of the present disclosure.
Figure 4:
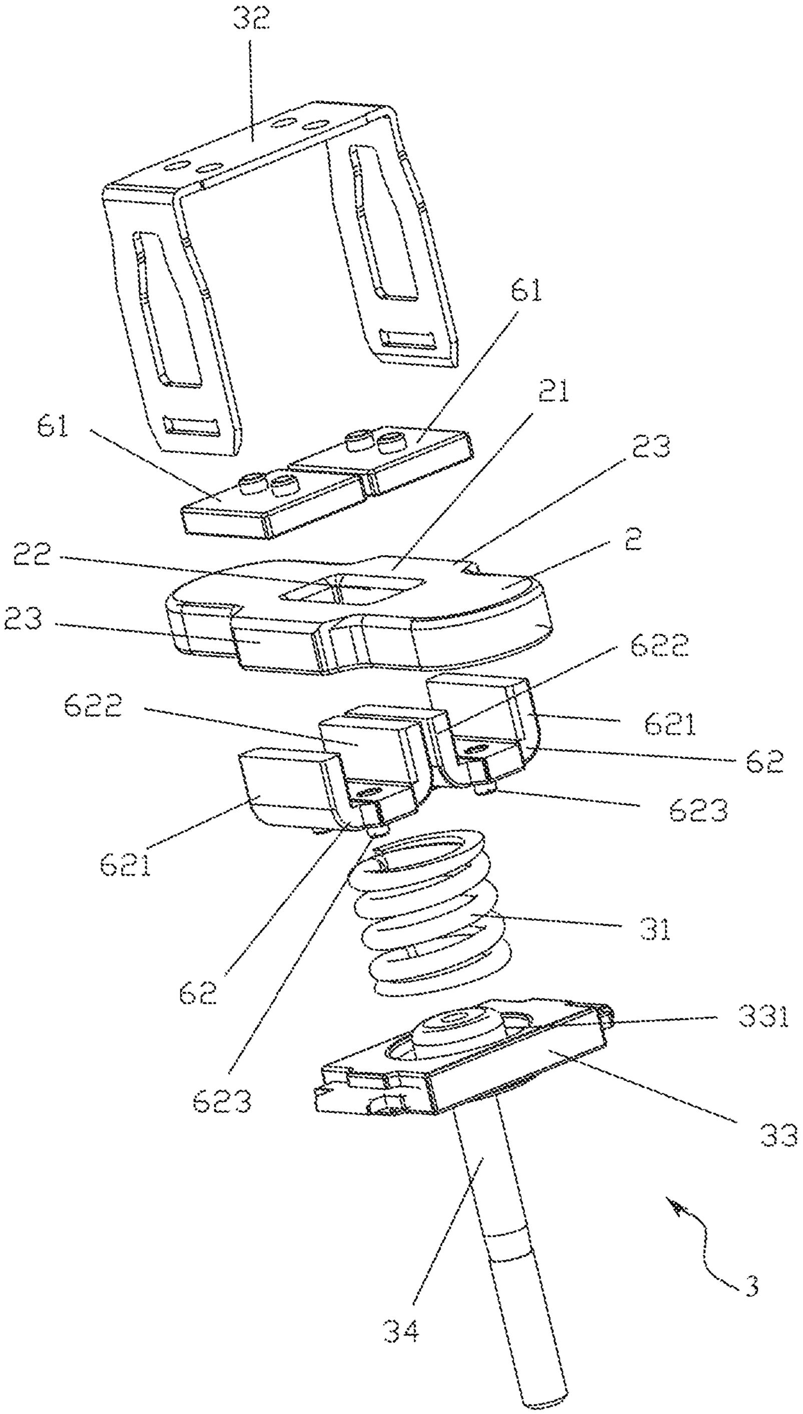
FIG. 4 is an exploded schematic view of parts of the movable spring, the upper magnetizers and the lower magnetizers, and the push rod component, which are cooperated one to another, according to the first embodiment of the present disclosure.
Figure 5:
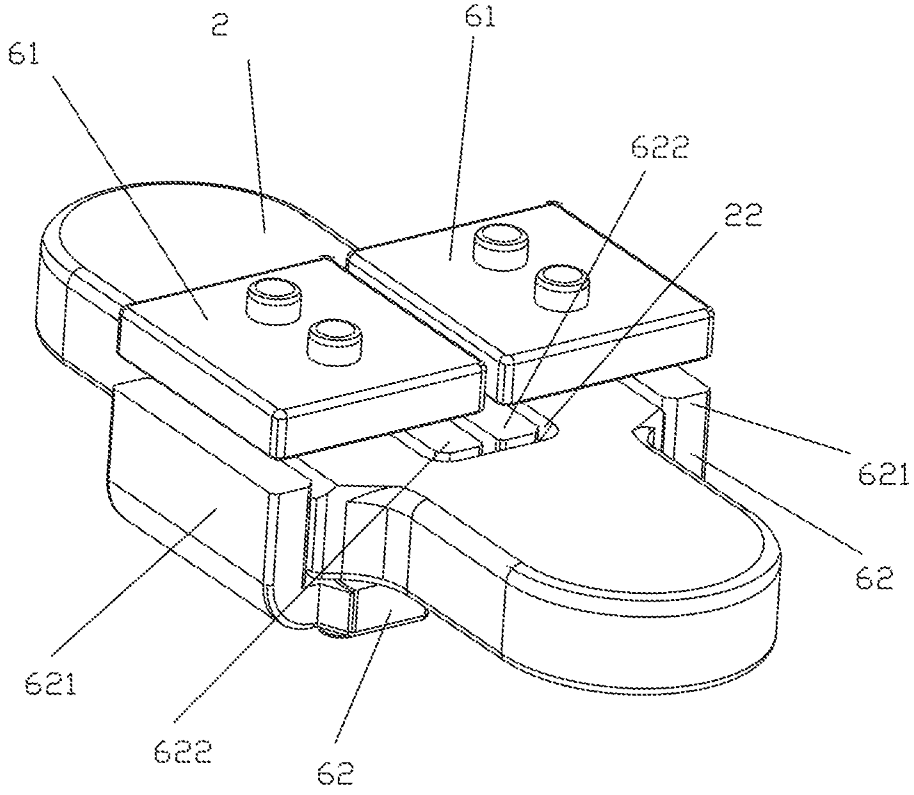
FIG. 5 is a schematic view of the cooperation of the movable spring, the upper magnetizers and the lower magnetizers according to the first embodiment of the present disclosure.
Figure 6:
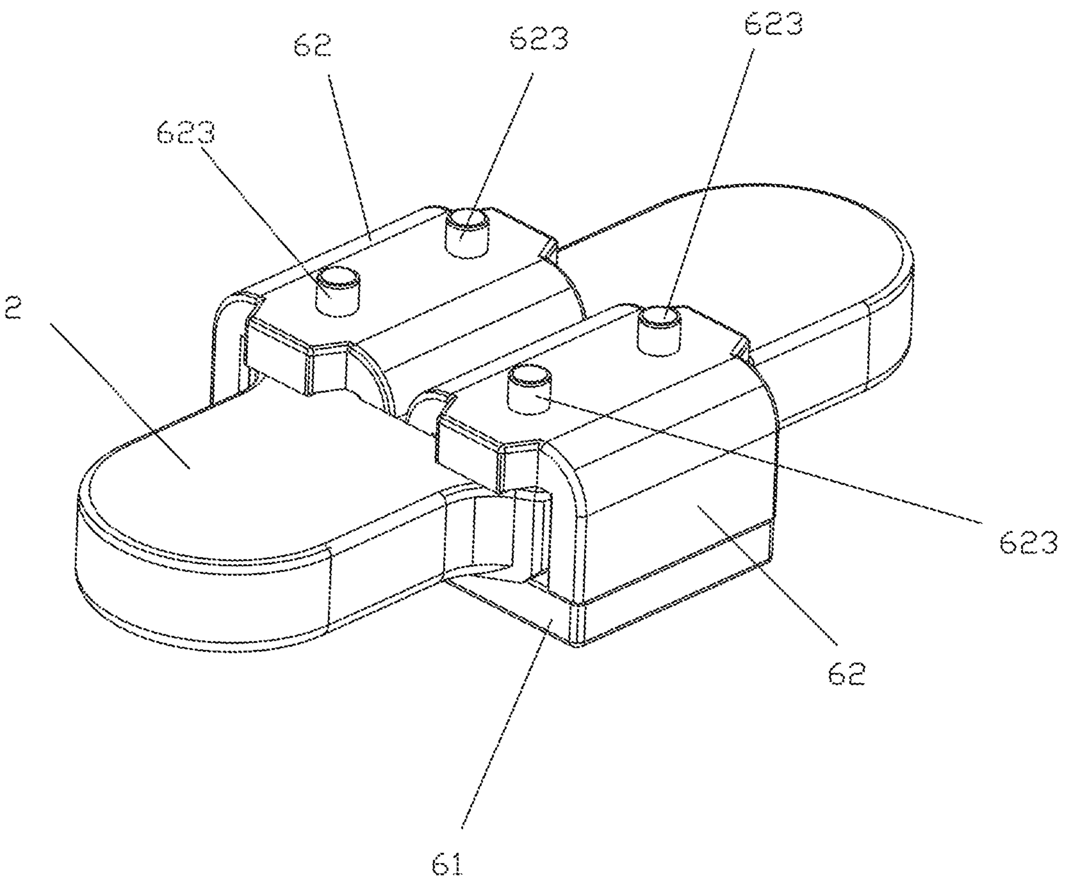
FIG. 6 is a schematic view showing the cooperation of the movable spring, the upper magnetizer and the lower magnetizer while turning over a side according to the first embodiment of the present disclosure.
Figure 7:
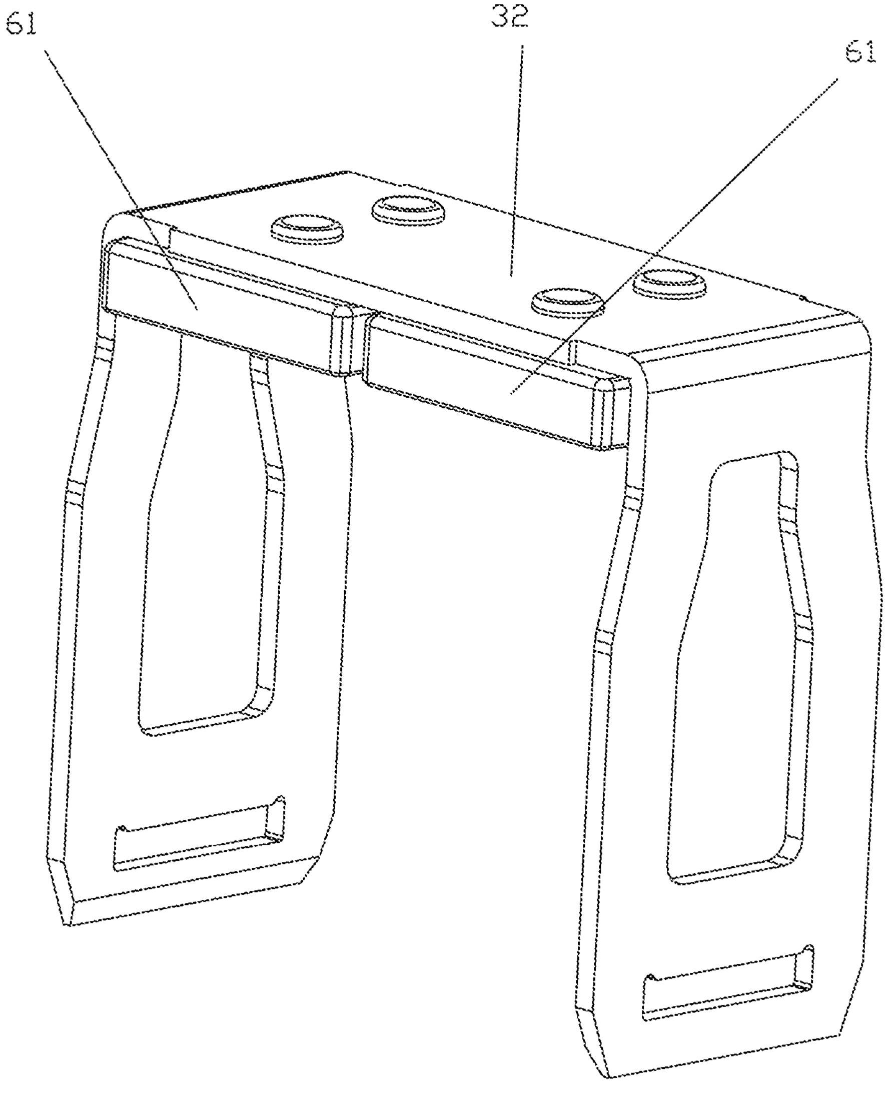
FIG. 7 is a schematic view showing the cooperation of an U-shaped bracket of the push rod component and the upper magnetizers according to the first embodiment of the present disclosure.

In this embodiment, the magnetic field formed by the cooperation of the four permanent magnets 71 and the two yoke clips 72 can form magnetic blowing force in the direction shown by an arrow in FIG. 2. The two pairs of the contacts are subjected to arc extinguishing treatment by means of the magnetic blowing forces in the two directions, and since the directions of the magnetic blowing forces are all toward the outside, no interference can be produced between them. The magnetic field formed by the cooperation of the four permanent magnets 71 and the two yoke clips 72 still acts on the movable spring 2, a downward force is formed at the contact position (as shown in FIG. 3), which can cause contact pressure insufficient, and thus the attractive force formed by the magnetically conductive loops still needs to be used to overcome the downward force generated by the magnetic field of the four permanent magnets 71 and the two yoke clips 72.

The structure of this embodiment is suitable for users who require arc breaking.

Figure 36:
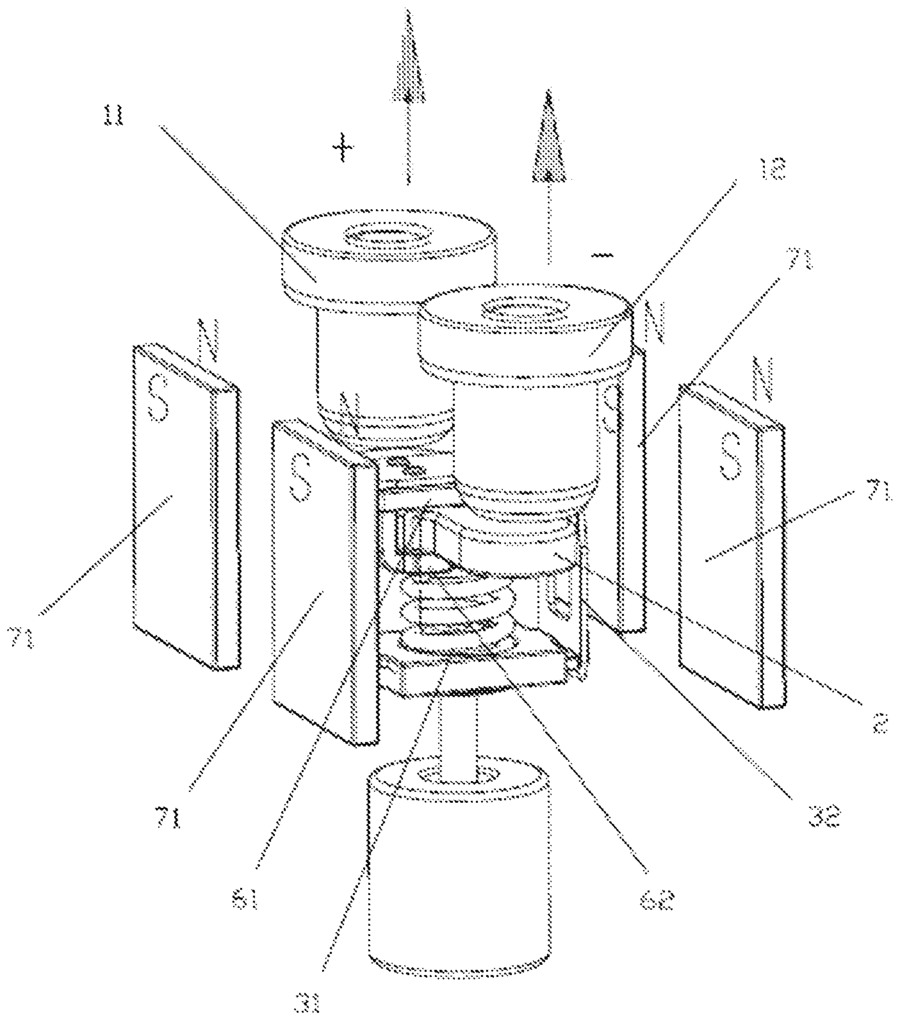
FIG. 36 is a schematic view of a permanent magnet with another arc extinguishing structure (a yoke clip not shown) according to the eighth embodiment of the present disclosure.

In the four permanent magnets 71 as shown in FIG. 36, the magnetic poles on the side facing to the corresponding movable and stationary contacts of the two permanent magnets 71 on the left side of the movable springs in the current flowing direction are set as S poles, and the magnetic poles on the side facing to the corresponding movable and stationary contacts of the two permanent magnets 71 on the right side of the movable spring in the current flowing direction are set as N poles; since the directions of the magnetic field are all toward inside, the magnetically blown electric arcs are interfered with one another to some extent. When the magnetic field formed by the cooperation of the four permanent magnets 71 and the two yoke clips 72 acts on the movable spring 2, an upward force is formed at the contact position, which can increase the pressure of the contact, that is, by the suction force formed by the magnetically conductive loops and the upward force generated by the magnetic field of the four permanent magnets 71 and the two yoke clips 72 are used to resist the electro-dynamic repulsion force generated, due to the fault current between the movable spring and the stationary contact leading-out terminals.

The DC relay with permanent magnet arc extinguishing and capable of resisting short-circuit current of the present disclosure has a polarity requirement on the load, and has great difference between the forward and reverse arc extinguishing capabilities.

In the eighth embodiment, in addition to the four pieces of permanent magnet 71 and the two yoke clips 72, the other structures such as the push rod component 3, the movable spring 2, the upper magnetizers 61, the lower magnetizer 62 may be the same as the foregoing first embodiment, second embodiment and the third embodiment, which will not be repeated herein.

According to the DC relay capable of extinguishing arc and resisting short-circuit current of the present disclosure, the four permanent magnets 71 are respectively arranged on the two sides in the width direction of the movable spring corresponding to the movable and stationary contacts, and the magnetic poles on the side facing to the movable and stationary contacts of the two permanent magnets corresponding to the same pair of the movable and stationary contacts are set to be opposite, and the magnetic poles on the side facing to the movable and stationary contacts of the two permanent magnets corresponding to the same side in the width direction of the movable spring are also set to be the same; one yoke clip 72 is also connected between the two permanent magnets corresponding to the same pair of movable and stationary contacts.

The structure of the present disclosure uses four permanent magnets 71 to achieve arc extinguishing, and then uses the magnetic pole faces of each magnetically conductive loop to increase in the corresponding through hole position, and when the movable spring 2 has a large current failure, Increase the suction force in the direction of contact pressure, and superimpose it with the contact pressure to resist the electric repulsion generated by the fault current between the movable contact and the stationary contact; multiple independent magnetically conductive loops will basically evenly divide the short-circuit large current, It has the characteristics of high magnetic efficiency and the magnetically conductive loop is not easy to saturate. The upper magnetizers 61 are mounted above the position between the movable contacts of the movable spring 2; the lower magnetizers capable of moving with the movable spring 2 are mounted below the position between the two movable contacts of the movable feed 2, and the upper magnetizers 61 are secured to the push rod component 3 and the lower magnetizers 62 are secured to the movable spring 2; at least one through hole 22 is provided at the movable spring 2 between the two movable contacts (see FIG. 5), so that the upper magnetizers 61 and the lower magnetizers 62 can approach one to another or come into contact with each other through the through holes 22; and at least two independent magnetically conductive loops are formed in the width direction of the movable spring 2 by the upper magnetizers 61 and the lower magnetizers 62. According to such structure of the present disclosure, on the basis that arc extinguishing can be achieved by using the four permanent magnets 71, the increased magnetic pole faces of the respective magnetically conductive loops at the corresponding through holes 22 are used such that when the movable spring 2 has a large fault current, the attraction force in a contact pressure direction is stacked with the contact pressure to resist an electro-dynamic repulsion force generated, due to the fault current between the movable spring 2 and the stationary contact leading-out terminals; and since the short-circuit large current is basically and evenly divided by the independent magnetically conductive loops, the characteristics with the high magnetic efficiency and the magnetic circuit not easy to saturate are provided.

It should be understood that this disclosure would never be limited to the detailed construction and arrangement of components as set forth in this specification. The present disclosure has other implementations that are able to be practiced or carried out in various ways. The foregoing variations and modifications fall within the scope of this disclosure. It should be understood that the present disclosure would contain all alternative combination of two or more individual features as mentioned or distinguished from in the text and/or in the drawings. All of these different combinations constitute a number of alternative aspects of the present disclosure. The implementations as illustrated in this specification are the best modes known to achieve the present disclosure and will enable the person skilled in the art to realize the present disclosure.

What is claimed is:

1. A DC relay for extinguishing arc and resisting short-circuit current, comprising two stationary contact leading-out terminals, a straight sheet type movable spring, a push rod component and two permanent magnets, the movable spring is mounted on the push rod component, so that the movable contacts on the two ends of the movable spring are matched with the stationary contacts on bottom ends of the two stationary contact leading-out terminals under the action of the push rod component, the two permanent magnets are respectively arranged on two sides in the length direction of the movable spring corresponding to the movable and stationary contacts, and the magnetic poles on the sides opposite to each other of the two permanent magnets are opposite, the two permanent magnets are also connected to two yoke clips, the two yoke clips comprises at least two yoke sections on two sides in the width direction of the movable spring corresponding to the movable and stationary contacts, upper magnetizers arranged in a width direction of the movable spring are mounted above the position between the movable contacts of the movable spring, lower magnetizers arranged in the width direction of the movable spring and of moving with the movable spring are mounted below the position; at least one through hole is provided in the movable spring at the position, so that the upper magnetizers and the lower magnetizers can approach one to another or come into contact with each other through the through holes, at least two independent magnetically conductive loops are formed in the width direction of the movable spring by the upper magnetizers and the lower magnetizers, increased magnetic pole faces of the respective magnetically conductive loops at the corresponding through holes are used such that when the movable spring has a large fault current, attraction force in a contact pressure direction is generated to resist an electro-dynamic repulsion force generated, due to the fault current between the movable spring and the stationary contact leading-out terminals.

2. The DC relay for extinguishing arc and resisting short-circuit current according to claim 1, wherein the two permanent magnets are respectively arranged at positions directly opposite to the movable and stationary contacts.

3. The DC relay for extinguishing arc and resisting short-circuit current according to claim 1, wherein the yoke clip is U-shaped, U-shaped bottom walls of the two yoke clips are connected to sides of the two permanent magnets facing back to one another, and end portions of the two U-shaped side walls of the two yoke clips constitute corresponding yoke sections.

4. The DC relay for extinguishing arc and resisting short-circuit current according to claim 1, wherein the yoke clip is U-shaped, U-shaped bottom walls of the two yoke clips are respectively connected to sides of the two permanent magnets facing back to each other, and end heads of the two U-shaped side walls of the two yoke clips respectively exceed positions of two sides in the width direction of the movable spring corresponding to the movable and stationary contacts; two yoke sections are comprised in the two U-shaped side walls of the two yoke clips.

5. The DC relay for extinguishing arc and resisting short-circuit current according to claim 1, wherein the yoke clip is U-shaped, U-shaped bottom walls of the two yoke clips are respectively fitted on two sides in the width direction of the movable spring, and end heads of the U-shaped side walls of the two yoke clips are connected to sides of the two permanent magnets facing bake to each other.

6. The DC relay for extinguishing arc and resisting short-circuit current according to claim 1, wherein the upper magnetizers comprise at least one rectangular upper magnetizer, and the lower magnetizers comprise at least two U-shaped lower magnetizers, wherein one of the at least two U-shaped lower magnetizer and a corresponding one of the at least one rectangular upper magnetizers form an independent magnetically conductive loop, and the two U-shaped lower magnetizers are not in contact with each other.

7. The DC relay for extinguishing arc and resisting short-circuit current according to claim 6, wherein adjacent two U-shaped lower magnetizers share one of the rectangular upper magnetizers, the two U-shaped lower magnetizers are fitted below the corresponding one of the at least one rectangular upper magnetizer.

8. The DC relay for extinguishing arc and resisting short-circuit current according to claim 6, wherein rectangular adjacent two U-shaped lower magnetizers are independent from each other, the two U-shaped lower magnetizers are fitted below the corresponding rectangular upper magnetizers.

9. The DC relay for extinguishing arc and resisting short-circuit current according to claim 6, wherein there are two magnetically conductive loops, the movable spring is provided with one through hole, and each of the two U-shaped lower magnetizers has one side wall attached to a side in the width direction of the movable spring, and the other side wall passing through the through hole of the movable spring, and a gap is presented between the other side walls of the two U-shaped lower magnetizers.

10. The DC relay for extinguishing arc and resisting short-circuit current according to claim 9, wherein the other side walls of the two U-shaped lower magnetizers are arranged side by side or in a staggered manner in a width direction of the movable spring within the through hole of the movable spring, such that the two magnetically conductive loops corresponding to the two U-shaped lower magnetizers are arranged side by side or in a staggered manner in the width direction of the movable spring.

11. The DC relay for extinguishing arc and resisting short-circuit current according to claim 6, wherein there are two magnetically conductive loops, the movable spring is provided with two through holes that are arranged side by side or in a staggered manner in a width direction of the movable spring, and each of the two U-shaped lower magnetizers has one side wall attached to a side in the width direction of the movable spring, and the other side wall fitted in one of the two through holes of the movable spring, such that the two magnetically conductive loops corresponding to the two U-shaped lower magnetizers are arranged side by side or in a staggered manner in the width direction of the movable spring.

12. The DC relay for extinguishing arc and resisting short-circuit current according to claim 6, wherein there are three magnetically conductive loops, the movable spring is provided with two through holes, and three U-shaped lower magnetizers are sequentially arranged in the width direction of the movable spring, wherein the two side walls of the U-shaped lower magnetizer in the middle pass through the two through holes of the movable spring respectively, and each of the two U-shaped lower magnetizers on two sides have one side wall attached to a corresponding side of the movable spring, and the other side wall passing through one of the two through holes of the movable spring, and a gap is presented between the two sides within the same through hole in the movable spring.

13. The DC relay for extinguishing arc and resisting short-circuit current according to claim 1, wherein the upper magnetizer is an upper armature secured to the push rod component, and the lower magnetizer is a lower armature secured to the movable spring, and the movable spring is mounted in the push rod component by a spring; when the movable contacts of the movable spring are in contact with the stationary contacts of the stationary contact leading-out terminals, a preset gap is presented between the upper armature and the lower armature.

14. The DC relay for extinguishing arc and resisting short-circuit current according to claim 13, wherein the push rod component comprises a U-shaped bracket, a spring seat and a push rod; a top portion of the push rod is secured to the spring seat; a bottom portion of the U-shaped bracket is secured to the spring seat; and a movable spring assembly composed of the movable spring and the two U-shaped lower magnetizers is mounted within the U-shaped bracket by the spring, wherein an upper surface of the movable spring abuts against the upper yoke, the upper yoke is fixed on an inner wall of the top portion of the U-shaped bracket, the spring elastically abuts between bottom ends of the two U-shaped lower magnetizers and a top end of the spring seat.

15. The DC relay for extinguishing arc and resisting short-circuit current according to claim 1, wherein the upper magnetizer is an upper yoke secured to a housing on which the two stationary contact leading-out terminals are mounted, and the lower magnetizer is a lower armature secured to the movable spring mounting in the push rod component by means of a spring, and when the movable contacts of the movable spring are in contact with the stationary contacts of the stationary contact leading-out terminals, the upper yoke is in contact with the lower armature.

16. The DC relay for extinguishing arc and resisting short-circuit current according to claim 15, wherein the push rod component comprises a U-shaped bracket, a spring seat and a push rod; a top portion of the push rod is secured to the spring seat; a bottom portion of the U-shaped bracket is secured to the spring seat; and a movable spring assembly composed of the movable spring and the two U-shaped lower magnetizers is mounted within the U-shaped bracket by the spring, wherein an upper surface of the movable spring abuts against the upper yoke, the upper yoke is fixed on an inner wall of the top portion of the U-shaped bracket, the spring elastically abuts between bottom ends of the two U-shaped lower magnetizers and a top end of the spring seat.

* * * * *